(12) United States Patent
Park

(10) Patent No.: US 12,519,874 B2
(45) Date of Patent: Jan. 6, 2026

(54) HINGE STRUCTURE AND ELECTRONIC DEVICE COMPRISING SAME

(71) Applicant: Samsung Electronics Co., Ltd., Gyeonggi-do (KR)

(72) Inventor: Jaebeom Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 388 days.

(21) Appl. No.: 18/119,937

(22) Filed: Mar. 10, 2023

(65) Prior Publication Data

US 2023/0216941 A1 Jul. 6, 2023

Related U.S. Application Data

(63) Continuation of application No. PCT/KR2021/013329, filed on Sep. 29, 2021.

(30) Foreign Application Priority Data

Nov. 17, 2020 (KR) ........................ 10-2020-0153873

(51) Int. Cl.
*H04M 1/02* (2006.01)
*F16C 11/04* (2006.01)

(52) U.S. Cl.
CPC ......... *H04M 1/0214* (2013.01); *F16C 11/045* (2013.01)

(58) Field of Classification Search
CPC .. H04M 1/0214; H04M 1/022; H04M 1/0216; H04M 1/0268; F16C 11/045;

(Continued)

(56) References Cited

U.S. PATENT DOCUMENTS 7,907,415 B2 3/2011 Ueyama
8,244,318 B2 8/2012 Kim et al.
(Continued)

FOREIGN PATENT DOCUMENTS

CN 111336174 A 6/2020
EP 3 734 946 A1 11/2020
(Continued)

OTHER PUBLICATIONS

Korean Office Action dated Dec. 3, 2024.
European Search Report dated Jan. 22, 2024.
International Search Report dated Jan. 19, 2022.

*Primary Examiner* — Angelica Perez
(74) *Attorney, Agent, or Firm* — Cha & Reiter, LLC.

(57) ABSTRACT

According to certain embodiments, a foldable electronic device comprises: a first housing; a second housing; a hinge structure coupling the first housing and the second housing; and a flexible display, wherein at least a first portion of the flexible display is disposed on the first housing and a second portion of the flexible display is disposed on the second housing, wherein the hinge structure includes: a fixing member, a first rotary member coupled to the fixing member; a second rotary member coupled to the fixing member; a first rotary shaft, wherein one end of the first rotary shaft is held on one side of the fixing member; a second rotary shaft, wherein one end of the second rotary shaft is held on an opposite side of the fixing member; a first arm part coupled to the first rotary member, with the first rotary shaft is inserted therein; a first cam structure disposed is in the first arm part; a second arm part coupled to the second rotary member with the second rotary shaft inserted therein, a second cam structure disposed in the second arm part; and a first cam member including a first cam, with the first rotary shaft inserted in the first cam, and engaged with the first cam structure, a second cam, with the second rotary shaft inserted (Continued)

in the second cam, and engaged with the second cam structure, and a cam body connecting the first cam and the second cam.

20 Claims, 33 Drawing Sheets

(58) Field of Classification Search
CPC .... G06F 1/1652; G06F 1/1681; G06F 1/1611; G09F 9/301
See application file for complete search history.

(56) References Cited

U.S. PATENT DOCUMENTS

| | | | |
|---|---|---|---|
| 8,938,855 B2 | 1/2015 | Ahn et al. | |
| 9,250,733 B2 | 2/2016 | Lee et al. | |
| 10,761,574 B1 | 9/2020 | Hsu et al. | |
| 10,845,850 B1 | 11/2020 | Kang et al. | |
| 11,231,754 B2 | 1/2022 | Kang et al. | |
| 11,662,781 B2 | 5/2023 | Kang et al. | |
| 2010/0149764 A1 | 6/2010 | Ueyama | |
| 2011/0077062 A1 | 3/2011 | Kim et al. | |
| 2013/0152342 A1 | 6/2013 | Ahn et al. | |
| 2013/0293444 A1* | 11/2013 | Sano | G06F 1/3206 345/1.3 |
| 2015/0233162 A1 | 8/2015 | Lee et al. | |
| 2020/0348732 A1* | 11/2020 | Kang | G06F 1/1652 |
| 2022/0113770 A1 | 4/2022 | Kang et al. | |
| 2022/0137675 A1* | 5/2022 | Kuramochi | G06F 1/1652 361/679.27 |
| 2022/0264756 A1* | 8/2022 | Oh | G06F 1/1618 |
| 2023/0044990 A1* | 2/2023 | Park | F16C 11/045 |
| 2023/0054923 A1* | 2/2023 | Liao | G06F 1/1681 |
| 2023/0251692 A1 | 8/2023 | Kang et al. | |
| 2025/0240902 A1* | 7/2025 | Ji | F16C 11/04 |

FOREIGN PATENT DOCUMENTS

| | | | |
|---|---|---|---|
| JP | 7-277342 | A | 10/1995 |
| JP | 9-142531 | A | 6/1997 |
| JP | 2000-7024 | A | 1/2000 |
| JP | 2016-201738 | A | 12/2016 |
| KR | 20-0338642 | Y1 | 1/2004 |
| KR | 10-2008-0033309 | A | 4/2008 |
| KR | 10-1008847 | B1 | 1/2011 |
| KR | 10-2011-0035035 | A | 4/2011 |
| KR | 10-2012-0068262 | A | 6/2012 |
| KR | 10-2013-0067547 | A | 6/2013 |
| KR | 10-1501604 | B1 | 3/2015 |
| KR | 10-2015-0096827 | A | 8/2015 |
| KR | 10-1592826 | B1 | 2/2016 |
| KR | 10-2016-0124317 | A | 10/2016 |
| KR | 10-1731375 | B1 | 4/2017 |
| KR | 10-1847047 | B1 | 4/2018 |
| KR | 10-2019-0067400 | A | 6/2019 |
| KR | 10-2019-0097898 | A | 8/2019 |
| KR | 10-2036913 | B1 | 10/2019 |
| KR | 10-2020-0037191 | A | 4/2020 |
| KR | 10-2020-0117780 | A | 10/2020 |
| KR | 10-2020-0126524 | A | 11/2020 |
| WO | 2018/162799 | A1 | 9/2018 |

* cited by examiner

<FIRST ANGLE STATE>

<SECOND ANGLE STATE>

HINGE STRUCTURE AND ELECTRONIC DEVICE COMPRISING SAME

CLAIM OF PRIORITY

This application is a continuation of PCT Application No PCT/KR2021/013329, filed Sep. 29, 2021, claiming priority to Korean Patent Application No. 10-2020-0153873 filed in the Korean Intellectual Property Office on Nov. 17, 2020. Each application is incorporated herein by reference for all purposes.

BACKGROUND

1. Field

Certain embodiments of the disclosure relate to an electronic device having a hinge structure.

2. Description of Related Art

A portable electronic device, such as a smartphone, may provide various functions. The various function can include voice communication, playback of videos, and internet searching, using various kinds of applications. The user may intend to use the above-mentioned functions through a wider screen. However, as the screen becomes larger, portability may deteriorate. Accordingly, a foldable portable electronic device may increase portability by utilizing a folded structure.

In the foldable electronic device, adjacent housings and a hinge structure can be connected to each other, and the housings are rotated at specific angles while the hinge structure supports the housings.

However, the foldable electronic device may cause audible noise when folding and unfolding with a hinge structure. Furthermore, repeatedly use may cause wear and tear. The wear and tear can exacerbate the noise.

Certain embodiments of the disclosure provide an electronic device including a hinge structure that generates less noise and is less susceptible to wear and tear.

Certain embodiments provide an electronic device including a hinge structure, by which noise may be mitigated by adjusting an operation environment of a cam operation part.

SUMMARY

According to certain embodiments, a foldable electronic device comprises: a first housing; a second housing; a hinge structure coupling the first housing and the second housing; and a flexible display, wherein at least a first portion of the flexible display is disposed on the first housing and a second portion of the flexible display is disposed on the second housing, wherein the hinge structure includes: a fixing member, a first rotary member coupled to the fixing member; a second rotary member coupled to the fixing member; a first rotary shaft, wherein one end of the first rotary shaft is held on one side of the fixing member; a second rotary shaft, wherein one end of the second rotary shaft is held on an opposite side of the fixing member; a first arm part coupled to the first rotary member, with the first rotary shaft is inserted therein; a first cam structure disposed is in the first arm part; a second arm part coupled to the second rotary member with the second rotary shaft inserted therein, a second cam structure disposed in the second arm part; and a first cam member including a first cam, with the first rotary shaft inserted in the first cam, and engaged with the first cam structure, a second cam, with the second rotary shaft inserted in the second cam, and engaged with the second cam structure, and a cam body connecting the first cam and the second cam.

According to certain embodiments, a hinge structure comprises: a fixing member; a first rotary member coupled to the fixing member; a second rotary member coupled to the fixing member; a first rotary shaft having one end held on one side of the fixing member; a second rotary shaft having one end held on an opposite side of the fixing member; a first arm part, having the first rotary shaft inserted therein, and coupled to the first rotary member; a first cam structure disposed in the first arm part; a second arm part having the second rotary shaft inserted therein, and coupled to the second rotary member; a second cam structure disposed in the second arm part; a first cam member including a first cam, with the first rotary shaft inserted therein, and engaged with the first cam structure, a second cam, with the second rotary shaft inserted therein, and engaged with the second cam structure, and a cam body connecting the first cam and the second cam; a first spring configured to apply force to one side of the first cam; and a second spring configured to apply force to one side of the second cam, wherein the first spring and the second spring are disposed to buckle symmetrically to each other with respect to a center line between the first rotary shaft and the second rotary shaft.

According to certain embodiments, a hinge structure comprises: a fixing member; a first rotary member and a second rotary member coupled from an upper side of the fixing member in a downward direction; a first rotary shaft having one end held on one side of the fixing member; a second rotary shaft having one end held on an opposite side of the fixing member; a first arm part, having the first rotary shaft inserted therein, and coupled to the first rotary member; a first cam structure disposed in the first arm part; a second arm part, having the second rotary shaft inserted therein, and coupled to the second rotary member; a second cam structure disposed in the second arm part; a first cam member including a first cam having the first rotary shaft is inserted therein, and engaged with the first cam structure, a second cam having the second rotary shaft inserted therein, and engaged with the second cam structure, and a cam body connecting the first cam and the second cam; a first spring configured to apply force to one side of the first cam; and a second spring configured to apply force to one side of the second cam, wherein the first spring and the second spring buckle in a same direction in an opposite direction to an upper side of the fixing member such that at least a partial corner of the first rotary shaft contacts an inner side of a first cam hole and at least a partial corner of the second rotary shaft contacts an inner side of a second cam hole.

DETAILED DESCRIPTION

Figure 1A:
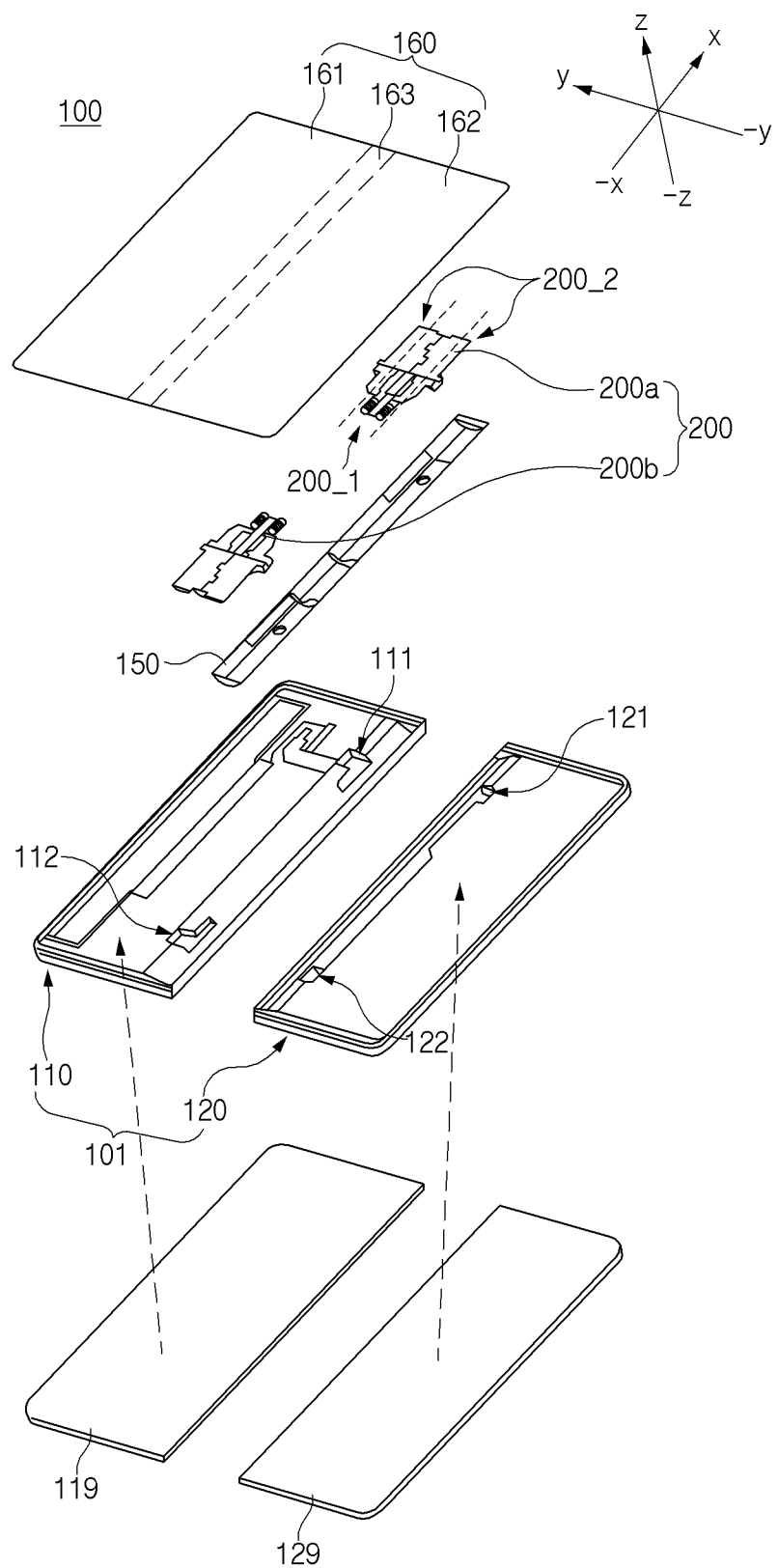
FIG. 1A is a view illustrating an exploded perspective view of an electronic device according to certain embodiments.

According to certain embodiments, an electronic device including a hinge structure can have a cam operation that generates less noise without necessitating significant additional structure(s).

Other advantages and effects provided by the electronic device including the hinge structure according to certain embodiments may be mentioned according to the embodiments of the detailed description.

Hereinafter, certain embodiments of the disclosure will be described with reference to the accompanying drawings. Accordingly, those of ordinary skill in the art will recognize that various modifications, use of equivalent(s), and/or alternatives can be made without departing from the scope and spirit of the disclosure. With regard to the description of drawings, similar components may be denoted by similar reference numerals.

In the disclosure disclosed herein, the expressions "have", "may have", "include" and "comprise", or "may include" and "may comprise" used herein indicate existence of corresponding features (e.g., components such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various components of certain embodiments of the disclosure, but do not limit the components. For example, such terms are used only to distinguish an component from another component and do not limit the order and/or priority of the components. For example, a first user device and a second user device may represent different user devices regardless of sequence or importance. For example, without departing the scope of the disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it can be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used herein may be used as, for example, the expression "suitable for", "having the capacity to", "designed to", "adapted to", "made to", or "capable of". The term "configured to (or set to)" is not limited to "specifically designed to" in hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in this specification are used to describe specified embodiments of the disclosure and are not intended to limit the scope of the disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in certain embodiments of the disclosure. According to occasions, even a term defined in the disclosure cannot be construed to exclude the embodiments of the disclosure.

An electronic device according to certain embodiments of the disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to certain embodiments of the disclosure, the wearable devices may include accessories (e.g., watches, rings, bracelets, ankle bracelets, glasses, contact lenses, or head-mounted devices (HMDs)), cloth-integrated types (e.g., electronic clothes), body-attached types (e.g., skin pads or tattoos), or implantable types (e.g., implantable circuits).

Hereinafter, electronic devices according to an embodiment of the disclosure will be described with reference to the accompanying drawings. The term "user" used herein may refer to a person who uses an electronic device or may refer to a device (e.g., an artificial electronic device) that uses an electronic device.

Figure 1B:
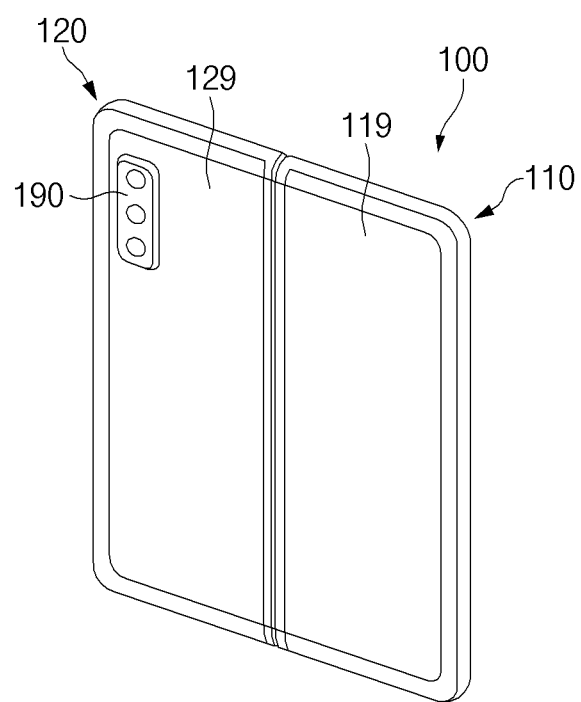
FIG. 1B is a view illustrating an example of a rear surface of an electronic device according to certain embodiments.
Figure 1C:
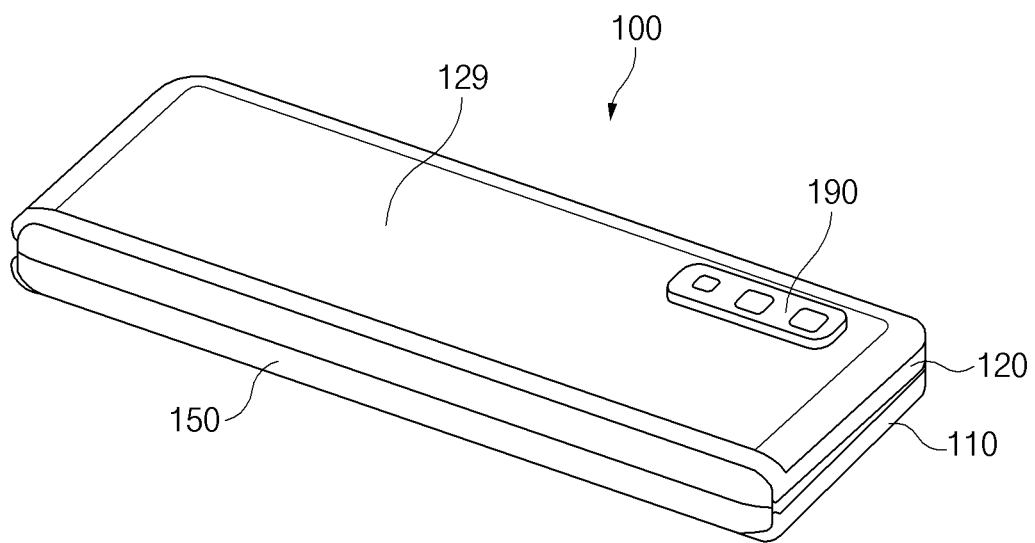
FIG. 1C is a view illustrating an example of a folded state of an electronic device according to certain embodiments.

FIG. 1A is a view illustrating an exploded perspective view of an electronic device according to certain embodiments. FIG. 1B is a view illustrating an example of a rear surface of an electronic device according to certain embodiments. FIG. 1C is a view illustrating an example of a folded state of an electronic device according to certain embodiments.

The electronic device 100 includes a first housing 110 and a second housing 120 coupled to the first housing 110 by a hinge structure 200. A flexible display 160 can have a first portion 161 disposed on the first housing 110, and a second portion 162 disposed on the second housing 120. The first housing 110 and second housing 120 can be unfolded, such that the first housing 110 and the second housing 120 form a substantially single planar surface in an unfolded state (FIG. 1B). In the unfolded state, the display area is larger, however, one dimension is larger, thereby reducing portability. Alternatively, the first housing 110 and the second housing 120 can be folded, such that the first housing and the second housing 120 are stacked onto each other (FIG. 1C).

Referring to FIGS. 1A to 1C, an electronic device 100 (or a foldable electronic device, a flexible display, or a flexible & foldable electronic device) according to an embodiment, may include a housing 101, a hinge housing 150, a hinge structure 200, and a display 160. The housing 101 may include a first housing 110 and a second housing 120. The hinge structure 200 may include a first hinge structure 200a and a second hinge structure 200b. A display 160 may include at least a portion disposed on a forward direction (e.g., the z axis direction) of the hinge structure 200.

Additionally or alternatively, the electronic device 100 may further include a first cover 119 and a second cover 129. The first cover 119 can covers at least a portion of a rear surface of the first housing 110. The second cover 129 can cover at least a portion of a rear surface of the second housing 120. Furthermore, the first cover 119 may integrally form a rear surface of the first housing 110, and the second cover 129 may integrally form a rear surface of the second housing 120.

The housing 101 may be at least a pair of housings that may be rotated about a specific axis. For example, the housing 101 may include the first housing 110 and the second housing 120. The first housing 110 may be disposed to be continuous to the second housing 120 (e.g., when a central part 163 of the display 160 is spread flat or the housing 101 is in an unfolded state), or may be disposed to be stacked onto the second housing 120. Furthermore, when the central part 163 of the display 160 is folded, one surface of the first housing 110 may be disposed to face one surface of the second housing 120.

The first housing 110 may at least by partially formed of a metallic material or at least partially formed of a nonmetallic material. For example, the first housing 110 may be formed of a material having a sufficient strength to support at least a portion of the display 160. A first part 161 of the display 160 may be disposed on at least a portion of the front surface of the first housing 110. Furthermore, at least a portion of the first housing 110 may be bonded to the first part 161 of the display 160. Furthermore, at least a portion of an edge of the front surface of the first housing 110 may be bonded to an edge of the first part 161 of the display 160. Furthermore, at least a portion the front surface (e.g., a surface in the z axis direction) of the first housing 110 may be bonded to at least a portion of the first part 161 of the display 160. In this regard, a bonding layer may be disposed at at least a portion between the first housing 110 and the first part 161 of the display 160. At least a portion of the inside of the first housing 110 may be provided such that the interior thereof is empty or may be provided such that the interior thereof is empty after the first housing 110 is coupled to the first cover 119 so that an electronic element (e.g., an element, such as a printed circuit board, at least one processor mounted on the printed circuit board, at least one memory, or a battery) that is necessary for driving the electronic device 100 may be disposed.

The edges (except for an edge adjoining the second housing 120) of the first housing 110 may protrude by a specific height further than a bottom surface of a central part of the housing to at least partially surround the display 160. Furthermore, side walls, at least portions of which face an edge of the display 160, may be disposed at at least a portion of the edge end of the first housing 110. Side walls formed at at least a portion of an edge of the first housing 110 may have specific heights at the remaining three edges, except for the edge that faces the second housing 120. An edge portion of the first housing 110, which adjoins the second housing 120, may include a recessed part. The recessed part includes at least a portion with a specific curvature to receive at least a portion of the hinge housing 150. For example, the first housing 110 may include a first stepped portion 111 to receive at least a portion of the first hinge structure 200a at an edge facing the second housing 120, and a second stepped portion 112 to receive a second hinge structure 200b.

The second housing 120 may be stacked onto the first housing 110 or may be disposed such that at least the first housing 110 and the second housing 120 form a single substantially continuous surface. For example, the second housing 120 may be formed of the same material as the first housing 110. Because the second housing 120 substantially symmetrical to the first housing 110, a second part 162 of the display 160 and at least a portion of an opposite side of the central part 163 of the display 160 (except for the area disposed in the first housing 110) may be disposed on the front surface of the second housing 120. Furthermore, at least a portion of the second housing 120 may be bonded to the second part 162 of the display 160. Furthermore, an edge of the front surface of the second housing 120 may be bonded to an edge of the second part 162 of the display 160. Furthermore, one side of a lower portion of the front surface of the second housing 120 may be bonded to one side of the second part 162 of the display 160. In this regard, a bonding layer may be disposed at at least a portion between the second housing 120 and the second part 162 of the display 160. At least a portion of the inside of the second housing 120 may be configured such that the interior thereof is empty similarly to the first housing 110 or may be configured such that the interior thereof is empty after the second housing 120 is coupled to the second cover 129 so that electronic elements that are necessary for driving the electronic device 100 may be disposed. According to certain embodiments, a camera 190 may be disposed on the rear surface of the second housing 120, and in relation to disposition of the camera 190, a hole, in which the camera 190 may be disposed, may be formed in the second cover 129.

The edges (except for an edge that adjoining the first housing 110) of the second housing 120 may protrude by a specific height further than a bottom surface of a central part of the second housing 120 to surround an edge of an opposite side of the display 160. Furthermore, similarly to the side walls formed in the first housing 120, side walls, at least portions of which face the edge of the display 160, may be disposed at at least a portion of the edge end of the second housing 120. Side walls formed at at least a portion of an edge of the second housing 120 may have specific heights at the remaining three edges, except for the edge that faces the first housing 110.

A portion of the second housing 120, which faces the first housing 110, may include a recessed part. At least a portion of the recessed part may have a specific curvature to receive the hinge housing 150. For example, the second housing 120 may include a third stepped portion 121. The third stepped portion may receive a portion of the hinge housing 150. The first hinge structure 200a can be disposed at an edge portion that faces the first housing 110. A fourth stepped portion 122 can receive a portion of the hinge housing 150, on which the second hinge structure 200b is mounted.

The electronic device 100 may include at least one sensor disposed on one side of an interior of the first housing 110 or the second housing 120. The sensor, for example, may include at least one of a proximity sensor, an illumination sensor, an iris sensor, an image sensor (or a camera), or a fingerprint sensor.

The hinge housing 150 may be covered by one side of the first housing 110 or the second housing 120 (e.g., an unfolded state of the housing 101) or be exposed to the outside (e.g., a folded state of the housing 101). For example, when the first housing 110 and the second housing 120 are unfolded, the hinge housing 150 may be covered by the first housing 110 and the second housing 120. When one surface of the first housing 110 and one surface of the second housing 120 are disposed to face each other, at least a portion of the hinge housing 150 may be exposed to the outside at edges (e.g., edges of the first housing 110 and the second housing 120, which face each other in the unfolded state) of one side of the first housing 110 and the second housing 120. A side wall may be disposed in the hinge housing 150 such that at least a portion of an interior thereof is empty and at least portions of opposite edges (e.g., edges in the x axis and −x axis directions) are closed. At least one protrusion coupled to the first hinge structure 200a and the second hinge structure 200b may be disposed at at least a portion of the inner surface of the hinge housing 150.

A portion of the display 160 may be flexible. The display 160 may include the first part 161 or the first area disposed on the first housing 110, the second part 162 or the second area disposed on the second housing 120, and the central part 163 or a central area that are adjacent to the first housing 110 and the second housing 120 and corresponds to the location of the hinge structure 200 when the electronic device 100 is in the unfolded state. According to certain embodiments, the entire display 160 may be flexible. Furthermore, at least a portion of the central part 163 of the display 160 may be flexible. The central part 163 of the display 160 might not to be bonded to the first housing 110 and the second housing 120. For example, the central part 163 of the display 160 may be spaced apart from the front surface (e.g., a surface in the z axis direction) of the hinge structure 200 during the folding operation of the electronic device 100. The first part 161 of the display 160 may be bonded to at least a portion of the first housing 110, and the second part 162 of the display 160 may be bonded to at least a portion of the second housing 120. In this regard, bonding layers may be disposed in at least a partial area between the display 160 and the first housing 110 and in at least a partial area between the display 160 and the second housing 120. The display 160 may include various layers. For example, the display 160 may include an external protection layer (or a glass layer or a polymer layer) of a specific size having a specific transparency, a display panel layer disposed under the external protection layer to display a screen, and a first rear surface layer disposed under the display panel layer. The first rear surface layer may include an impact absorbing layer (or an emprotrusioning layer) and a heat dissipating layer (or a metal sheet layer). Additionally or alternatively, the first rear surface layer may further include an electromagnetic induction panel (e.g., a digitizer). According to certain embodiments, the display 160 may further include a second rear surface layer disposed under the first rear surface layer. At least a portion of the second rear surface layer may include at least one metal layer (or a metal sheet) formed of a metallic material. The second rear surface layer may include a specific pattern (e.g., a lattice pattern or a slit pattern) such that at least a portion thereof may be bent. Furthermore, at least a portion of the second rear surface layer may be formed of another material (e.g., a polymer material, rubber, or a leather material) that may be bent.

At least one hinge structure 200 may be disposed with respect to the x axis direction. For example, the hinge structure 200 may include the first hinge structure 200a and the second hinge structure 200b. The hinge structure 200 may include a first part 200_1 disposed on an inside of the hinge housing 150, and a second part 200_2 disposed on the hinge housing 150 or corresponding to a peripheral structure (e.g., a structure coupled to the first housing 110 and the second housing 120) that does not overlap the hinge housing 150 with respect to the z axis.

At least a portion of the first hinge structure 200a of the first part of the hinge structure 200 may be disposed on a first inner side (e.g., an area biased to the x axis direction in the hinge housing 150) of the hinge housing 150. At least a portion of the second hinge structure 200b of the first part of the hinge structure 200 may be disposed on a second inner side (e.g., an area biased to the −x axis direction in the hinge housing 150) of the hinge housing 150. At least a portion of the second part of the hinge structure 200 may be rotated in correspondence to rotation of the first housing 110 and the second housing 120. At least one of the first hinge structure 200a and the second hinge structure 200b according to an embodiment may employ a plurality of detent structures.

Figure 2:
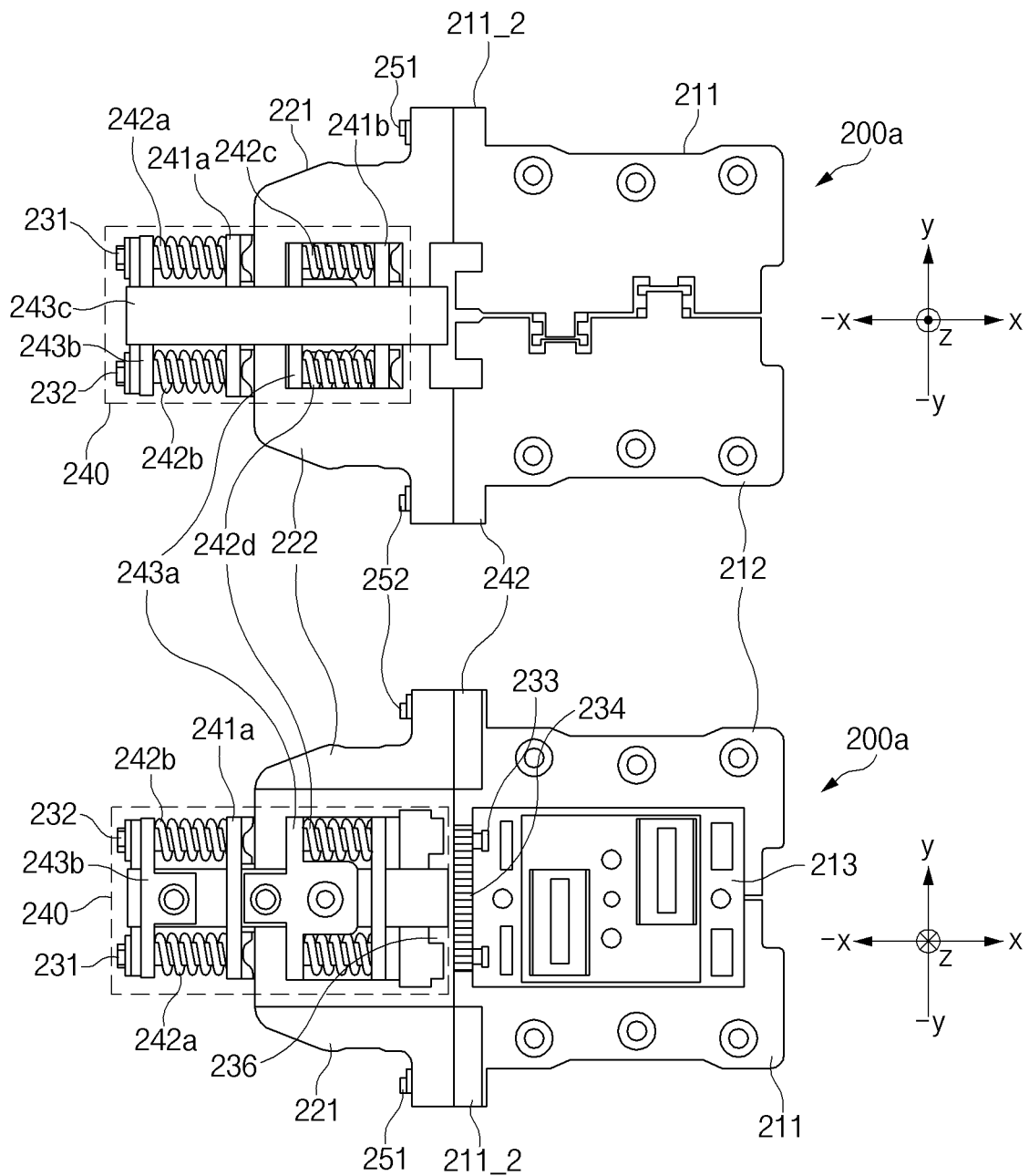
FIG. 2 is a view illustrating an example of a front surface and a rear surface of a hinge structure of an electronic device related to a plurality of detent structures according to certain embodiments.
Figure 3:
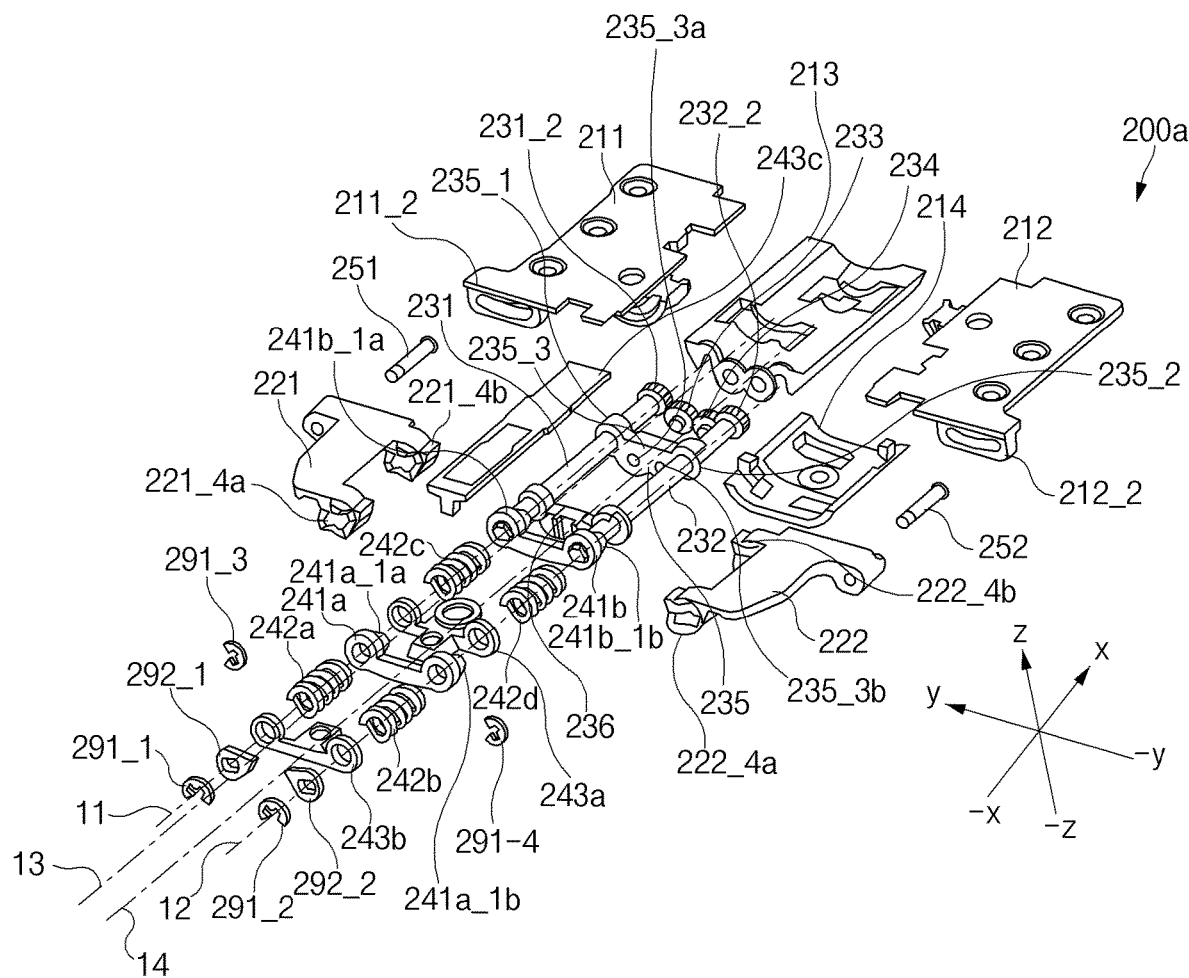
FIG. 3 is a view illustrating a surface of a hinge structure in a first direction of an exploded perspective view according to certain embodiments.
Figure 4:
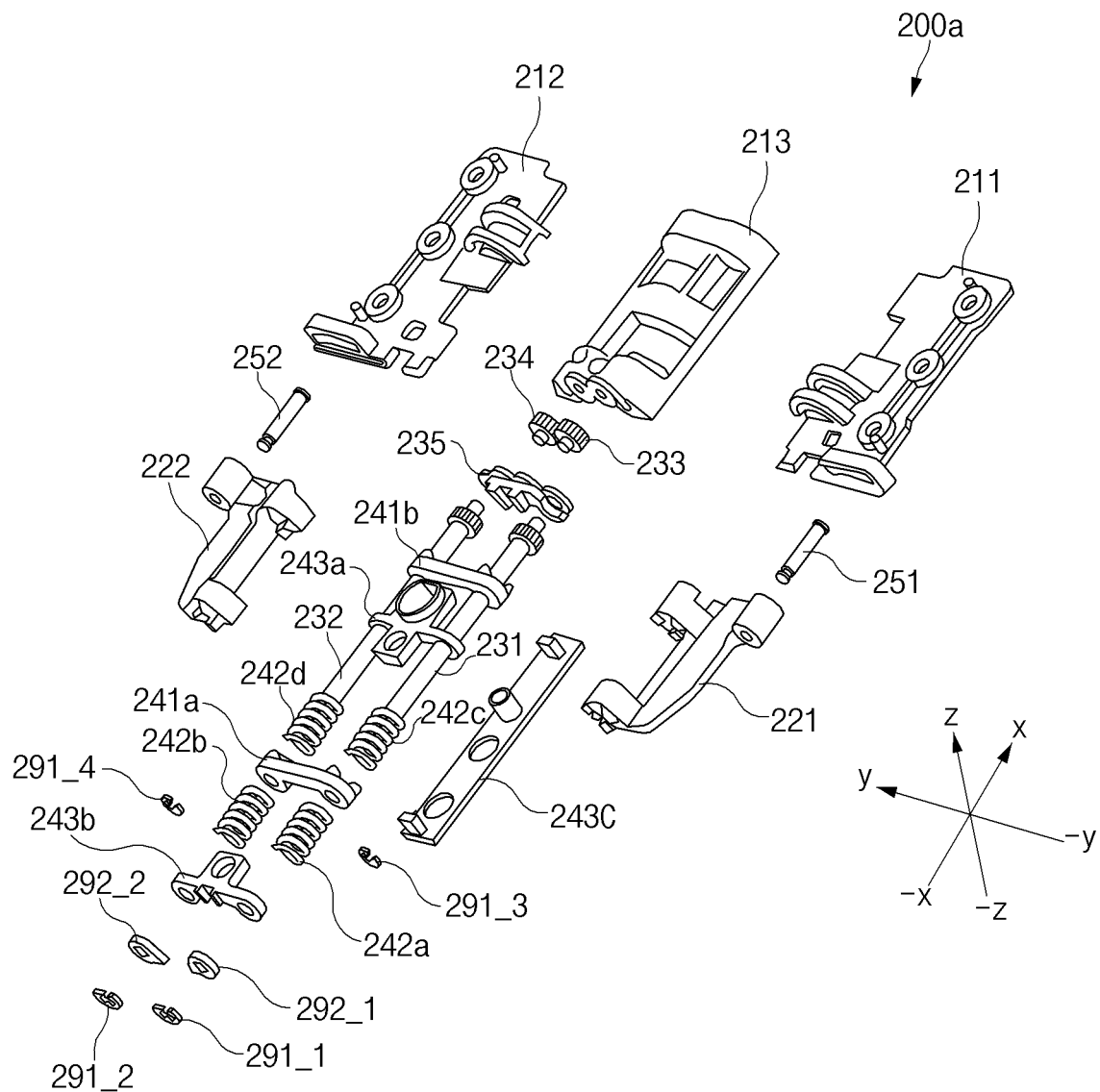
FIG. 4 is a view illustrating a surface of a hinge structure in a second direction of an exploded perspective view according to certain embodiments.

FIG. 2 is a view illustrating an example of a front surface and a rear surface of a hinge structure of an electronic device related to a plurality of detent structures according to certain embodiments. FIG. 3 is a view illustrating a surface of a hinge structure, in a first direction of an exploded perspective view according to certain embodiments. FIG. 4 is a view illustrating a surface of a hinge structure in a second direction of an exploded perspective view according to certain embodiments.

A hinge structure, such as hinge structure 200a can include rotations parts 211 and 212 disposed in a fixing bracket 213. When the electronic device is in the unfolded state, the rotation parts 211 and 212 lie flat and side-by-side, with edges of the rotation parts 211 and 212 abutting each other. When the electronic device is in the folded state, the edges of the rotation parts 211 and rotation parts 212 separate. The rotation parts 211 and 212 form separated and parallel planes. The fixing bracket 213 may be orthogonal to both the rotation parts 211 and 212.

The electronic device 100 according to an embodiment may include the first hinge structure 200a and the second hinge structure 200b that may have the same structure and shape with each other. In the following description, the first hinge structure 200a will be referenced.

The first hinge structure 200a may include rotation parts 211 and 212, a fixing bracket 213, arm parts 221 and 222, idle gears 233 and 234, and a multi-detent structure 240.

The rotation parts 211 and 212 may form driving loci of the display 160. The rotation parts 211 and 212 may include the first rotation part 211 coupled to one side of the fixing bracket 213 and a second rotation part 212 coupled to an opposite side of the fixing bracket 213. The first rotation part 211 may be rotated (e.g., a clockwise direction or a counterclockwise direction with respect to the x axis) in a first angle range while being coupled to one side of the fixing bracket 213. The second rotation part 212 may be rotated (e.g., a counterclockwise direction or a clockwise direction with respect to the x axis) in a second angle range while being coupled to one side of the fixing bracket 213.

Sizes of the first angle range and the second angle range may be the same, and directions thereof may be opposite to each other. When the electronic device 100 is in the unfolded state, an edge of the first rotation part 211 in the −y axis direction may be adjacent to an edge of the second rotation part 212 in the y axis direction. When the electronic device 100 is in the folded state, an upper surface (e.g., a surface that faces the z axis direction) of the first rotation part 211 and an upper surface (e.g., a surface that face the z axis direction) of the second rotation part 212 may face each other. According to an embodiment, the first rotation part 211 may be rotated within a specific angle range (e.g., 0 to 100 degrees or 0 to 95 degrees) about a third axis (13 of FIG. 14) (or a third imaginary axis). According to an embodiment, the second rotation part 212 may be rotated within a specific angle range (e.g., 0 to −100 degrees or 0 to −95 degrees) about a fourth axis (14 of FIG. 14) (or a fourth imaginary axis). The third axis 13 and the fourth axis 14 may be spaced apart from each other by a specific interval. The third axis 13 and the fourth axis 14 may be located on an upper side of a first axis 11 and a second axis 12 with respect to the z axis.

At least a portion of the fixing bracket 213 may be disposed in and fixed to an inner empty space of the hinge housing 150. In this regard, at least a portion of the fixing bracket 213 may have a size corresponding to the inner empty space of the hinge housing 150. Furthermore, at least a portion of the fixing bracket 213 may have a shape corresponding to the inner empty space of the hinge housing 150, for example, a semi-cylindrical shape. The fixing bracket 213 may include at least one hole to receive at least one protrusion formed in the hinge housing 150. One side of the first rotation part 211 may be disposed on one side of the fixing bracket 213 to be rotatable within a specific angle range, and one side of the second rotation part 212 may be disposed on an opposite side of the fixing bracket 213 to be rotatable within a specific angle range. Portions (e.g., one side of a first rotary shaft 231 and one side of a second rotary shaft 232) of the multi-detent structure 240 and portions of the idle gears 233 and 234 may be disposed on one side (an end in the −x axis direction) of a front surface of the fixing bracket 213.

The first hinge structure 200a may further include a bracket cover 214 disposed in a rearward direction (e.g., −z axis direction) of the fixing bracket 213 and coupled to a rear surface (e.g., a surface that is viewed from the −z axis toward the z axis) of the fixing bracket 213.

The arm parts (or the arm structures) 221 and 222 may implement detent operations while being slid on one side of the rotation parts 211 and 212 in correspondence to rotation of the rotation parts 211 and 212 of the electronic device 100, being rotated about the rotary shafts (e.g., the first rotary shaft 231 and the second rotary shaft 232), and being engaged with cam members 241a and 241b. For example, sides of the rotation parts 211 and 212 are connected to the arm parts 221 and 222 through coupling parts 251 and 252, and according to rotation of the rotation parts 211 and 212, the arm parts 221 and 222 may be moved while being slid along at least portions of sides of the rotation parts 211 and 212. The arm parts 221 and 222, for example, may include the first arm part 221 connected to the first rotation part 211 through the first coupling part 251, and the second arm part 222 connected to the second rotation part 212 through the second coupling part 252. The first arm part 221 may include a first cam structure 221_4a and a second cam structure 221_4b coupled to the cam members 241a and 241b included in the multi-detent structure 240, and the second arm part 222 may include a third cam structure 222_4a and a fourth cam structure 222_4b coupled to the cam members 241a and 241b included in the multi-detent structure 240. The first cam structure 221_4a and the second cam structure 221_4b coupled to the cam members 241a and 241b may implement a detent of a cam type during folding and unfolding operations of the electronic device 100. The first arm part 221 and the second arm part 222 may provide a hinge force (or a feeling of a detent) by using the cam structures 211_4a, 221_4b, 222_4a, and 222_4b engaged with the cam members 241a and 241b. The arm parts 221 and 222 may support an improved anti-wear property and a softer hinge force (or a feeling of a detent) through the multi-detent structure 240 while providing a firmer and more stable hinge force (or a feeling of a detent) based on the multi-detent structure 240.

According to certain embodiments, the multi-detent structure 240 may include the first rotary shaft 231, the second rotary shaft 232, a rotary shaft support member 235, a stopper 236, the first cam member 241a, the second cam member 241b, a center bar 243c, a center bracket 243a, a shaft bracket 243b, support rings 292_1 and 292_2, a plurality of fixing clips 291_1, 291_2, 291_3, and 291_4, and a plurality of springs (or elastic bodies) 242a, 242b, 242c, and 242d.

According to certain embodiments, the first rotary shaft 231 and the second rotary shaft 232 may provide a cam type hinge force (or a feeling of a detent). The first rotary shaft 231 and the second rotary shaft 232 may have lengths that are longer than a spacing distance between the cam structures formed in the arm parts 221 and 222. The first rotary shaft 231 and the second rotary shaft 232 may be disposed to be spaced apart from each other, and may be disposed in parallel in the x axis direction. Shaft gears 232_1 and 232_1 may be formed in the first rotary shaft 231 and the second rotary shaft 232, respectively, and the shaft gears 231_1 and 232_1 may be disposed to be engaged with different idle gears (e.g., the first idle gear 233 and the second idle gear 234). Accordingly, the arm parts 221 and 222 of the hinge structure 200 may be rotated at the same time point and at the same angle due to the forces generated while the first rotation part 211 and the second rotation part 212 are rotated. The first rotary shaft 231 may be rotated about the first axis 11, and the second rotary shaft 232 may be rotated about the second axis 12.

According to certain embodiments, one side of the rotary shaft support member 235, one side of the stopper 236, one side of the center bracket 243a, one side of the shaft bracket 243b, the first support ring 292_1, and the first fixing clip 291_1 may be inserted into the first rotary shaft 231. A first cam 241a_1a formed in the first cam member 241a, a third cam 241b_1a formed in the second cam member 241b, a first cam structure 221_4a and a second cam structure 221_4b of the first arm part 221, the first spring 242a, and the third spring 242c may be inserted into the first rotary shaft 231. A first shaft gear 231_2 may be formed in the first rotary shaft 231, and at least a portion of the first shaft gear 231_2 may be disposed to be engaged with the first idle gear 233. One end (e.g., an end in the x axis direction) of one side of the first rotary shaft 231 may be disposed on one side surface (e.g., an end in the −x axis direction) of the fixing bracket 213.

According to certain embodiments, an opposite side of the rotary shaft support member 235, an opposite side of the stopper 236, an opposite side of the center bracket 243a, an opposite side of the shaft bracket 243b, the second support ring 292_2, and the second fixing clip 291_2 may be inserted into the second rotary shaft 232. A second cam 241a_1b formed in the first cam member 241a, a fourth cam 241b_1b formed in the second cam member 241b, the third cam structure 222_4a and the fourth cam structure 222_4b of the second arm part 222, the second spring 242b, and the fourth spring 242d may be inserted into the second rotary shaft 232. A second shaft gear 232_2 may be formed in the second rotary shaft 232, and at least a portion of the second shaft gear 232_2 may be disposed to be engaged with the second idle gear 234. One end (e.g., an end in the x axis direction) of one side of the second rotary shaft 232 may be disposed on one side surface (e.g., an end in the −x axis direction) of the fixing bracket 213.

According to certain embodiments, the rotary shaft support member 235 may include a first ring 235_1 coupled to the first rotary shaft 231, a second ring 235_2 connected to the second rotary shaft 232, and a ring body 235_3 that faces sides of the idle gears 233 and 234 while connecting the first ring 235_1 and the second ring 235_2. The ring body 235_3 may include a first hole 235_3a, into which one side of the first idle gear 233 may be inserted, and a second hole 235_2b, into which one side of the second idle gear 234 may be inserted. The rotary shaft support member 235 may be disposed between the stopper 236 and the shaft gears 231_2 and 232_2 formed in the rotary shafts 231 and 232. The rotary shaft support member 235 may guide the idle gears 233 and 234 such that the idle gears 233 and 234 do not deviate from specific locations while surrounding at least portion of the idle gears 233 and 234.

According to certain embodiments, the center bar 243c may have a bar shape, of which an x axis length is larger than a y axis length, may be disposed between the first rotary shaft 231 and the second rotary shaft 232, and thus cover a space between the first rotary shaft 231 and the second rotary shaft 232. The center bar 243c may include at least one protrusion (or boss) formed in the −z axis direction. The at least one protrusion may be coupled to a hole formed in the center bracket 243a and a hole formed in the shaft bracket 243b. The center bar 243c may be moved in the z axis or −z axis direction according to rotation of the first arm part 221 and the second arm part 222. For example, the center bar 243c may be lowered in the −z axis direction by a specific distance to secure a distance from the display 160 such that the center bar 243c is moved in the z axis direction to support the display 160 in the unfolded state of the electronic device 100 and the display 160 is prevented from being damaged by a drop impact or an external force in the folded state of the electronic device 100.

According to certain embodiments, the shaft bracket 243b may be disposed between the support rings 292_1 and 292_2, and the first spring 242a and the second spring 242b. The shaft bracket 243b may include ring-shaped wings, into which the first rotary shaft 231 and the second rotary shaft 232 may be inserted, and may include body that supports the wings. The shaft bracket 243b may be coupled to the protrusion formed in the center bar 243c. The shaft bracket 243b may guide the first rotary shaft 231 and the second rotary shaft 232 such that a specific interval may be maintained therebetween while they are rotated.

According to certain embodiments, the plurality of fixing clips 291_1, 291_2, 291_3, and 291_4 may include the first fixing clip 291_1 coupled to one side (e.g., an end in the −x axis direction) of the first rotary shaft 231, the second fixing clip 291_2 coupled to one side (e.g., an end in the −x axis direction) of the second rotary shaft 232, the third fixing clip 291_3 coupled to one side (e.g., an end in the −x axis direction) of the first coupling part 251, and the fourth fixing clip 291_4 coupled to one side (e.g., an end in the −x axis direction) of the second coupling part 252. The first fixing clip 291_1 may function to fix configurations inserted into the first rotary shaft 231 (e.g., at least one of the first support ring 292_1, one side of the shaft bracket 243b, the first spring 242a, the first cam 241a_1a, one side of the center bracket 243a, the third spring 242c, the third cam 241b_1a, one side of the stopper 236, and one side of the rotary shaft support member 235) such that the configurations do not deviate to one side (in the −x axis direction). The second fixing clip 291_2 may function to fix configurations inserted into the second rotary shaft 232 (e.g., at least one of the second support ring 292_2, an opposite side of the shaft bracket 243b, the second spring 242b, the second cam 241a_1b, an opposite side of the center bracket 243a, the fourth spring 242d, the fourth cam 241b_1b, an opposite side of the stopper 236, and an opposite side of the rotary shaft support member 235) such that the configurations do not deviate to one side (in the −x axis direction). The third fixing clip 291_3 may function to prevent the first coupling part 251 that is inserted through the first arm part 221 and the first rotation part 211 from being separated from the first arm part 221 or the first rotation part 211 while the first arm part 221 is slid along a side surface of the first rotation part 211. The fourth fixing clip 291_4 may function to prevent the second coupling part 252 that is inserted through the second arm part 222 and the second rotation part 212 from being separated from the second arm part 222 or the second rotation part 212 while the second arm part 222 is slid along a side surface of the second rotation part 212.

According to certain embodiments, the plurality of springs 242a, 242b, 242c, and 242d, for example, may include the first spring 242a disposed between one side of the shaft bracket 243b and the first cam 241a_1a of the first cam member 241a, the second spring 242b disposed between an opposite side of the shaft bracket 243b and the second cam 241a_1b of the first cam member 241a, the third spring 242c disposed between one side of the center bracket 243a and the third cam 241b_1a of the second cam member 241b, and the fourth spring 242d disposed between an opposite side of the center bracket 243a and the fourth cam 241b_1b of the second cam member 241b. The plurality of springs 242a, 242b, 242c, and 242d may apply force that is necessary for cam operations of the first cam member 241a and the second cam member 241b. According to an embodiment, to provide the same hinge force (the same feeling of a detent) during rotation of the electronic device 100, the first spring 242a and the second spring 242b (or the third spring 242c and the fourth spring 242d) may have the same characteristics. For example, the plurality of springs 242a, 242b, 242c, and 242d may have spring structures that have the same or similar lengths, the same or similar thicknesses, and the same or similar diameters. Furthermore, the plurality of springs 242a, 242b, 242c, and 242d may have lengths, thicknesses, or diameters (e.g., the first spring 242a and the second spring 242b have a first length, a first thickness, and a first diameter that are the same or similar, and the third spring 242c and the fourth spring 242d have a second length (e.g., a second length that is different from the first length), a second thickness (e.g., a second thickness that is different from the first thickness), and a second diameter (e.g., a second diameter that is different from the first diameter)) that are different.

As described above, the hinge structures 200a and 200b according to an embodiment may include the rotation parts 211 and 212 that are coupled to the hinge housing 150 and the housings 110 and 120 and involve in an operation of folding or unfolding the display 160 positioned on an upper side thereof, the multi-detent structure 240 connected to the rotation parts 211 and 212, and the gear structures (e.g., the shaft gear of the first rotary shaft 231, the shaft gear of the second rotary shaft 232, and the idle gears 233 and 234) that support simultaneous rotations of the first housing 110 and the second housing 120.

Based on this, the hinge structures 200a and 200b may be rotated about an axis (or the third axis 13 and the fourth axis 14) formed on an upper side of surfaces of the rotation parts 211 and 212 to fold or unfold the display 160, may provide an improved feeling of a detent based on the cam structures, and may support simultaneous hinge operations of the housings 110 and 120 based on the gear structures (e.g., the shaft gear in the first rotary shaft 231, the shaft gear in the second rotary shaft 232, and the idle gears 233 and 234) to restrain distortion of the housings 110 and 120 in a hinge operation process. Furthermore, the hinge structures 200a and 200b may support a temporary fixed state including a partially folded state at a specific angle, for example, between 30 degrees to 60 degrees (an included angle between the front surface of the first housing 110 and the front surface of the second housing 120) as well as the unfolded state or the folded state of the housings 110 and 120.

In the hinge structure according to an embodiment, a force (or an elastic force) applied to a cam operation has to be increased to increase a load of a detent, and in this regard, a free length of the spring has to be prolonged, the number of windings of the spring has to be reduced, or a wire diameter of the spring has to be increased, but the prolongation of the free length and the reduction of the number of windings cause a mere load increase effect and an allowable spring stress limit value may be exceeded, and thus the spring may be damaged. Meanwhile, an inner diameter of the spring has to be reduced or an outer diameter of the spring has to be increased to increase a load of the spring, but when the inner diameter is reduced, the diameters of the rotary shafts 231 and 232 has to be reduced, the concentricity of the rotary shafts 231 and 232 is lowered, and they may be deflected in a part manufacturing process. Furthermore, when the outer diameter is increased, interferences of peripheral parts related to the spring may occur, and a condition (e.g., an increase in the thickness of the hinge structure and accordingly, an increase of the thickness of the electronic device 100) that requires an additional space for excluding the interferences of the parts may be required. Furthermore, when the force of the spring is increased in a limited way, a load may be concentrated on the cam parts and wearing thereof may be worsened. In this regard, the hinge structures 200a and 200b of the electronic device 100 according to certain embodiments may increase a maximum load and a normal load that are applied to the cam operations due to the plurality of springs 242a, 242b, 242c, and 242d in a state, in which the plurality of cam members 241a and 241b and the arm parts 221 and 222 are coupled to each other, reduce an increase of spaces (prevent reduction or enlargement of the thickness of the hinge structure), and improve a wearing performance (e.g., the loss of the load is reduced according to the numbers of the cam structures and the cams when the numbers are increased, for example, four cam structures provide a quarter of the loss load as compared with an environment using one cam structure). According to certain embodiments, lengths of the first spring 242a and the third spring 242c may be the same, and lengths of the second spring 242b and the fourth spring 242d may be the same. According to certain embodiments, in a state, in which the lengths of the first spring 242a and the third spring 242c are different and the lengths of the second spring 242b and the fourth spring 242d are different, a sum of the lengths of the first spring 242*a* and the third spring 242*c* may be the same as a sum of the lengths of the second spring 242*b* and the fourth spring 242*d*.

The rotation part 212 (FIG. 5) can include a rail 212_3 and housing coupling hole(s) 212_4. The rotation part 212 can be coupled to one of the first housing 110 or second housing 120 with a fastener disposed in the coupling hole(s) 212_4 that fasten the housing to the rotation part 212. The rail 212_3 can be disposed in fixing bracket 213 (FIG. 6). The fixing bracket 213 a groove 213*a*/213*b* to receive the rail 212_3 from the rotation part 212. The groove 213*a*/213*b* can permit the rail to slide therein.

Figure 5:
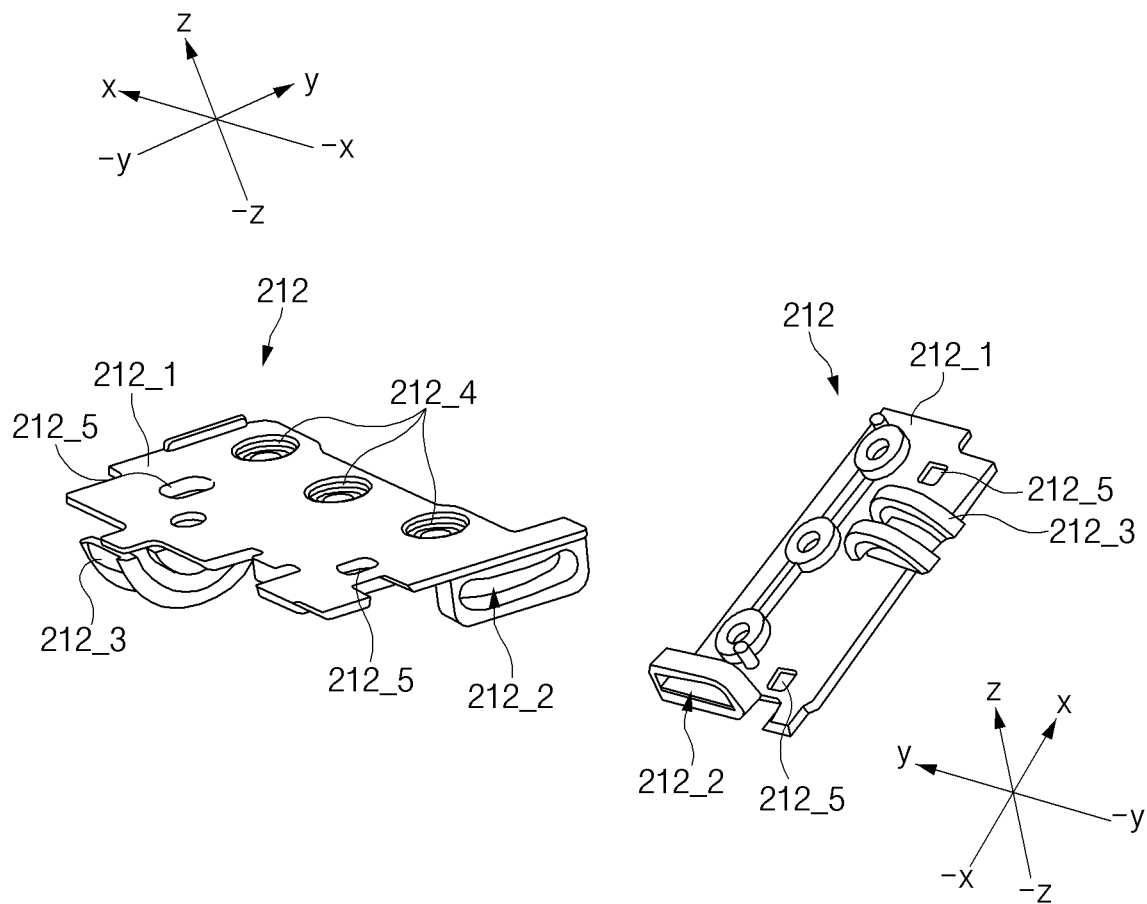
FIG. 5 is a view illustrating an example of a rotation part according to an embodiment.
Figure 6:
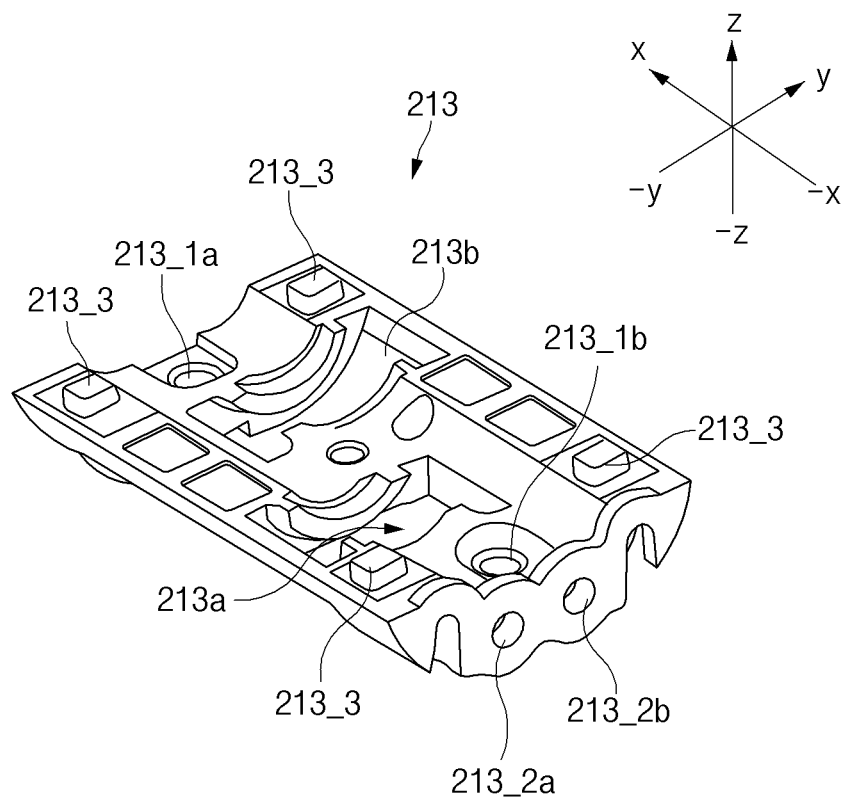
FIG. 6 is a view illustrating an example of a fixing bracket according to an embodiment.

FIG. 5 is a view illustrating an example of a rotation part according to an embodiment. Prior to a description, the rotation part illustrated in FIG. 5 exemplifies the second rotation part described above in FIGS. 3 and 4. The second rotation part 212 may have the same size, the same shape, and the same material except for a structure that is symmetrical leftwards and rightwards to the first rotation part 211 with respect to the first axis 11 (or the second axis 12). In the following description, the second rotation part 212 will be described as the structure of the rotation part.

Referring to FIG. 5, the second rotation part 212 may include a bracket body 212_1, a slide hole 212_2 formed at an end (e.g., an end in the −x axis direction) on one side of the bracket body 212_1, a rail 212_3 formed at an end (e.g., an end in the −y axis direction) on an opposite side of the bracket body 212_1, and a housing coupling hole 212_4 used for coupling to the second housing 120 (e.g., the second housing 120 of FIG. 1). The first rotation part 211 described above in FIG. 3 or FIG. 4, the first rotation part 211, similarly to the second rotation part 212, may include a bracket body, a slide hole, a rail, and a housing coupling hole.

According to certain embodiments, an x axis length of the bracket body 212_1 may be larger than a y axis length thereof, at least a portion of a surface thereof, which faces the z axis may be flat, and at least a portion of a surface thereof, which faces the −z axis also may be flat. With reference to the illustrated drawings, the slide hole 212_2 may be formed to face a downward direction (e.g., the −z axis direction) at a right end (e.g., an end in the −x axis direction) of the bracket body 212_1, and the rail 212_3 may be disposed to face a lower surface (e.g., a surface in the −z axis direction) thereof at an end (e.g., an end in the −y axis direction) of the bracket body 212_1. At least one housing coupling hole 212_4 used for coupling to the second housing 120 may be disposed in the bracket body 212_1. In the illustrated drawings, a form, in which three housing coupling holes 212_4 are disposed, is illustrated, the disclosure is not limited thereto. For example, two or more housing coupling holes 212_4 may be formed, and the two or more housing coupling holes 212_4 may be disposed to be spaced apart from the bracket body 212_1. According to certain embodiments, at least one bracket coupling hole 212_5 may be disposed in the bracket body 212_1. The bracket coupling hole 212_5 may be coupled to a coupling protrusion formed in the fixing bracket 213 when the electronic device 100 is in the unfolded state, and may be separated from the coupling protrusion of the fixing bracket 213 when the electronic device 100 is in the folded state. The number of bracket coupling holes 212_5 may correspond to the number of coupling protrusions of the fixing bracket 213.

According to certain embodiments, the slide hole 212_2 may be disposed at an opposite end (e.g., an end in the −x axis direction) of the bracket body 212_1, and may be disposed at a lower portion of the bracket body 212_1. A length of the slide hole 212_2 in the first direction (e.g., the y axis direction) may be longer than a length thereof in a third direction (e.g., the x axis direction). Accordingly, the second coupling part 252 inserted into the slide hole 212_2 may be slid in any one of the first direction (e.g., the y axis direction) and the second direction (e.g., the −y axis direction) in the slide hole 212_2. The slide hole 212_2 may be disposed to face a surface (e.g., a surface disposed in the −x axis direction) in a fourth direction of the second arm part 222. At least a partial area of the slide hole 212_2 may be aligned with a connection hole of the second arm part 222. Accordingly, at least a portion of the second coupling part 252 may be disposed on an inside of the slide hole 212_2 and the connection hole.

According to certain embodiments, the rail 212_3 may be disposed at an end (e.g., an end in the −y axis direction) of the bracket body 212_1 in the second direction, and may be disposed at a lower portion of the bracket body 212_1. The rail 212_3 may have an arc shape of a specific angle. The rail 212_3 may be inserted into a rail grove (or a rail type hole) disposed in the fixing bracket 213, and may be rotated along the rail groove in a specific rotation range. According to an embodiment, the rotation range of the rail 212_3 may be included within an angle of an arc that forms the shape of the rail 212_3. For example, the rotation range of the rail 212_3 may be at least a partial range (e.g., a range of 0 degrees to 95 degrees) in −10 degrees to 100 degrees. The rail 212_3 may be rotated between the −z axis and the z axis with respect to the fourth axis 14 formed by the rail groove of the fixing bracket 213.

The housing coupling hole 212_4 may be formed on one side (e.g., an edge of one side that faces they axis direction) of the bracket body 212_1, and may be formed to pass through a surface (e.g., a surface in the y axis direction) in the first direction and a surface (e.g., a surface in the −y axis direction) in the second direction. Although it is exemplified in the illustrated drawings that three housing coupling holes 212_4 are formed in the bracket body 212_1, the disclosure is not limited to the number.

FIG. 6 is a view illustrating an example of a fixing bracket according to an embodiment.

Referring to FIG. 6, at least a portion of a shape of a lower surface (e.g., a surface in the −z axis direction) of the fixing bracket 213 may include a curved surface. For example, a lower surface of the fixing bracket 213 may be formed to correspond to an inner shape of the hinge housing (e.g., the hinge housing 150 of FIG. 1). At least a portion of the upper surface (e.g., a surface in the z axis direction) of the fixing bracket 213 may have a flat shape, and rail grooves (or the rail grooves) 213*a* and 213*b* may be formed such that the rotation parts (e.g., the rotation parts 211 and 212 of FIG. 2) are coupled thereto. According to an embodiment, the fixing bracket 213 may include a first rail groove 213*a*, of which at least a portion of a z axis cross-section (e.g., a cross-section taken from the z axis direction to the −z axis direction) has an arc shape, and into which the rail of the first rotation part 211 is inserted from the first direction (e.g., they axis direction) to the second direction (e.g., the −y axis direction).

The fixing bracket 213 may include a second rail groove 213*b*, of which at least a portion of a z axis cross-section (e.g., a cross-section taken from the z axis direction to the −z axis direction) has an arc shape, and into which the rail 212_3 of the second rotation part 212 is inserted from the second direction (e.g., the −y axis direction) to the first direction (e.g., they axis direction). The first rail groove 213*a* may be disposed to be biased to the −y axis direction as compared with the second rail groove 213*b*, and the second rail groove 213*b* may be disposed to be biased to the y axis direction as compared with the first rail groove 213*a*. The first rail groove 213*a* may be rotated about the third axis 13, and the second rail groove 213*b* may be rotated about the fourth axis 14. The third axis 13 and the fourth axis 14 may be formed on an upper side of an upper surface (e.g., a surface in the z axis direction) of the fixing bracket 213, and the third axis 13 and the fourth axis 14 may be formed to be spaced apart from each other by the first rail groove 213*a* disposed to be biased in the −y axis direction and the second rail groove 213*b* disposed to be biased in they axis direction. According to an embodiment, the fixing bracket 213 may include a first recess 213_2*a* formed at a side thereof disposed in a third direction (e.g., the x axis direction) and in which one end of the first rotary shaft 231 is disposed, and a second recess 213_2*b*, in which one end of the second rotary shaft 232 is disposed.

According to certain embodiments, the fixing bracket 213 may include a first fixing hole 213_1*a* and a second fixing hole 213_1*b* that are used to fix the fixing bracket 213 to the hinge housing 150. In the electronic device 100, the fixing bracket 213 may be fixed to the hinge housing 150 by using a coupling member (e.g., a coupling member such as a screw). According to an embodiment, the first fixing hole 213_1*a* and the second fixing hole 213_1*b* may be disposed to be symmetrical to each other in a diagonal direction from the upper surface (e.g., a surface in the z axis direction) of the fixing bracket 213 to fix the fixing bracket 213 to the hinge housing 150 more firmly and stably.

According to certain embodiments, the fixing bracket 213 may include at least one bracket protrusion 213_3 that is inserted into the bracket coupling hole 212_5 formed in the first rotation part 211. Additionally, the bracket coupling hole also may be formed in the second rotation part 212 in the same way as the first rotation part 211, and the fixing bracket 213 may include bracket basses having the same shape at locations that are symmetrical to the bracket protrusion 213_3 inserted into the bracket coupling hole 212_5 of the first rotation part 211 with respect to the −x axis. According to an embodiment, a plurality of bracket protrusions 213_3 may be disposed on a surface of the fixing bracket 213 in the z axis direction. For example, the plurality of bracket protrusions 213_3 may be disposed at corners of a surface of the fixing bracket 213 in the z axis direction.

The electronic device can include a first arm part 221 and a second arm part 222. The arm parts 221 and 222 may be coupled to the fixing members 211, 212. The arm parts 221 and 222 can facilitate inclusion of a cam structure and a rotary shaft.

Figure 7:
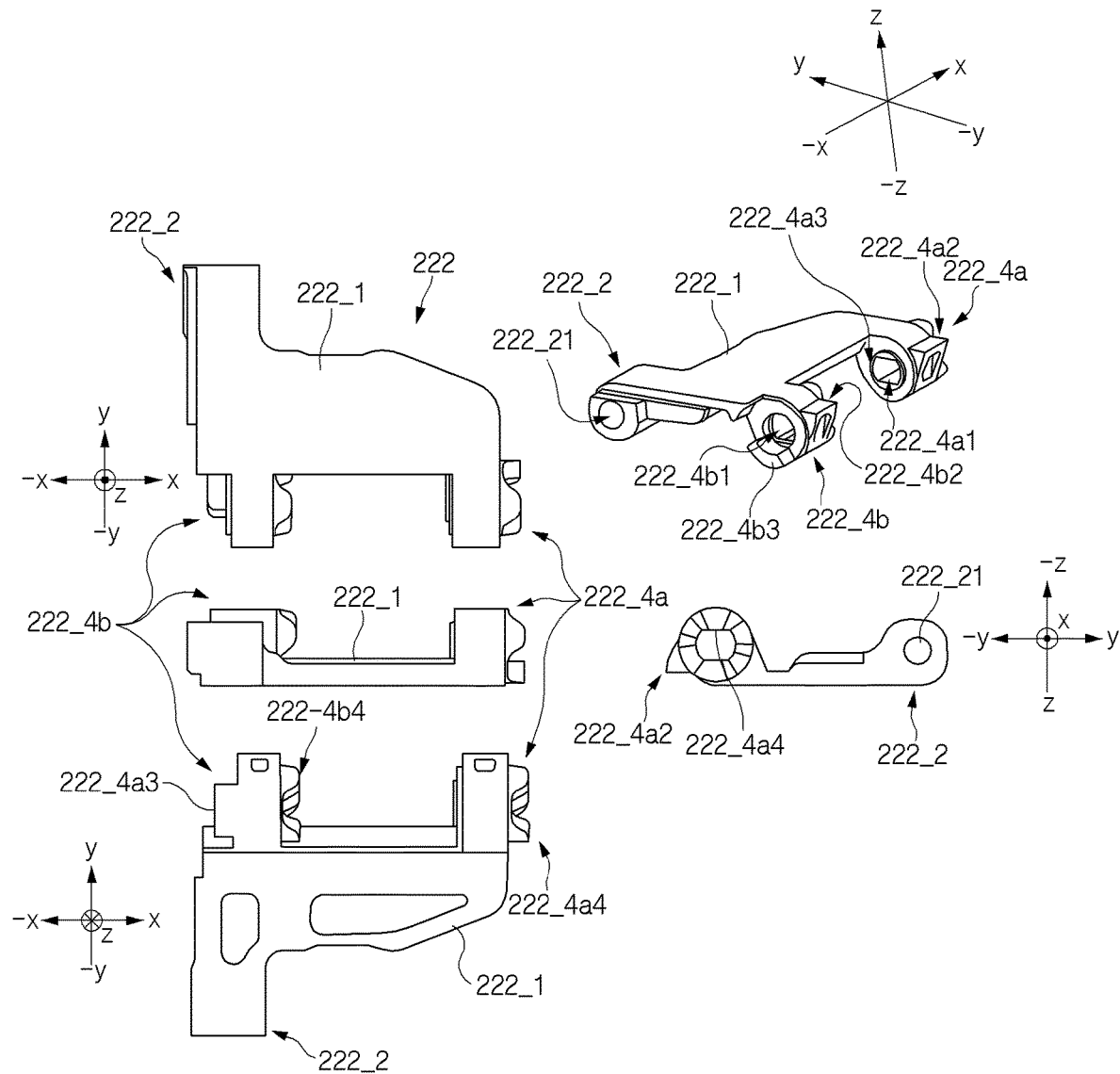
FIG. 7 is a view illustrating an example of an arm part according to an embodiment.

FIG. 7 is a view illustrating an example of an arm part according to an embodiment. Prior to a description, the arm part illustrated in FIG. 7 is a view illustrating a second arm part with reference to FIG. 3. The second arm part 222 may have a shape (e.g., a shape that is symmetrical with respect to the x axis) that is similar to that of the first arm part 221, and may have a size and a material that are the same as those of the first arm part 221. In the following description, the second arm part will be referenced.

The second arm part 222 may be coupled to the second rotation part 212 through the second coupling part (e.g., the second coupling part 252 of FIG. 3), and may be rotated in conjunction with the second rotation part 212 during a hinge operation. According to an embodiment, the second arm part 222 may include a basic body 222_1, a connector 222_2, the third cam structure 222_4*a*, and the fourth cam structure 222_4*b*.

At least a portion of an upper surface (e.g., a surface disposed in the z axis direction) of the basic body 222_1 may be formed flat. The connector 222_2 may be disposed at at least a portion of a lower surface (e.g., a surface in the −z axis direction) of an upper edge (e.g., an end in the y axis direction) of the basic body 222_1. The connector 222_2 may be a ring shape or a pipe shape having a specific thickness. For example, the connector 222_2 may include a hole 222_21 that is opened in the third direction (e.g., the x axis direction) (or the −x axis direction). At least a portion of the second coupling part 252 may be disposed in the hole 222_21 of the connector 222_2. In this regard, a size of the hole 222_21 of the connector 222_2 may have a size that is similar to a diameter of the second coupling part 252. The third cam structure 222_4*a* and the fourth cam structure 222_4*b* may be disposed on a lower surface (e.g., a surface in the −z axis direction) of an edge (e.g., an end in the −y axis direction) on a lower side of the basic body 222_1. The third cam structure 222_4*a* and the fourth cam structure 222_4*b* may be disposed at an edge of the basic body 222_1 in the −y axis direction, and the connector 222_2 may be disposed at an edge of the basic body 222_1 in the y axis direction.

According to certain embodiments, the third cam structure 222_4*a* may include a first coupling hole 222_4*a*1 of a uniform diameter that faces the −x axis direction from the x axis, a first holding part 222_4*a*2 that supports the center bar 243*c*, a step 222_4*a*3, at least a portion of which is engaged with the center bracket 243*a*, and a first cam protrusion 222_4*a*4 for a cam operation.

According to certain embodiments, at least a portion of the second rotary shaft 232 may be inserted into the first coupling hole 222_4*a*1. The first coupling hole 222_4*a*1 may have a shape that is the same as or similar to a cross-section (e.g., a cross-section taken from the z axis direction to the −z axis direction) of one side of the second rotary shaft 232. For example, at least a partial cross-section (e.g., a cross-section of the first coupling hole 222_4*a*1 when the third cam structure 222_4*a* is taken from the z axis direction to the −z axis direction) of the first coupling hole 222_4*a*1 may include a straight line. The first coupling hole 222_4*a*1 may be disposed on the same axis (e.g., the second axis 12) as a second coupling hole 222_4*b*1 of the fourth cam structure 222_4*b*.

According to certain embodiments, the first holding part 222_4*a*2 may protrude from one side of a peripheral portion that forms the first coupling hole 222_4*a*1 in the −y axis direction by a specific length. At least a portion of a z axis cross-section of the first holding part 222_4*a*2 may have a triangular shape. According to certain embodiments, a size of the z axis cross-section of the first holding part 222_4*a*2 may gradually decrease as it goes from the y axis to the −y axis. An upper surface (e.g., a surface that faces the z axis direction) of the first holding part 222_4*a*2 may be lower than an upper surface (e.g., a surface that faces the z axis direction) of the basic body 222_1 with respect to the z axis. According to an embodiment, the first holding part 222_4*a*2 may protrude from a side (e.g., one point in the −y axis direction) of a peripheral portion of the first coupling hole 222_4*a*1 in the −y axis direction while being located between an upper side (e.g., one point in the z axis direction) and a lower side (e.g., one point in the −z axis direction) of the peripheral portion that forms the first coupling hole 222_4*a*1. The first holding part 222_4*a*2 may be integrally formed with the peripheral portion that forms the first coupling hole 222_4*a*1. In this regard, the first holding part 222_4a2 may be formed of the same material as that of the peripheral portion of the first coupling hole 222_4a1 or the basic body 222_1.

According to certain embodiments, the step 222_4a3 is provided for easiness of assembling with the center bracket 243a, and may guide the center bracket 243a such that the center bracket 243a does not deviate before the assembling of the rotary shaft. The step 222_4a3 may be formed to protrude from a side surface of a peripheral portion of the first coupling hole 222_4a1, which faces the x axis direction, by a specific height in the x axis direction. The step 222_4a3 may be disposed to surround the first coupling hole 222_4a1. In this regard, at least one of an outer peripheral surface or an inner peripheral surface of the step 222_4a3 may be circular or elliptical. According to certain embodiments, the inner peripheral surface of the step 222_4a3 may include a shape (e.g., at least a portion of the z axis cross-section includes a line) corresponding to a shape of the first coupling hole 222_4a1. At least a portion of the step 222_4a3 may be disposed in a ring (or ring type structure, or hook) provided in the center bracket 243a.

According to certain embodiments, the first cam protrusion 222_4a4 may protrude from a side surface of the peripheral portion of the first coupling hole 222_4a1, which face the −x axis direction, in the −x axis direction by a specific height, and protrusion heights thereof may be different according to locations. For example, a z axis cross-section (e.g., a cross-section from the z axis direction to the −z axis direction) of the first cam protrusion 222_4a4 may be circular, or at least a portion thereof includes a line and a remaining portion thereof may include a curve (at least a portion thereof may include a D-cut shape). The first cam protrusion 222_4a4 may have a convexo-concave shape in the −x axis direction. At least a portion of the first cam protrusion 222_4a4 having the convexo-concave shape in the −x axis direction may include a curve section. Heights of mountains of the convexo-concave shape are the same in the −x axis direction, and depths of valleys of the convexo-concave shape may be the same in the x axis direction. Central portions of the mountains and the valleys of the convexo-concave shape may include flat areas of a specific length.

According to certain embodiments, the fourth cam structure 242_4b may include the second coupling hole 222_4b1 of a uniform diameter that faces the −x axis direction from the x axis, a second holding part 222_4b2 that supports the center bar 243c, a protrusion 222_4b3, at least a portion of which is engaged with the stopper 236, and a second cam protrusion 222_4b4 for a cam operation. The fourth cam structure 222_4b may be disposed to be spaced apart from the third cam structure 222_4a by a specific interval while being disposed on one side of the basic body 222_1. A spacing distance between the third cam structure 222_4a and the fourth cam structure 222_4b may be changed according to a size or a shape of at least one of the springs disposed between the third cam structure 222_4a and the fourth cam structure 2224b, the cam member, and the center bracket 243a.

According to certain embodiments, at least a portion of the second rotary shaft 232 may be inserted into the second coupling hole 222_4b1. The second coupling hole 222_4b1 may have a shape that is the same as or similar to a cross-section (e.g., a cross-section taken from the z axis direction to the −z axis direction) of one side of the second rotary shaft 232. A cross-section (e.g., a cross-section taken from the z axis direction to the −z axis direction) of at least a portion of the second coupling hole 222_4b1 may have the same shape as that of the first coupling hole 222_4a1. The second coupling hole 222_4b1 may be disposed on the same axis (e.g., the second axis 12) as the first coupling hole 222_4a1 of the fourth cam structure 222_4b.

According to certain embodiments, the second holding part 222_4b2 may have a shape that is the same as or similar to that of the first holding part 222_4a2. For example, the second holding part 222_4b2 may be formed between an upper side (e.g., one point in the z axis direction) and a lower side (e.g., one point in the −z axis direction) of the peripheral portion of the second coupling hole 222_4b1, and may protrude in the −y axis direction. According to an embodiment, similarly to the first holding part 222_4a2, the second holding part 222_4b2 may have a shape, of which a width of the protrusion gradually decreases as it goes from the z axis direction to the −z axis direction.

According to certain embodiments, the protrusion 222_4b3 may protrude in the −x axis direction by a specific length while having a specific thickness, on a surface of the peripheral portion of the second coupling hole 222_4b1, which faces the −x axis direction. According to an embodiment, the protrusion height of the protrusion 222_4b3 may correspond to a shape of one side of the stopper 236. A thickness of the protrusion 222_4b3 may be the same as a width of the peripheral portion of the second coupling hole 222_4b1, and may have an area that is smaller than the entire area of the peripheral portion. The protrusion 222_4b3 may define a limit angle, by which the second arm part 222 is rotated in a specific angle range (e.g., 0 degrees to 100 degrees or 0 degrees to −100 degrees).

According to certain embodiments, the second cam protrusion 222_4b4 may have a shape that is the same as or similar to that of the first cam protrusion 222_4a4. According to certain embodiments, the second cam protrusion 222_4b4 may include a convexo-concave shape that protrudes in the x axis direction, on a surface of the peripheral portion of the second coupling hole 222_4b1, which faces the x axis direction. The second cam protrusion 222_4b4 may include at least one mountain and at least one valley. A central portion of the mountain or the valley of the second cam protrusion 222_4b4 may be flat. A size (e.g., a size of the flat area) of a specific area of the central portion of the mountain or the valley of the second cam protrusion 222_4b4 may be the same as a size of a specific area of the central portion of the mountain or the valley of the first cam protrusion 222_4a4. According to certain embodiments, a size (e.g., a size of the flat area) of a specific area of the central portion of the mountain or the valley of the second cam protrusion 222_4b4 may be different from as a size of a specific area of the central portion of the mountain or the valley of the first cam protrusion 222_4a4 such that a hinge force (or a feeling of a detent) may be provided more smoothly.

According to certain embodiments, the directions of the protrusions (or convex-concave shape or the mountains and the valleys) of the third cam structure 222_4a and the fourth cam structure 222_4b may be different directions (e.g., the −x axis direction). Alternatively, the directions of the protrusions of the third cam structure 222_4a and the fourth cam structure 222_4b may be different. For example, the direction of the protrusions in the third cam structure 222_4a may be the −x axis direction, and the direction of the protrusions in the fourth cam structure 222_4b may be the x axis direction. Directions of the cams (e.g., 241a_1b and 241b_1b) also are disposed such that the cams are engaged with the cam structures 222_4a and 222_4b according to disposition directions of the protrusions of the cam structures 222_4a and 222_4b.

According to certain embodiments, the second arm part 222 of the above-described structure may be rotated about the second rotary shaft 232. In a state, in which one side (e.g., the second cam 241a_1b) of the first cam member 241a is engaged with the third cam structure 222_4a and one side (e.g., the fourth cam 241b_1b) of the second cam member 241b is engaged with the fourth cam structure 222_4b, the second spring 242b may provide a force to the second cam 241a_1b and the third cam structure 222_4a and the fourth spring 242d may apply a force to the fourth cam 241b_1b and the fourth cam structure 222_4b. The third cam structure 222_4a and the fourth cam structure 222_4b may perform cam operations at the same time or in multiply stages. According to an embodiment, the electronic device 100 may divide the cam structure for cam operations to the third cam structure 222_4a and the fourth cam structure 222_4b, and thus may apply a high force without increasing the thickness of the electronic device 100 because the sizes of the springs (e.g., the diameters of the springs of a spring shape) or the thicknesses of the springs (e.g., the widths or thicknesses of lines that form the springs or the lines or strings that form the springs) are not increased. Furthermore, because the electronic device 100 may provide a robust and improved hinge force (or feeling of a detent or pressure) through the high elastic forces, the folded or unfolded state of the electronic device 100 may be stably provided even when a tensile force, a strength, or a repulsive force (e.g., an increased thickness) of the display is increased. The electronic device 100 may provide various holding angles more stably by using the arm part including the plurality of cam structures.

Meanwhile, the second arm part 222 including the third cam structure 222_4a and the fourth cam structure 222_4b, which have been described above, may have configurations and shapes that are the same as or similar to those of the first arm part 221 including the first cam structure 221_4a and the second cam structure 221_4b, with respect to the first axis 11 or the second axis 12.

The second arm part 222 can be connected to the fixing member 213 by a rotary shaft 232. The rotary shaft 232 can be inserted into the second arm part 222. The rotary shaft 232 can include a column part 232_1 with a shaft gear 232_2 on one end and a ring holding groove 232_3 on the other end. Additionally, the rotary shaft 232 can also include a plate holding groove 232_4.

Figure 8:
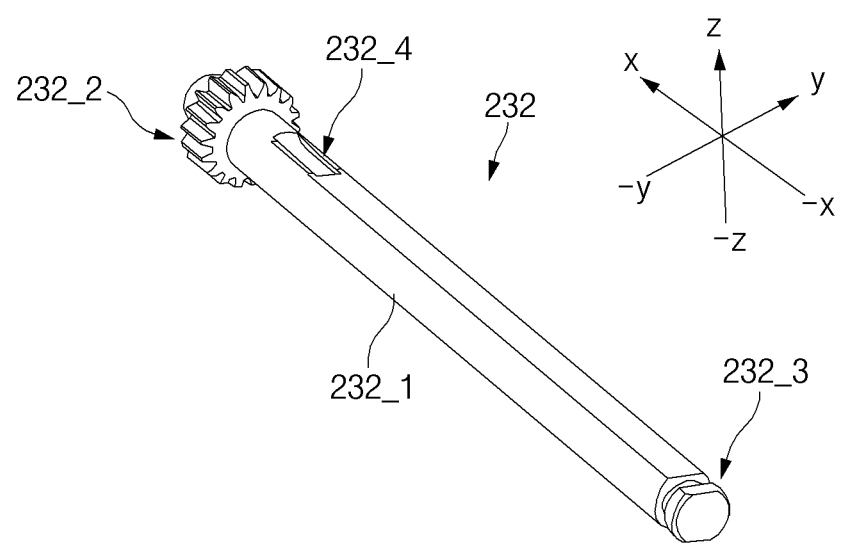
FIG. 8 is a view illustrating an example of a second rotary part according to an embodiment.

FIG. 8 is a view illustrating an example of the second rotary part according to an embodiment. Prior to a description, the second rotary shaft illustrated in FIG. 8 may have the same shape and the same material as those of the first rotary shaft.

The second rotary shaft 232 may include a column part 232_1, the shaft gear 232_2 (e.g., the second shaft gear 232_2 of FIG. 3), a ring holding groove 232_3, and a plate holding groove 232_4. The second rotary shaft 232 may be rotated within a specific angle range (e.g., an angle range of 0 degrees to 100 degrees or 0 degrees to −100 degrees) according to rotation of the second arm part 222 about the second axis 12.

According to certain embodiments, one end (e.g., one end in the x axis direction) of the column part 232_1 may be coupled to one side of the fixing bracket 213, and an opposite end (e.g., an end in the −x axis direction) thereof may be coupled to a fixing clip (e.g., 291_2). The column part 232_1 may have a bar shape that is longer in the x axis direction than in the y axis direction. At least a portion of the column part 232_1 in the z axis cross-section (e.g., a cross-section taken in the −z axis direction in the z axis) may include a curve and the remaining portions thereof may include a line. For example, cross-sections (e.g., a cross section taken along the −z axis direction in the z axis) of at least a portion of one surface of the column part 232_1 in the z axis direction and at least a portion of one surface thereof in the −z axis direction may be lines, and at least a portion of one surface thereof in the y axis direction and at least a portion of one surface thereof in the −y axis direction may be curves. Accordingly, at least a portion of an upper side of the column part 232_1 in the z axis direction or the −z axis direction may form a flat surface, and at least a portion of a side surface thereof in the y axis direction or the −y axis direction may form a curve. An entire length of the column part 232_1 may be changed in correspondence to the configurations that are inserted into the second rotary shaft 232. For example, one side of the rotary shaft support member 235, one side of the stopper 236, the first coupling hole 222_4a1 of the third cam structure 222_4a, the second coupling hole 222_4b1 of the fourth cam structure 222_4b, the second cam 241a_1b, the fourth cam 241b_1b, the second spring 242b, the fourth spring 242d, one side of the center bracket 243a, one side of the shaft bracket 243b, the support rings 292_1 and 292_2, and the fixing clip may be coupled to the column part 232_1.

According to certain embodiments, the shaft gear 232_2 may be biased to an end of the column part 232_1 in the x axis direction. The shaft gear 232_2 may have a cross-section that is larger than the z axis cross-section (a cross-section taken along the −z axis direction in the z axis) of the column part 232_1 and a gear may be formed on an outer peripheral surface thereof. The shaft gear 232_2, for example, may be disposed to be engaged with the idle gear (e.g., 234). The shaft gear 232_2 may be disposed between an end of the column part 232_1 in the x axis direction and the plate holding groove 232_4.

According to certain embodiments, the plate holding groove 232_4 may be formed on one side of an upper surface (at least a portion of a surface that faces the z axis direction) of the column part 232_1. At least a portion of the rotary shaft support member 235 may be held in the plate holding groove 232_4. The plate holding groove 232_4 may be engraved to be lower than a periphery thereof on one surface of the upper surface of the column part 232_1. The plate holding groove 232_4 may be disposed such that the rotary shaft support member 235 surrounds the idle gear 234 and the shaft gear 232_2.

According to certain embodiments, the ring holding groove 232_3 may be disposed to be biased in the −x axis direction of the column part 232_1. For example, the ring holding groove 232_3 may have a height that is lower than that of a periphery thereof at a location that is spaced apart from an end of the column part 232_1 in the −x axis direction, by a specific interval in the x axis direction, and may be formed at an entire circumference of the column part 232_1. Accordingly, the ring holding groove 232_3 may have an engraved band shape of the column part 232_1. The fixing clip (e.g., 292_2), for example, may be inserted into the ring holding groove 232_3.

Meanwhile, in the above description, the second rotary shaft 232 has been described, but the first rotary shaft 231 also may have the same configuration and material as those of the second rotary shaft 232. For example, the first rotary shaft 231 may include a column part, a shaft gear, a ring holding groove, and a plate holding groove, and may be rotated in an opposite direction to the direction of the second rotary shaft 232 about the first axis 11 that is spaced apart from the second axis 12 by a specific distance.

Figure 9:
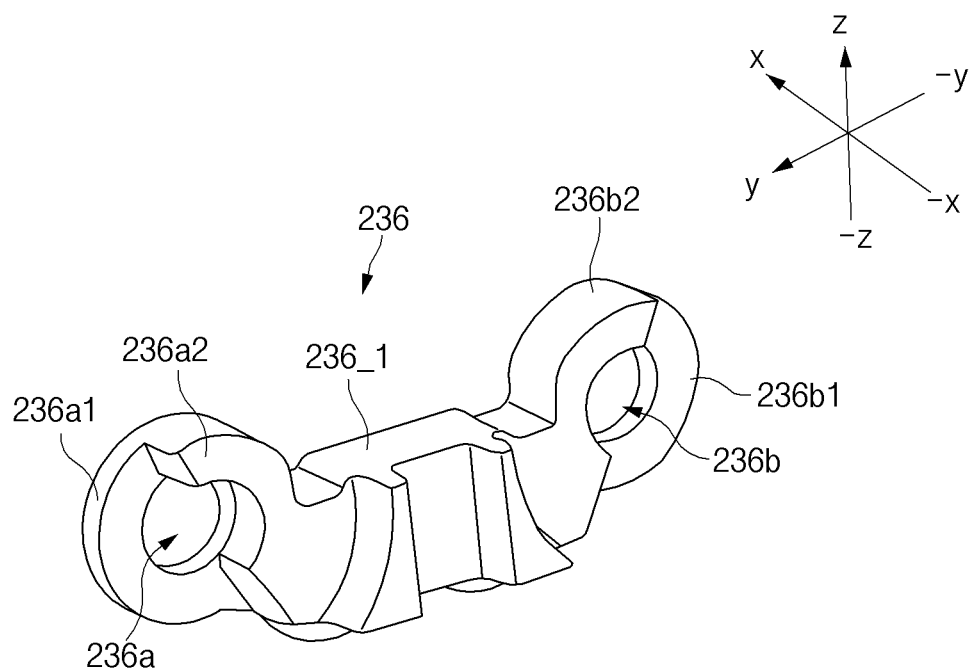
FIG. 9 is a view illustrating an example of a configuration of a stopper according to certain embodiments.

FIG. 9 is a view illustrating an example of a configuration of the stopper 236 according to certain embodiments.

Referring to FIG. 9, according to an embodiment, the stopper 236 may support a pressure such that the first arm part 221 and the second arm part 222 are not rotated by a specific angle or more or when the pressure applied deviates from a specific angle range. The stopper 236 may include a stopper body 236_1, a first shaft insertion hole 236a, into which at least a portion of the first rotary shaft 231 is inserted, and a second shaft insertion hole 236b, into which at least a portion of the second rotary shaft 232 is inserted.

According to certain embodiments, the stopper body 236_1 may be formed to protrude further in the fourth direction (e.g., the −x axis direction) than the surfaces of the first shaft insertion hole 236a and the second shaft insertion hole 236b. The stopper body 236_1 may restrain a rotation range of the first arm part 221 while the first arm part 221 is rotated, and restrain a rotation range of the second arm part 222 while the second arm part 222 is rotated.

According to certain embodiments, the stopper 236 may include a first hole periphery part 236a1 that defines the first shaft insertion hole 236a and a first step 236a2 that restricts the rotation range of the first arm part 221. The first hole periphery part 236a1 may have a band shape, in which the first shaft insertion hole 236a is formed, at a central portion thereof. The first step 236a2 may be formed to protrude further from a surface of the first hole periphery part 236a1 in the −x axis direction, in the x axis direction. The first step 236a2, for example, may be disposed to cover a specific surface (e.g., a half) of the first hole periphery part 236a1. A size of the first step 236a2 formed on the first hole periphery part 236a1 may be changed according to a rotation design range of the first arm part 221. For example, when the rotation range of the first arm part 221 is designed to be relatively large, a surface of the first hole periphery part 236a1, on which the first step 236a2 is disposed, may be designed to be smaller, and on the contrary, when the rotation range of the first arm part 221 may be designed to be relatively small, a surface of the first hole periphery part 236a1, on which the first step 236a2 is disposed, may be designed to be larger.

According to certain embodiments, the stopper 236 may include a second hole periphery part 236b1 that defines the second shaft insertion hole 236b and a second step 236b2 that restricts the rotation range of the second arm part 222. The second hole periphery part 236b1 may be disposed to be symmetrical to the first hole periphery part 236a1 in the y axis direction with respect to an axis that crosses the x axis and the −x axis of the stopper body 236_1. The second shaft insertion hole 236b, the second hole periphery part 236b1, and the second step 236b2 may have the same or similar shapes as those of the first shaft insertion hole 236a, the first hole periphery part 236a1, and the first step 236a2. The second step 236b2 may restrict the rotation range of the second arm part 222.

According to certain embodiments, portions of the first hole periphery part 236a1 and the second hole periphery part 236b1 may be disposed to protrude further than the upper surface (e.g., a surface in the z axis direction) of the stopper body 236_1, in the z axis direction. Accordingly, at least portions of the first rotary shaft 231 and the second rotary shaft 232, which are inserted into the first shaft insertion hole 236a and the second shaft insertion hole 236b, may be disposed above the stopper body 236_1 in the z axis direction.

Figure 10:
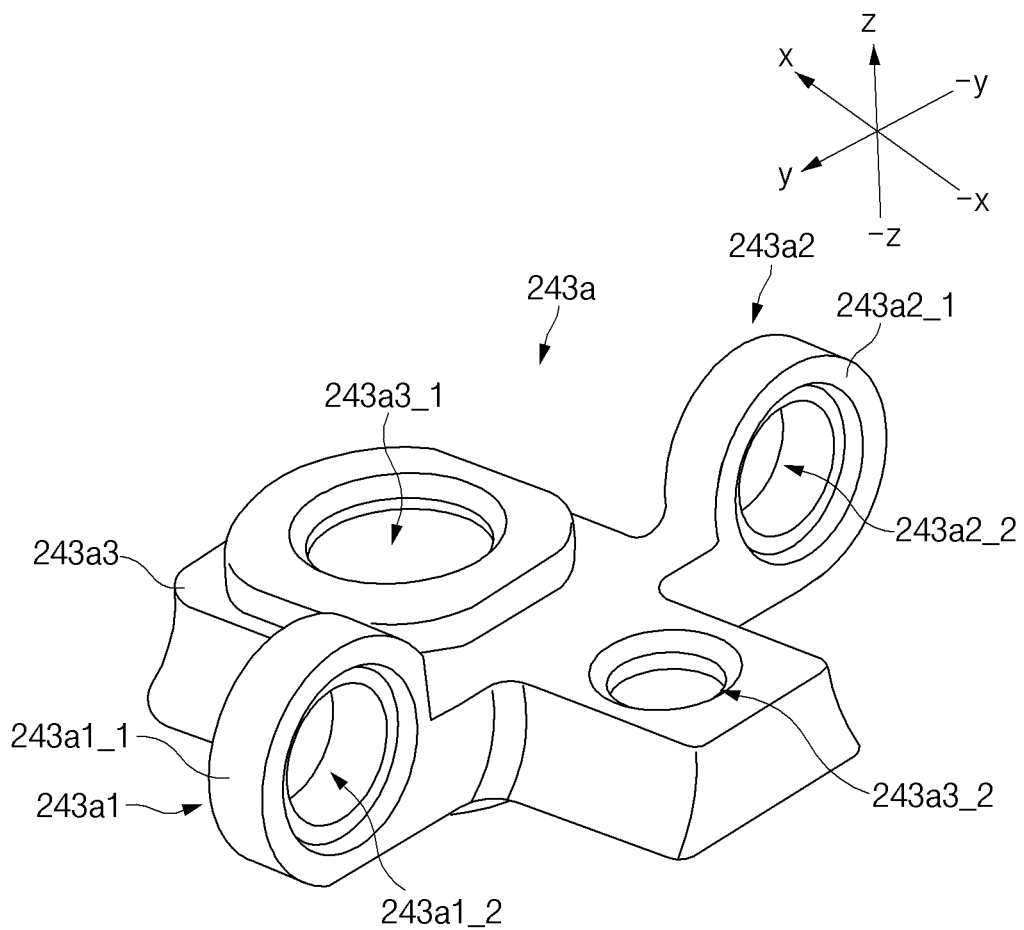
FIG. 10 is a view illustrating an example of a center bracket according to certain embodiments.

FIG. 10 is a view illustrating an example of the center bracket according to certain embodiments.

Referring to FIGS. 3 and 10, the center bracket 243a according to an embodiment may involve in the z axis movement of the center bar 243c (e.g., guide the movement range of the center bar 243c) while supporting the center bar 243c. The center bracket 243a may include a center body 243a3, a first bracket wing part 243a1, and a second bracket wing part 243a2.

According to certain embodiments, the center body 243a3 may have a shape that has a specific thickness in the z axis direction and is long in the x axis direction as a length thereof in the x axis or −x axis direction is larger than a length thereof in the y axis direction. The center body 243a3 may have a shape, in which an upper surface (e.g., a surface in the z axis direction) thereof is narrower than a bottom surface (e.g., a surface in the −z axis direction), a periphery thereof has a specific inclination angle, and it is deflected as it goes from the bottom surface to the upper surface. The center body 243a3 may include a center coupling hole 243a3_1 that is opened in the z axis direction and is coupled to a protrusion formed in the center bar 243c, and a housing coupling hole 243a3_2 that is opened in the same direction as that of the center coupling hole 243a3_1 and is coupled to the protrusion formed on one side of the hinge housing. The center coupling hole 243a3_1 and the housing coupling hole 243a3_2 may be disposed to be spaced apart from each other by a specific distance.

According to certain embodiments, the first bracket wing part 243a1 may be formed to protrude from a central area of the center body 243a3 in the y axis direction. The first bracket wing part 243a1 may include a first bracket wing 243a1_1 and a first bracket hole 243a1_2. The first bracket wing 243a1_1 may have a circular band shape such that the first bracket hole 243a1_2 is formed at a central portion thereof. A step may be formed in the first bracket wing 243a1_1 at a periphery of the first bracket hole 243a1_2. Portions (e.g., the step 222_4a3) of the cam structures formed in the first arm part 221 may be disposed in the step formed at a periphery of the first bracket hole 243a1_2. The first bracket hole 243a1_2 may be opened in a direction that is perpendicular to an opening direction of the center coupling hole 243a3_1 or the housing coupling hole 243a3_2. A size of the first bracket hole 243a1_2 may have a thickness that is the same as or similar to the thickness of the first rotary shaft 231. Alternatively, a shape (e.g., a circle) of the first bracket hole 243a1_2 may be different from a shape (e.g., a partial curve and a closed curve including a partial curve) of the first rotary shaft 231, and a diameter of the first bracket hole 243a1_2 may have a diameter that is larger than a diameter of the first rotary shaft 231.

According to certain embodiments, the second bracket wing part 243a2 may be formed to protrude from a central area of the center body 243a3 in the −y axis direction that is an opposite direction to the first bracket wing part 243a1. The second bracket wing part 243a2 may include a second bracket wing 243a2_1 and a second bracket hole 243a2_2. The second bracket wing 243a2_1 may have a circular band shape such that the second bracket hole 243a2_2 is formed at a central portion thereof. Similar to the first bracket wing 243a1_1, a step may be formed on one side (e.g., an inner peripheral part thereof, in which the second bracket hole 243a2_2 is formed) of the second bracket wing 243a2_1, and some (e.g., the step 222_4a3) of the cam structures formed in the second arm part 222 may be disposed in the step. The second bracket hole 243a2_2 may be opened in the same direction as that of the first bracket hole 243a1_2. The second bracket hole 243a2_2 may be formed in the same way as the first bracket hole 243a1_2, and may be partially different from the z axis cross-section (e.g., a cross-section taken along the −z axis direction in the z axis) of the second rotary shaft 232. The second rotary shaft 232 may be inserted into the second bracket hole 243a2_2, and the second rotary shaft 232 may be rotated in the second bracket hole 243a2_2.

Figure 11:
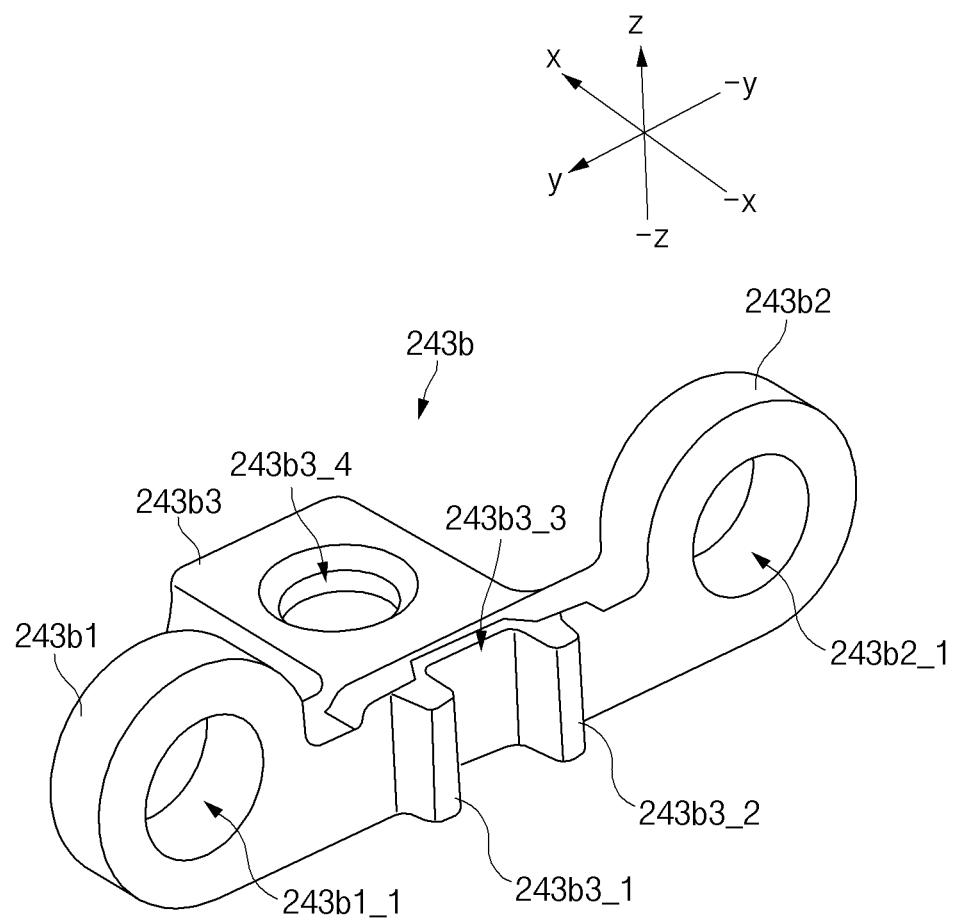
FIG. 11 is a view illustrating an example of a shaft bracket according to certain embodiments.

FIG. 11 is a view illustrating an example of the shaft bracket according to certain embodiments.

Referring to FIGS. 3 and 11, the shaft bracket 243b according to an embodiment may be coupled to the first rotary shaft 231 and the second rotary shaft 232 to function to fix the first rotary shaft 231 and the second rotary shaft 232. The shaft bracket 243b may include holes, into which the first rotary shaft 231 and the second rotary shaft 232 are inserted, and may function to support the springs (e.g., the first spring 242a and the second spring 242b). The shaft bracket 243b may include a shaft bracket body 243b3, a first shaft wing 243b1, and a second shaft wing 243b2.

According to certain embodiments, the shaft bracket body 243b3 may be formed such that the lengths thereof in the x axis and the y axis are larger than the length thereof in the z axis. For example, an entire shape of the shaft bracket body 243b3 may have a rectangular shape having a specific thickness. A side part (e.g., a y axis periphery and a −y axis periphery) of the shaft bracket body 243b3 may have a shape, in which a size of an entire surface thereof gradually decreases as it goes from a bottom surface to an upper surface thereof. Alternatively, at least a portion of a side part of the shaft bracket body 243b3 may have a curved shape, in which a cross-section (a cross-section that is taken along the −z axis direction in the z axis) to an inner side (e.g., in the −y axis direction in they axis or in they axis direction in the −y axis). Sides of the first spring 242a and the second spring 242b may be disposed to be adjacent to the side part of the shaft bracket body 243b3. Protrusions 243b3_1 and 243b3_2 that protrude in the −x axis direction and are disposed to be spaced apart from each other by a specific interval in the y axis may be included at a periphery (e.g., the −x axis periphery) of one side of the shaft bracket body 243b3. A stopper part that protrudes from an end of the center bar 243c in the −z axis direction may be coupled to a valley 243b3_3, by which the protrusions 243b3_1 and 243b3_2 are spaced apart from each other. A coupling hole 243b3_4 that is coupled to the protrusion formed in the hinge housing 150 may be disposed on an inside of the shaft bracket body 243b3. The coupling hole 243b3_4, for example, may be disposed to be opened in the z axis direction.

According to certain embodiments, the first shaft wing 243b1 may extend to one side (e.g., one side of a y axis periphery of the −x axis periphery) of the shaft bracket body 243b3, and may have a ring shape having a first shaft insertion hole 243b1_1, into which the first rotary shaft 231 is inserted, at a central portion thereof. The first shaft insertion hole 243b1_1 may be formed in a direction (e.g., the x axis or −x axis direction) that is perpendicular to an opening direction of the coupling hole 243b3_4. A size of the first shaft insertion hole 243b1_1 may be similar to or larger than that of a circumference of the first rotary shaft 231.

According to certain embodiments, the second shaft wing 243b2 may be disposed to symmetrical to the first shaft wing 243b1 with respect to the x axis. For example, the second shaft wing 243b2 may extend to one side (e.g., one side of a −y axis periphery of the −x axis periphery) of the shaft bracket body 243b3, and may have a ring shape having a second shaft insertion hole 243b2_1, into which the second rotary shaft 232 is inserted, at a central portion thereof. The second shaft insertion hole 243b2_1 may be opened in the same direction as that of the first shaft insertion hole 243b1_1. A size of the second shaft insertion hole 243b2_1 may be similar to or larger than that of a circumference of the second rotary shaft 232. The first shaft wing 243b1 and the second shaft wing 243b2 may be disposed in parallel to each other on the y axis.

Figure 12:
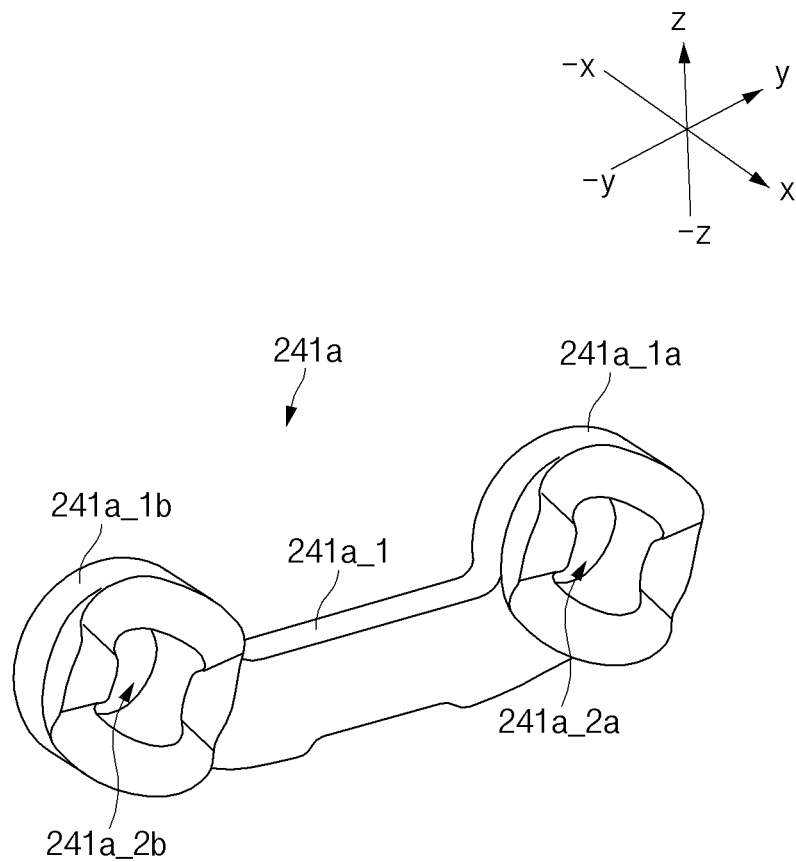
FIG. 12 is a view illustrating an example of a cam member according to certain embodiments.

FIG. 12 is a view illustrating an example of the cam member according to certain embodiments. Prior to a description, the cam member illustrated in FIG. 12 may be at least one of the first cam member 241a disposed between the shaft bracket 243b and the center bracket 243a or the second cam member 241b disposed between the center bracket 243a and the stopper 236. In the following description, the first cam member 241a will be mainly described.

Referring to FIGS. 3 and 12, the first cam member 241a may include a cam body 241a_1, the first cam 241a_1a, the second cam 241a_1b, a first cam hole 241a_2a, and a second cam hole 241a_2b. The first cam 241a_1a and the second cam 241a_1b may be disposed at opposite peripheries of the cam body 241a_1. The cam body 241a_1 may be disposed between the center body 243a3 of the center bracket 243a and the shaft bracket body 243b3 of the shaft bracket 243b.

According to certain embodiments, mountains and valleys may be disposed in the first cam 241a_1a in the x axis direction, and the first cam hole 241a_2a may be formed at a central portion thereof such that the first rotary shaft 231 passes therethrough. The first cam 241a_1a may be disposed to be engaged with the first cam structure 221_4a of the first arm part 221. One side of the first spring 242a may contact a surface of the first cam 241a_1a in the −x axis direction.

According to certain embodiments, the second cam 241a_1b may be disposed in the same direction as that of the first cam 241a_1a, and may be disposed to be spaced apart from the first cam 241a_1a by a length of the cam body 241a_1 in they axis. The second cam 241a_1b may be disposed to be engaged with the third cam structure 222_4a of the second arm part 222, and the second spring 242b may contact a surface of the second cam 241a_1b in the −x axis direction. The second cam hole 241a_2b may be formed at a central portion of the second cam 241a_1b such that the second rotary shaft 232 is inserted thereinto.

According to certain embodiments, the first cam member 241a may be disposed such that the mountains and the valleys of the first cam structure 221_4a and a second cam structure 222_4a of the first arm part 221 and the second arm part 222 are engaged with each other when the first arm part 221 and the second arm part 222 are retracted in the −x axis direction by the first cam structure 221_4a and the second cam structure 222_4a while being rotated within a specific angle range and then are additionally rotated, and in this process, may be moved in the x axis direction by elasticity of the first spring 242a and the second spring 242b and return to an original location.

According to certain embodiments, as mentioned above, the cam member illustrated in FIG. 12 may be the second cam member 241b. In this case, while the first cam 241a_1a of the first cam member 241a is disposed to be engaged with the first cam structure 221_4a of the first arm part 221 and the second cam 241a_1b of the first cam member 241a is disposed to be engaged with the third cam structure 222_4a of the second arm part 222, the third cam 241b_1a of the second cam member 241b is disposed to be engaged with the second cam structure 221_4b of the first arm part 221 and the fourth cam 241b_1b of the second cam member 241b is disposed to be engaged with the fourth cam structure 222_4b of the second arm part 222. In relation to a cam operation of the second cam member 241b, the third spring 242c and the fourth spring 242d may provide force to the second cam member 241b.

As described above, the cam structures and the cams engaged with the cam structures according to certain embodiments may provide a firmer and stronger feeling of a detent as the two cam structures formed in the first arm part 221 and the two cam structures formed in the second arm part 222 are engaged with the two cam members 241a and 241b at the same time. Alternatively, the cam structures and the cams engaged with the cam structures according to certain embodiments of the disclosure may provide a firmer and stronger feeling of a detent based on a stronger force by using the four springs 242a, 242b, 242c, and 242d. In this process, because the plurality of cam structures and the plurality of cams are provided, an improved anti-wear property for the cam operation process may be provided while a higher hinge force (or a detent ability (or a stronger detent ability)) is provided without increasing thickness or size.

Figure 13:
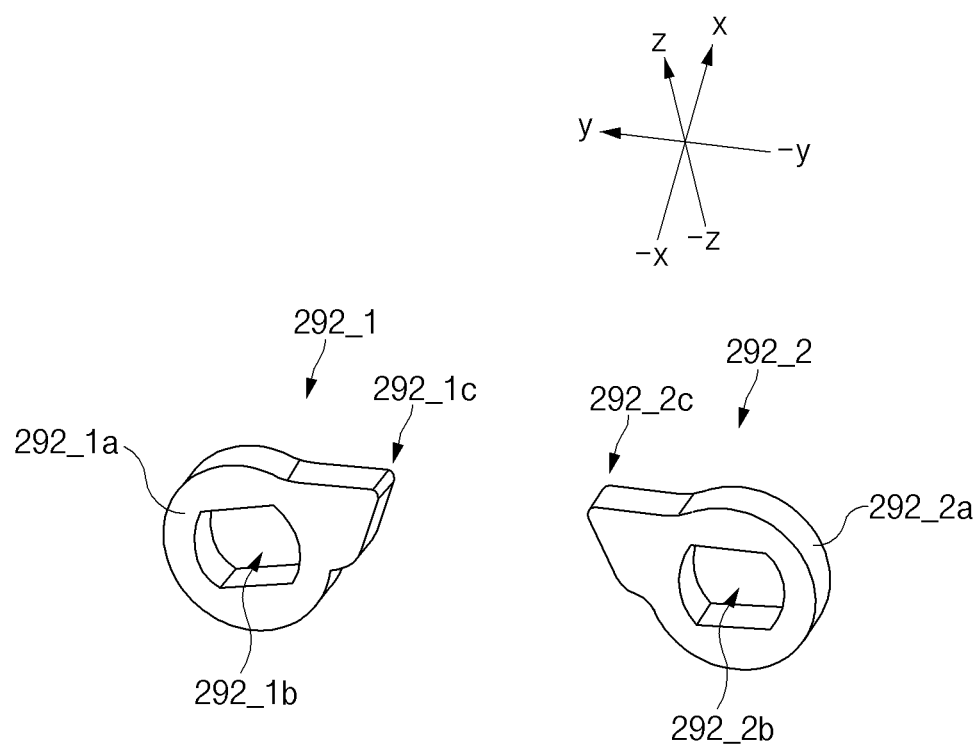
FIG. 13 is a view illustrating an example of support rings according to certain embodiments.

FIG. 13 is a view illustrating an example of the support rings according to certain embodiments.

Referring to FIG. 13, the support rings 292_1 and 292_2 according to an embodiment may include the first support ring 292_1 coupled to the first rotary shaft 231 and the second support ring 292_2 coupled to the second rotary shaft 232.

According to certain embodiments, the first support ring 292_1 may include a first ring hole 292_1b, into which the first rotary shaft 231 is inserted, and a first ring body 292_1a that defines the first ring hole 292_1b. The first ring hole 292_1b may be disposed in the first ring body 292_1a, and the first ring body 292_1a may have a ring shape as a whole. The first ring body 292_1a may include a first support protrusion 292_1c that provides from one side of an outer peripheral surface thereof in the −y axis direction. The first support protrusion 292_1c may have a shape (e.g., a triangular shape), a width of which decreases as it becomes farther away from the first ring body 292_1a. At least a portion of an upper surface (a surface that faces the z axis) of the first support protrusion 292_1c may be formed to be flat, and at least a portion of a lower cross-section (e.g., a cross-section taken along the −z axis direction in the z axis) may include a curve. The first support protrusion 292_1c may support one side of the center bar 243c while the first arm part 221 and the second arm part 222 are disposed on the y axis to be parallel to each other. The first ring hole 292_1b may have a cross-section that is the same as or similar to a z axis cross-section (e.g., a cross-section taken from the −z axis direction to the z axis direction) of the first rotary shaft 231. For example, a z axis cross-section (a cross-section taken along the −z axis direction in the z axis) of at least a portion of the first ring hole 292_1b may include a linear section, and the remaining sections may include a circular section. Alternatively, the first ring hole 292_1b may have a shape, in which linear sections and circular sections are alternately disposed in the z axis cross-section (e.g., a cross-section taken along the −z axis direction in the z axis). Accordingly, when the first rotary shaft 231 is rotated in one direction, the first support ring 292_1 may be rotated in the same direction as that of the first rotary shaft 231.

According to certain embodiments, the second support ring 292_2 may include a second ring hole 292_2b, into which the second rotary shaft 232 is inserted, and a second ring body 292_2a that defines the second ring hole 292_2b. A second support protrusion 292_2c may be disposed on one side of the second ring body 292_2a. The second ring hole 292_2b may have a shape that is the same as or similar to that of the first ring hole 292_1b. Alternatively, the second ring hole 292_2b may have a shape that is the same as or similar to a z axis cross-section (e.g., a cross-section taken from the z axis direction to the −z axis direction) of the second rotary shaft 232. The second ring body 292_2a may a shape that is the same or similar to those of the first ring body 292_1a. The second support protrusion 292_2c may be disposed to protrude from one side of the second ring body 292_2a in the y axis direction. The second support protrusion 292_2c may have a shape (e.g., a triangular shape), of which a size of at least a portion of a cross-section (e.g., a cross-section taken along the −z axis direction in the z axis) gradually decreases similarly to the first support protrusion 292_1c. In a state, in which the first arm part 221 and the second arm part 222 are parallel to each other in they axis (e.g., the display of the electronic device is in an unfolded state), an apex of the second support protrusion 292_2c may face an apex of the first support protrusion 292_1c. Accordingly, when the electronic device is in the unfolded state, the second support protrusion 292_2c may support one side of the center bar 243c similarly to the first support protrusion 292_1c. FIGS. 14-17 show the operation of the electronic device in various folding states. The electronic device includes a first arm part 221 and a second arm part 222, both connected to a shaft bracket 243b. As the electronic device goes from an unfolded state (FIG. 14) to a folded state (FIG. 17), rotation parts 211, 212 move outward from the first arm part 221 and the second arm part 222.

Figure 14:
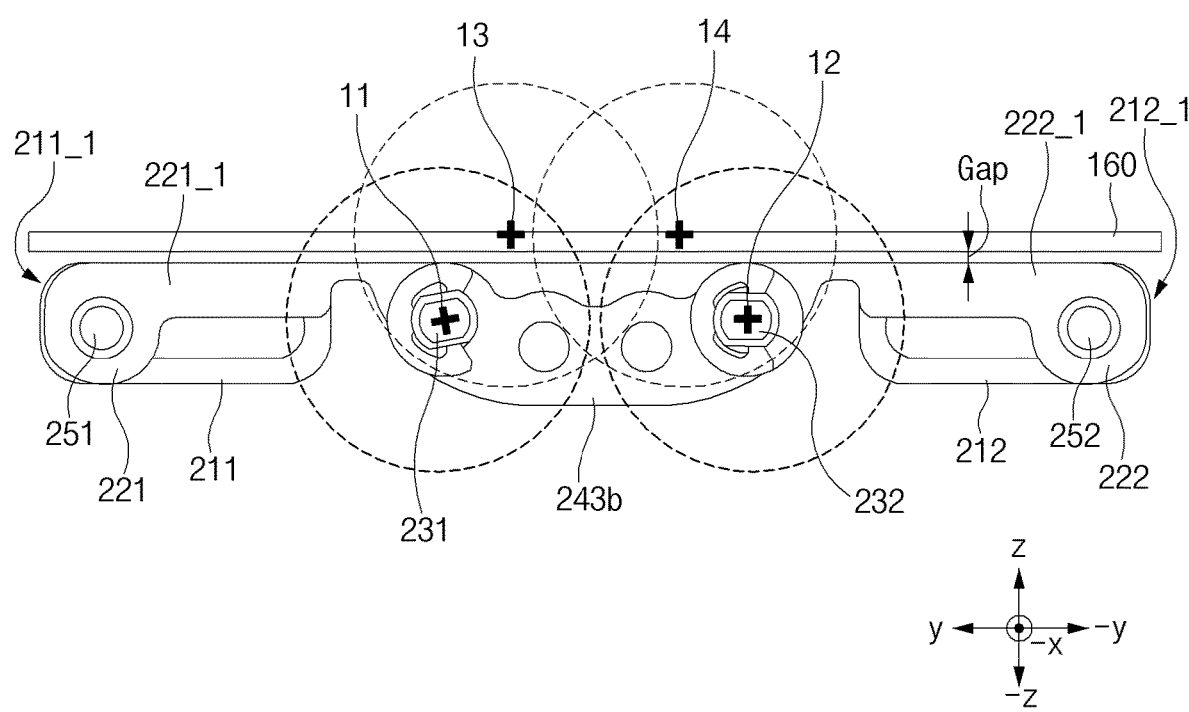
FIG. 14 is a view illustrating a first state of some configurations of an electronic device according to certain embodiments.

FIG. 14 is a view illustrating a first state of some configurations of an electronic device according to certain embodiments.

Referring to FIGS. 1, 3, and 14, some configurations of the electronic device 100 may include the first hinge structure 200a and the display 160, and the first hinge structure 200a and the display 160 may be in a first state (e.g., the unfolded state). Prior to a description, the drawing illustrated in FIG. 14 may correspond to shapes of the second hinge structure 200b and the display 160 according to angles.

According to certain embodiments, the first hinge structure 200a may include the first rotation part 211, the second rotation part 212, the fixing bracket 213, the first arm part 221, the second arm part 222, the first rotary shaft 231, the second rotary shaft 232, the idle gears 233 and 234, the first cam member 241a, the second cam member 241b, the first spring 242a, the second spring 242b, the third spring 242c, the fourth spring 242d, the center bracket 243a, and the shaft bracket 243b. The first rotation part 211 may be connected to the first arm part 221 through the first coupling part 251. The second rotation part 212 may be connected to the second arm part 222 through the second coupling part 252.

According to certain embodiments, the display 160 may be maintained in the unfolded state while the first rotation part 211 and the second rotation part 212 are maintained in the unfolded state. The first arm part 221 may be rotated within a specific angle range (e.g., 0 degrees to 100 degrees or 0 degrees to 95 degrees) with respect to the first rotary shaft 231. The second arm part 222 may be rotated within a specific angle range with respect to the second rotary shaft 232. The first rotation part 211 may be rotated in an angle range that is similar to or the same as that of the first arm part 221 with respect to the third axis 13. The second rotation part 212 may be rotated in an angle range that is similar to or the same as that of the second arm part 222 with respect to the fourth axis 14. The third axis 13 may be formed to be higher than the direction (e.g., the z axis direction) of the display 160 than the first rotary shaft 231. The fourth axis 14 may be formed to be higher than the direction (e.g., the z axis direction) of the display 160 than the second rotary shaft 232. An interval between the third axis 13 and the fourth axis 14 may be formed to be shorter than an interval between the first rotary shaft 231 and the second rotary shaft 232. According to certain embodiments, the third axis 13 and the fourth axis 14 may be formed to be parallel to each other on a horizontal axis (e.g., they axis). According to an embodiment, the third axis 13 and the fourth axis 14 may be formed on the same layer as the display 160 or may be formed on an upper side (e.g., air on the display 160) of the display 160.

According to certain embodiments, a first bracket body 211_1 of the first rotation part 211 and a second bracket body 212_1 of the second rotation part 212 may be disposed to be parallel to each other while the first rotation part 211 and the second rotation part 212 are maintained in the unfolded state. According to an embodiment, with reference to the illustrated drawings, an upper surface of the first bracket body 211_1 and an upper surface of the second bracket body 212_1 may be disposed to face an upper side (e.g., the z axis direction). According to an embodiment, while the first rotation part 211 and the second rotation part 212 are maintained in the unfolded state, the first arm part 221 and the second arm part 222 also may be disposed to be parallel to each other, and thus, both of a first basic body 221_1 of the first arm part 221 and a second basic body 222_1 of the second arm part 222 may be disposed to face the same direction (e.g., the z axis direction with reference to the illustrated drawings). Accordingly, all of the first bracket body 211_1, the second bracket body 212_1, the first basic body 221_1, and the second basic body 222_1 are disposed to be parallel to the horizontal axis, and may be disposed to face an upward direction with reference to the illustrated drawings. The first bracket body 211_1, the second bracket body 212_1, the first basic body 221_1, and the second basic body 222_1 may support a rear surface of the display 160 with no height difference.

According to certain embodiments, specific gaps may be formed between the deflected central portion of the display 160 and the hinge structures 200a and 200b. Bonding layers may be disposed between peripheral areas (e.g., the first part 161 or the second part 162) of the display 160, except for the central portion thereof, and the hinge structures 200a and 200b.

According to certain embodiments, in the first state (e.g., the unfolded state of the display 160), the mountain and the valley of the first cam 241a_1a of the first cam member 241a may be disposed to be engaged with the valley and the mountain of the first cam structure 221_4a, the mountain and the valley of the second cam 241a_1b of the first cam member 241a may be disposed to be engaged with the valley and the mountain of the third cam structure 222_4a, the mountain and the valley of the third cam 241b_1a of the second cam member 241b may be disposed to be engaged with the valley and the mountain of the second cam structure 221_4b, and the mountain and the valley of the fourth cam 241b_1b of the second cam member 241b may be disposed to be engaged with the valley and the mountain of the fourth cam structure 222_4b.

Figure 15:
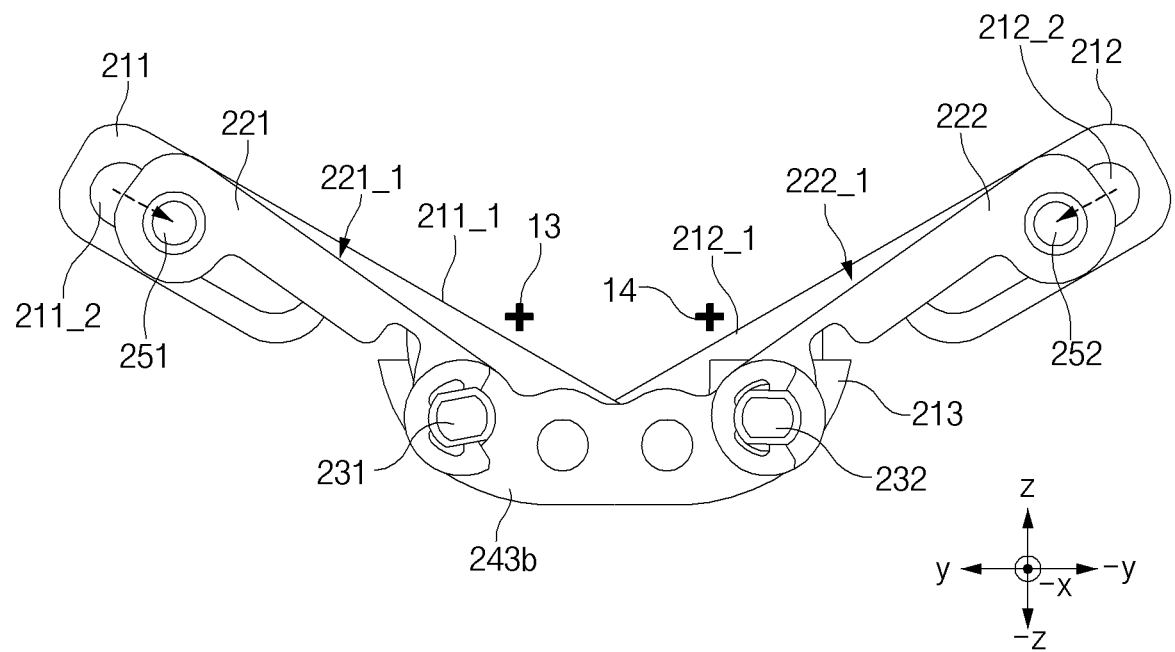
FIG. 15 is a view illustrating a first angle state of some structures of an electronic device according to certain embodiments.

FIG. 15 is a view illustrating a first angle state of some structures of the electronic device according to certain embodiments.

Referring to FIGS. 1, 3, and 15, the first hinge structure 200a (or the second hinge structure 200b) may include a first angle state (e.g., a state, in which an angle between the upper surfaces (surfaces in the z axis direction) of the first rotation part 211 and the second rotation part 212 and the horizontal axis (they axis) is 30 degrees). The first hinge structure 200a, as described above, may include the first rotation part 211, the second rotation part 212, the fixing bracket 213, the first arm part 221, the second arm part 222, the first cam member 241a, the second member 241b, the first spring 242a, the second spring 242b, the third spring 242c, the fourth spring 242d, the first rotary shaft 231, the second rotary shaft 232, the center bracket 243a, and the shaft bracket 243b. The first rotation part 211 may be connected to the first arm part 221 through the first coupling part 251. The second rotation part 212 may be connected to the second arm part 222 through the second coupling part 252.

According to certain embodiments, by applying an external pressure, the first housing (e.g., the first housing 110 of FIG. 1), to which the first rotation part 211 is fixed, or the second housing (e.g., the second housing 120 of FIG. 1), to which the second rotation part 212 is fixed, may be rotated from one point of the horizontal axis (e.g., they axis) in the vertical axis (e.g., the z axis) at a specific angle (e.g., a specific unit angle such as 5 degrees, 10 degrees, or 15 degrees) in a direction with reference to the illustrated drawings. For example, the first rotation part 211 connected to the first housing 110 may be rotated from one point of the horizontal axis (e.g., they axis) with respect to the third axis 13 by a first angle (e.g., 30 degrees) in the vertical axis (e.g., the z axis). When the first rotation part 211 is rotated by the first angle due to the external pressure, the corresponding pressure may be delivered to the first arm part 221 through the first coupling part 251. Accordingly, the first arm part 221 may be rotated by the first angle in the direction of the vertical axis (e.g., the z axis) on the horizontal axis (e.g., the y axis) with respect to the first rotary shaft 231. In this operation, according to rotation of the first arm part 221, the first cam structure 221_4a and the second cam structure 221_4b may be rotated. The first rotary shaft 231 inserted into the first cam structure 221_4a and the second cam structure 221_4b may be rotated by a force delivered as the first cam structure 221_4a and the second cam structure 221_4b are rotated, and the first shaft gear (e.g., 231_2 of FIG. 3) of the first rotary shaft 231 may be rotated while the first rotary shaft 231 is rotated. As the first shaft gear is rotated, the first idle gear 233 and the second idle gear 234 geared with the first shaft gear may be rotated, and as a result, the second rotary shaft 232 may be rotated as the second shaft gear 232_2 geared with the second idle gear 234 is rotated. The third cam structure 222_4a and the fourth cam structure 222_4b may be rotated as the second rotary shaft 232 is rotated, the second arm part 222 may be rotated as the third cam structure 222_4a and the fourth cam structure 222_4b are rotated, and the second rotation part 212 connected through the second coupling part 252 may be rotated as the second arm part 222 is rotated. Although an operation of rotating the second rotation part 212 together while an external pressure is applied to the first rotation part 211 has been described in the above description, the disclosure is not limited thereto. For example, when an external pressure is applied to the second rotation part 212, the second arm part 222 connected through the second coupling part 252 may be rotated, and the second rotary shaft 232 connected to the second arm part 222, the second idle gear 234 connected to the second rotary shaft 232, the first idle gear 233 connected to the second idle gear 234, the first rotary shaft 231 connected to the first idle gear 233, the first arm part 221 having the first cam structure 221_4a and the second cam structure 221_4b connected to the first rotary shaft 231, and the first rotation part 211 connected to the first arm part 221 through the first coupling part 251. Alternatively, an external pressure is applied to the first rotation part 211 and the second rotation part 212 at the same time, the first arm part 221 and the second arm part 222 may be rotated at a specific angle at the same time.

As described above, the first hinge structure 200a may have a structure, in which the first rotation part 211 and the second rotation part 212 are rotated at the same time due to the pressure (or force) applied from an outside. Accordingly, even when the external pressure is generated in the second housing 120, to which the second rotation part 212 is connected, or is generated in both of the first housing 110 and the second housing 120, the first rotation part 211 and the second rotation part 212 may be rotated at the same time. According to the electronic device 100 according to an embodiment of the disclosure, distortion of the first housing 110 and the second housing 120 may be restricted and a stable hinge operation may be performed as the first rotation part 211 and the second rotation part 212 are rotated at the same time.

According to an embodiment, because the axes 13 and 14 of the first rotation part 211 and the second rotation part 212 are disposed between the first rotary shaft 231 and the second rotary shaft 232 of the first arm part 221 and the second arm part 222, a rotation amount of the first rotation part 211 and a rotation amount of the first arm part 221 may be different at different rotation time points. Accordingly, an upper surface of the first bracket body 211_1 of the first rotation part 211 may be rotated more than an upper surface of the basic body 221_1 of the first arm part 221 with respect to the vertical axis (e.g., the z axis). Because the first rotation part 211 and the first arm part 221 are connected to each other through the first coupling part 251, the first coupling part 251 may be slid along a first slide hole 211_2 of the first rotation part 211 by a specific distance while the first rotation part 211 is rotated. Similarly, the upper surface of the second bracket body 212_1 may be rotated more than the second basic body 222_1 with respect to the vertical axis (e.g., the z axis). Furthermore, because the second rotation part 212 and the second arm part 222 are connected to each other through the second coupling part 252, the second coupling part 252 may be slid along the second slide hole 212_2 of the second rotation part 212 by a specific distance while the second rotation part 212 is rotated.

As described above, as the first arm part 221 is rotated in a state, in which the display 160 of the electronic device 100 is folded at a specific angle (e.g., an angle between the upper surface of the display 160 and the horizontal axis is 30 degrees or −30 degrees), one of the inclined parts between the mountain and the valley of the first cam structure 221_4a, which is close to the mountain, may contact one of the inclined parts between the mountain and the valley of the first cam 241a_1a of the first cam member 241a, which is close to the mountain, and one of the inclined parts between the mountain and the valley of the second cam structure 221_4b, which is close to the mountain, may contact one of the inclined parts between the mountain and the valley of the third cam 241b_1a of the second cam member 241b, which is close to the mountain. Similarly, as the second arm part 222 is rotated, one of the inclined parts between the mountain and the valley of the third cam structure 222_4a, which is close to the mountain, may contact one of the inclined parts between the mountain and the valley of the second cam 241a_1b of the first cam member 241a, which is close to the mountain, and one of the inclined parts between the mountain and the valley of the fourth cam structure 222_4b, which is close to the mountain, may contact one of the inclined parts between the mountain and the valley of the fourth cam 241b_1b of the second cam member 241b, which is close to the mountain.

Figure 16:
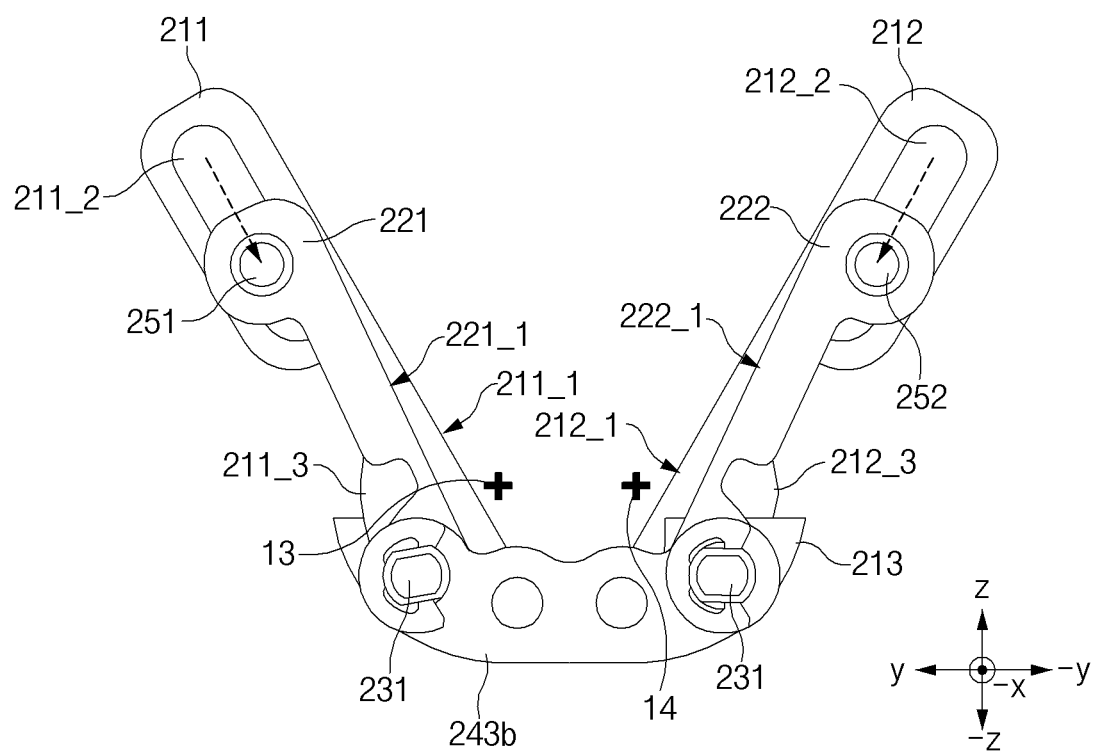
FIG. 16 is a view illustrating a second angle state of a first hinge structure of an electronic device according to certain embodiments.

FIG. 16 is a view illustrating the second angle state of the first hinge structure of the electronic device according to certain embodiments.

Referring to FIGS. 1, 3, and 16, the first hinge structure 200a may include the second angle state. The first hinge structure 200a, for example, may include the first rotation part 211, the second rotation part 212, the fixing bracket 213, the first arm part 221, the second arm part 222, a gear structure 230, the first cam member 241a, the second cam member 241b, the first spring 242a, the second spring 242b, the third spring 242c, the fourth spring 242d, the first rotary shaft 231, the second rotary shaft 232, the center bracket 243a, and the shaft bracket 243b. The first rotation part 211 may be connected to the first arm part 221 through the first coupling part 251, and the second rotation part 212 may be connected to the second arm part 222 through the second coupling part 252.

According to certain embodiments, by applying an external pressure (or force), the first housing (e.g., the first housing 110 of FIG. 1) or the second housing (e.g., the second housing 120 of FIG. 1) may be rotated from one point of the horizontal axis (e.g., the y axis) by the second angle (e.g., 60 degrees) in the vertical axis (e.g., the z axis) with reference to the illustrated drawings. For example, when an external pressure or force is delivered to the first housing 110 or the second housing 120, the first rotation part 211 or the second rotation part 212 may be rotated from one point of the horizontal axis (e.g., the y axis) with respect to the third axis 13 or the fourth axis 14 by the second angle (e.g., 60 degrees) in the vertical axis (e.g., the z axis). In a process of performing the above-described operation, the applied force may be mutually delivered through the first arm part 221 of the second arm part 222, the first rotary shaft 231 and the second rotary shaft 232, and the idle gears 233 and 234, the first rotation part 211, the second rotation part 212, the first arm part 221, and the second arm part 222 may be rotated at the same time.

According to certain embodiments, as the first rotation part 211 and the second rotation part 212 are rotated at the second angle, the first coupling part 251 and the second coupling part 252 may be slid in the first slide hole 211_2 and the second slide hole 212_2, and may be located to be closer to the vertical axis (e.g., the z axis) than in the rotation state of the first angle. In the above-described operation process, with reference to the illustrated drawings, a first rail 211_3 of the first rotation part 211 may be rotated from a center of the fixing bracket 213 in a leftward outward direction, and a second rail 212_3 of the second rotation part 212 may be rotated from the center of the fixing bracket 213 in a rightward outward direction. Because the axes, about which the first rotation part 211 and the first arm part 221 are rotated, are different and the axes, about which the second rotation part 212 and the second arm part 222 are rotated, are different, a distance of the upper surface of the first bracket body 211_1 and the upper surface of the second bracket body 212_1 may be closer to the vertical axis (e.g., the z axis) than a distance between the upper surface of the first basic body 221_1 and the upper surface of the second basic body 222_1.

As described above, as the first arm part 221 is rotated in a state, in which the display 160 of the electronic device 100 is folded by a specific angle (e.g., the angle between the upper surface of the display 160 and the horizontal axis is 60 degrees or −60 degrees), at least a portion of the mountain of the first cam structure 221_4a may contact at least a portion of the mountain of the first cam 241a_1a of the first cam member 241a, and at least a portion of the mountain of the second cam structure 221_4b may contact at least a portion of the mountain of the third cam 241b_1a of the second cam member 241b. Similarly, as the second arm part 222 is rotated, at least a portion of the mountain of the third cam structure 222_4a may contact the mountain of the second cam 241a_1b of the first cam member 241a, and at least a portion of the mountain of the fourth cam structure 222_4b may contact the mountain of the fourth cam 241b_1b of the second cam member 241b.

In the above description, it has been described that the first angle state is a state, in which the inclined part that is adjacent to the mountain of the cam structure contacts the inclined part that is adjacent to the mountain of the cam and it has been described that the second angle state is a state, in which at least a portion of the mountain of the cam structure contacts the mountain of the cam, but the disclosure is not limited thereto. For example, the electronic device 100 may be in various angle states (e.g., an angle defined by the upper surface of the one side of the display and the horizontal axis is a free-stop state due to frictions between the cam structure and the cam, or various angles, for example, a unit of 1 degrees, a unit of 5 degrees, or 15 degrees, 30 degrees, 45 degrees, or 60 degrees), and portions, at which the inclined part between the mountain and the valley of the cam structure and the inclined part between the mountain and the valley of the cam contact each other, may be changed. Alternatively, according to the angle states, a size of an area, in which the mountain of the cam structure and the mountain of the cam contact each other, may be changed.

Figure 17:
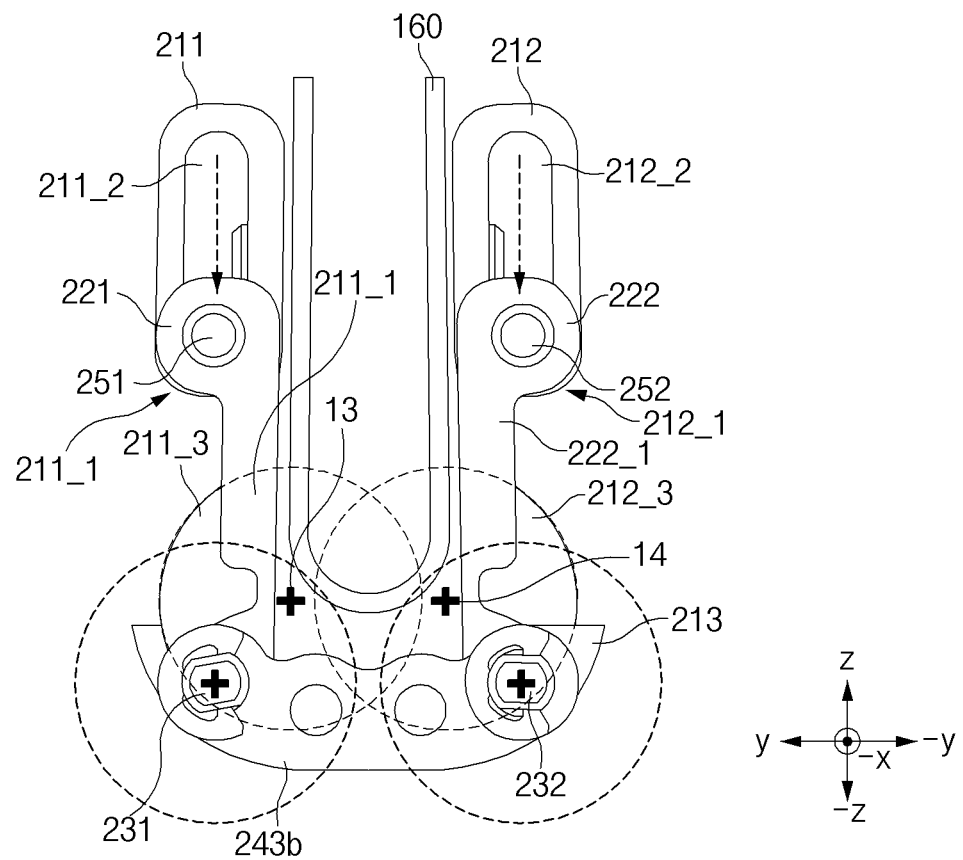
FIG. 17 is a view illustrating a second state of some structures of an electronic device according to certain embodiments.

FIG. 17 is a view illustrating the second state of some structures of the electronic device according to certain embodiments.

Referring to FIGS. 1, 3, and 17, the electronic device 100 may include the first hinge structure 200a and the display 160. The second state of the first hinge structure 200a may be the folded state. The first hinge structure 200a, for example, may include the fixing bracket 213, the first rotation part 211, the second rotation part 212, the first arm part 221, the second arm part 222, the first coupling part 251, the second coupling part 252, the first rotary shaft 231, the second rotary shaft 232, the shaft gears of the first rotary shaft 231 and the second rotary shaft 232, the idle gears 233 and 234, the first cam member 241a, the second cam member 241b, the first spring 242a, the second spring 242b, the third spring 242c, the fourth spring 242d, the center bracket 243a, and the shaft bracket 243b.

According to an embodiment, the first rotation part 211 and the second rotation part 212 may be disposed to face each other. As peripheral ends (e.g., an end in the z axis direction with reference to FIG. 17) of the first housing 110 and the second housing 120 are disposed to be adjacent to each other with reference to the illustrated drawings, the first rotation part 211 may be disposed to be parallel to the vertical axis (e.g., the z axis) or the first rotation part 211 may be rotated about the third axis 13 and may be inclined further by a specific angle in the −y axis direction with respect to the vertical axis (e.g., the z axis). According to certain embodiments, similarly to the first rotation part 211, the second rotation part 212 may be disposed to be parallel to the vertical axis (e.g., −z axis), or may be rotated about the fourth axis 14 and may be inclined further by a specific angle in the y axis direction with respect to the vertical axis (e.g., the z axis). The third axis 13, for example, may be a rotational center axis of the first rail 211_3, and the fourth axis 14 may be a rotational center axis of the second rail 212_3. The first arm part 221 may be rotated about the first rotary shaft 231 to be disposed in parallel to the first rotation part 211, and the second arm part 222 may be rotated about the second rotary shaft 232 to be disposed in parallel to the second rotation part 212. Accordingly, the central part 163 of the display 160 may be curved in a "U" shape, and the remaining areas thereof may be maintained in the flat state.

According to certain embodiments, while the first rotation part 211 and the first arm part 221 are disposed perpendicularly to each other (or to be inclined by a specific angle in the −y axis direction with respect to the vertical axis (e.g., −z axis)), the upper surface of the first bracket body 211_1 of the first rotation part 211 and the upper surface of the basic body 221_1 of the first arm part 221 may be disposed in parallel to each other with no height difference. Due to a difference between the lengths of the first rotation part 211 and the first arm part 221, the first coupling part 251 may be located on a lower side (e.g., a periphery thereof in the −z axis direction with reference to FIG. 17) of the first slide hole 211_2 of the first rotation part 211. According to certain embodiments, when the electronic device 100 is in the unfolded state, the first coupling part 251 may be located at an upper periphery of the first slide hole 211_2 of the first rotation part 211. Similarly, when the electronic device 100 is in the folded state, the second coupling part 252 may be located at a lower periphery of the second slide hole 2122.

According to certain embodiments, as the first arm part 221 is rotated in a state (e.g., a state, in which the central portion of the display 160 is deformed in a U shape), in which the display 160 of the electronic device 100 is folded, the mountain and the valley of the first cam structure 221_4a may be in a state, in which the mountain and the valley of the first cam 241a1 of the first cam member 241a may be engaged with the mountain and the valley of the first cam 241_1a of the first cam member 241a, and the mountain and the valley of the second cam structure 221_4b may be engaged with the valley and the mountain of the third cam 241b_1a of the second cam member 241b. Similarly, as the second arm part 222 is rotated, the mountain and the valley of the third cam structure 222_4a may be engaged with the valley and the mountain of the second cam 241a_1b of the first cam member 241a, and the mountain and the valley of the fourth cam structure 222_4b may be engaged with the valley and the mountain of the fourth cam 241b_1b of the second cam member 241b.

The electronic device 100 according to the above-described certain embodiments may increase a detent load of the hinge by implementing a plurality of cam structures without increasing a thickness of the hinge structure. The electronic device 100 may improve a phenomenon (e.g., a phenomenon, in which ends of the housings 110 and 120 are widened in the folded state) in the folded state or the unfolded state of the terminal in a room temperature or a low temperature even though a repulsive force (or a force, by which the display in the folded state tends to be unfolded, or a force to return to its original state, or power to restore) of the display 160 (or the flexible display), by using the increased detent load of the hinge structure. The electronic device 100 may allow an increase in the repulsive force of the display 160 through the improved detent load, and thus may increase a strength of the display 160 (e.g., the display 160 may be manufactured and applied to be thicker than before), and accordingly, cracks or surface damages of a part (e.g., the central part 163 of the display 160), in which the load is concentrated due to the folding thereof in the folded state may be reduced.

Figure 18A:
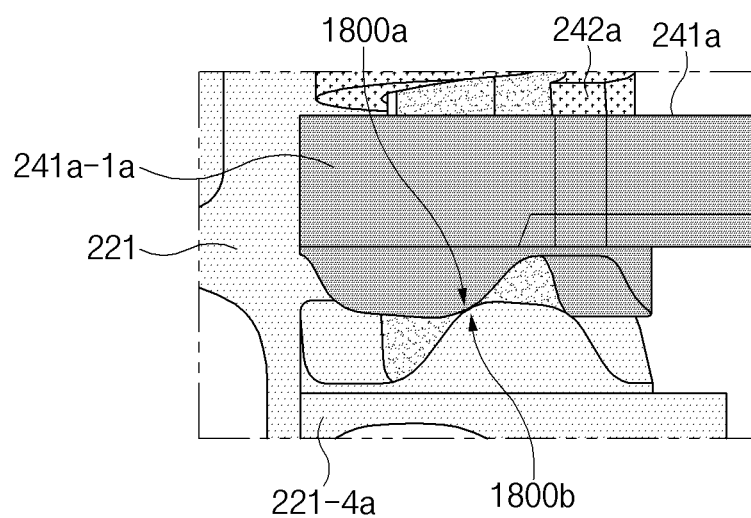
FIG. 18A is a view illustrating an example of a portion of a coupled state of a first arm part and a first cam member according to certain embodiments.
Figure 18B:
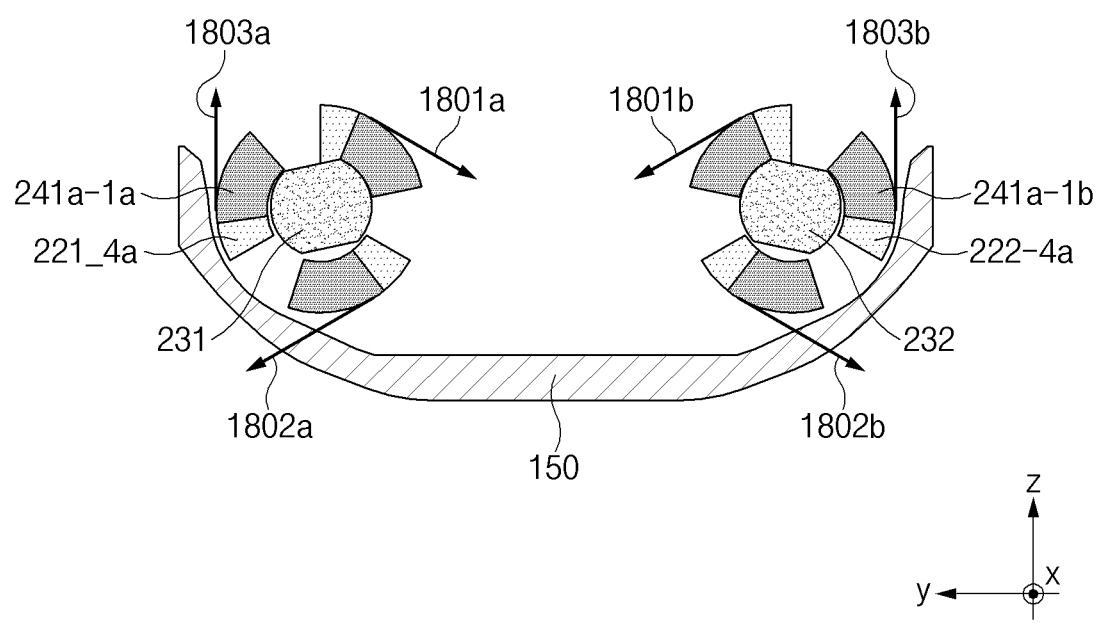
FIG. 18B is a view illustrating an example of a portion of a coupled state of a first arm part and a first cam member according to certain embodiments.
Figure 18C:
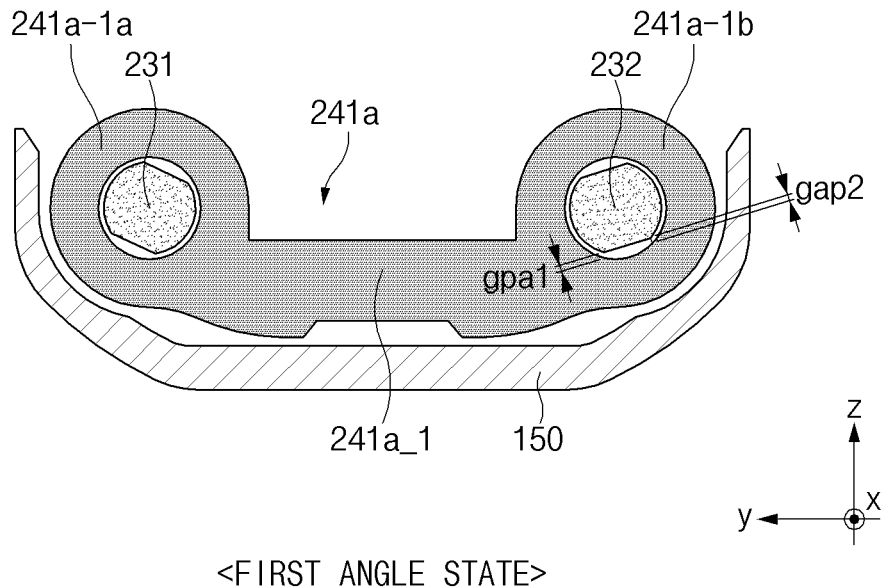
FIG. 18C is a view illustrating an example of a portion of a coupled state of a first arm part and a first cam member according to certain embodiments.
Figure 18C:
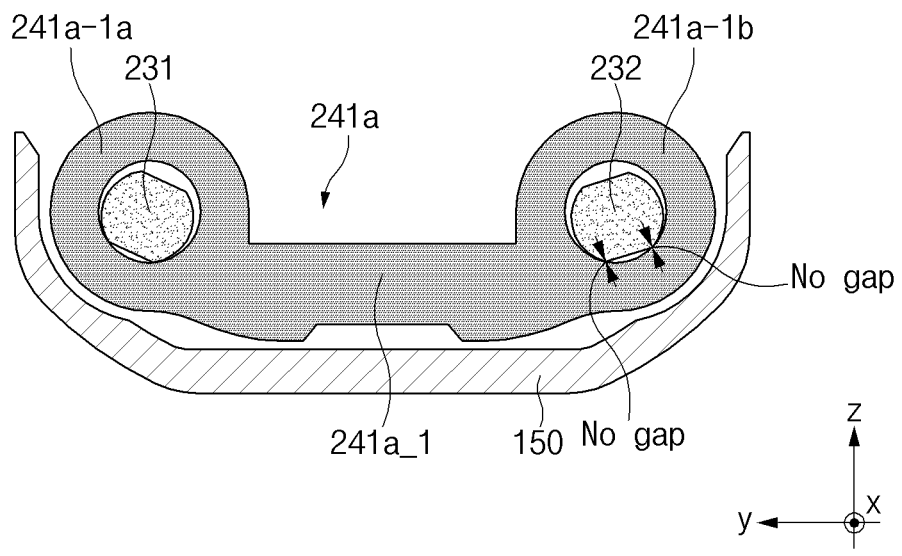

FIG. 18A is a view illustrating an example of a portion of a coupled state of the first arm part and the first cam member according to certain embodiments. FIG. 18B is a view illustrating an example of a portion of a coupled state of the first arm part and the first cam member according to certain embodiments. FIG. 18C is a view illustrating an example of a portion of a coupled state of the first arm part and the first cam member according to certain embodiments.

Referring to FIGS. 3 and 18A, the first cam structure 221_4a of the first arm part 221 may be disposed to be engaged with the first cam 241a_1a of the first cam member 241a. Holes may be formed on an inside of the first cam structure 221_4a and the first cam 241a_1a, and at least a portion of the first rotary shaft 231 may be inserted into the holes. As described above, at least a portion of an outer surface of the first rotary shaft 231 may be machined to be flat, and the remaining portions thereof may be machined to be curved. The hole of the first cam structure 221_4a may be formed to correspond to the shape of the z axis cross-section of the first rotary shaft 231. Accordingly, when the first cam structure 221_4a is rotated, the first rotary shaft 231 may be rotated. A cross-section of the hole inside the first cam 241a_1a may be circular, and may be larger than a cross-section of the first rotary shaft 231. The first arm part 221 may be rotated within a specific angle range in one direction, for example, the clockwise direction (or the counterclockwise direction) in correspondence to rotation of the first housing 110 connected to the first rotation part 211. Accordingly, the first cam structure 221_4a may be rotated in the clockwise direction (or the counterclockwise direction). When the first cam structure 221_4a is rotated and is moved along an inclination of the first cam 241a_1a in a state, in which the mountain of the first cam structure 221_4a and the valley of the first cam 241a_1a are engaged with each other, as illustrated, the mountain of the first cam structure 2214a and the mountain of the first cam 241a_1a may be disposed to contact each other. Then, the first cam 241a_1a may compress the first spring 242a while being linearly moved in the x axis direction. When the first cam structure 221_4a is additionally rotated in a state, in which the mountain of the first cam 241al a and the mountain of the first cam structure 221_4a are engaged with each other, a corner 1800a of the mountain of the first cam 241a_1a is disposed at a corner 1800b of the mountain of the first cam structure 221_4a, and then, the mountain of the first cam 241a_1a may be rotated to be engaged to the valley along an inclined path of the first cam structure 221_4a. In this operation, an force of the first spring 242a may be applied to increase an instantaneous rotational speed of the first cam member 241a while a compressed state of the first spring 242a is abruptly released.

Referring to FIGS. 3 and 18B, when a state of the foldable electronic device 100 is changed from the folded state to the unfolded state, the first cam structure 221_4a of the first arm part 221 may be rotated in the counterclockwise direction, and the third cam structure 222_4a of the second arm part 222 may be rotated in the clockwise direction. When the first cam structure 221_4a is rotated in the counterclockwise direction, the first cam 241a_1a engaged with the first cam structure 221_4a may generate a reactive force in the clockwise direction. For example, when the first cam 241al a includes three mountains, a rotational force 1801a in a first direction, a rotational force 1802a in a second direction, and a rotational force 1803a in a third direction may be generated in the three mountains, respectively. Similarly, the second cam 241a_1b engaged with the second cam structure 221_4b may generate a reactive force in the counterclockwise direction. For example, when the second cam 241a_1b includes three mountains, a rotational force 1801b in a fourth direction, a rotational force 1802b in a fifth direction, and a rotational force 1803b in a sixth direction may be generated in the three mountains, respectively. Here, rotational forces formed in the first cam 241a_1a and the second cam 241a_1b of the disclosure are described with reference to three mountains, for convenience of description, and the first cam 241a_1a and the second cam 241a_1b may generate centrifugal forces in various directions according to the rotation.

The rotational force 1801a of the first cam 241a_1a in the first direction may be a force that is symmetrical to the rotational force 1801b of the second cam 241a_1b in the fourth direction and they may be offset by each other. The rotational force 1802a of the first cam 241a_1a in the second direction may be a force that is symmetrical to the rotational force 1802b of the second cam 241a_1b in the fifth direction and they may be offset by each other. The rotational force 1803a (e.g., a force that faces the z axis direction) of the first cam 241a_1a in the third direction may be a force in the same direction as that of the rotational force 1803b (e.g., a force that faces the z axis direction) of the second cam 241a_1b in the sixth direction, and they may overlap each other. Accordingly, at least a portion of the first cam member 241a including the first cam 241a_1a and the second cam 241a_1b may be moved by a force that pushes up it in the z axis direction. By the above-described relationship between the rotational forces of the first cam 241a_1a and the second cam 241a_1b and a time point (a time point, at which the compression is released in a state, in which the corner 1800a of the mountain of the first cam 241a_1a and the corner 1800b of the mountain of the first cam structure 221_4a contact each other and the first spring 242a is compressed), at which inflection points occur in the forces of the first cam 241a_1a and the first cam structure 221_4a described above in FIG. 18A. Then, noise may be generated while an inner surface of the first cam 241a_1a collides with a surface of the first rotary shaft 231 (or an inner surface of the second cam 241a_1b collides with a surface of the second rotary shaft 232).

Referring to FIGS. 3 and 18C, the first cam member 241a may include the first cam 241a_1a, the second cam 241a_1b, and the cam body 241a_1 that connects the first cam 241a_1a and the second cam 241a_1b. A diameter of an inner hole of the first cam 241a_1a may be larger than a cross-section of the first rotary shaft 231, and may be formed such that the first rotary shaft 231 is rotated. A diameter of an inner hole of the second cam 241a_1b is similar to the diameter of the inner hole of the first cam 241al a, and is formed to be larger than a cross-section of the second rotary shaft 232 whereby the second rotary shaft 232 is rotated. Accordingly, gaps gap1 and gap2 may be formed between an outer surface of the second rotary shaft 232 and an inner surface of the hole of the second cam 241a_1b. Similarly, gaps also may be formed between an outer surface of the first rotary shaft 231 and an inner surface of the hole of the first cam 241a_1a.

The first spring 242a that applies force to the first cam 241a_1a may be inserted into the first rotary shaft 231 and may be in a compression or decompression state due to the linear movement of the first cam 241a*l* a, and the second spring 242*b* that applies force (or an elastic force) to the second cam 241*a*_1*b* may be inserted into the second rotary shaft 232 and may be in a compression or decompression state due to the linear movement of the second cam 241*a*_1*b*. The illustrated first angle state may include a state, in which the first spring 242*a* and the second spring 242*b* are compressed by a specific length or less. Furthermore, as described above in FIG. 18A, the state may be a state, in which the mountain of the first cam structure 221_4*a* and the mountain of the first cam 241*al* a are engaged with each other, or a state, in which the mountain of the second cam structure 2214*b* and the mountain of the second cam 241*a*1*b* are engaged with each other.

The first arm part 221 and the second arm part 222 are rotated from the folded state to the unfolded state such that the foldable electronic device is in the second angle state, and correspondingly, the first angle state, in which the mountain of the first cam 241*a*_1*a* and the mountain of the first cam structure 221_4*a* contact each other, may be released. For example, in the second angle state, the compression state of the first spring 242*a* and the compression state of the second spring 242*b* may be released. Then, while the second cam 241*a*_1*b* is moved in the z axis direction, it collides with one corner (a border of a flat area and a curved area of the second rotary shaft 232) of the second rotary shaft 232, which is spaced apart therefrom while the gaps gap1 and gap2 are interposed therebetween, generating noise. Similarly, while the first cam 241*a*_1*a* is moved in the z axis direction, it collides with one corner (a border of a flat area and a curved area of the first rotary shaft 231) of the first rotary shaft 231, which is spaced apart therefrom while the gaps are interposed (or in a no gap state, in which the gaps gap1 and gap2 disappear) therebetween, generating noise.

Figure 19A:
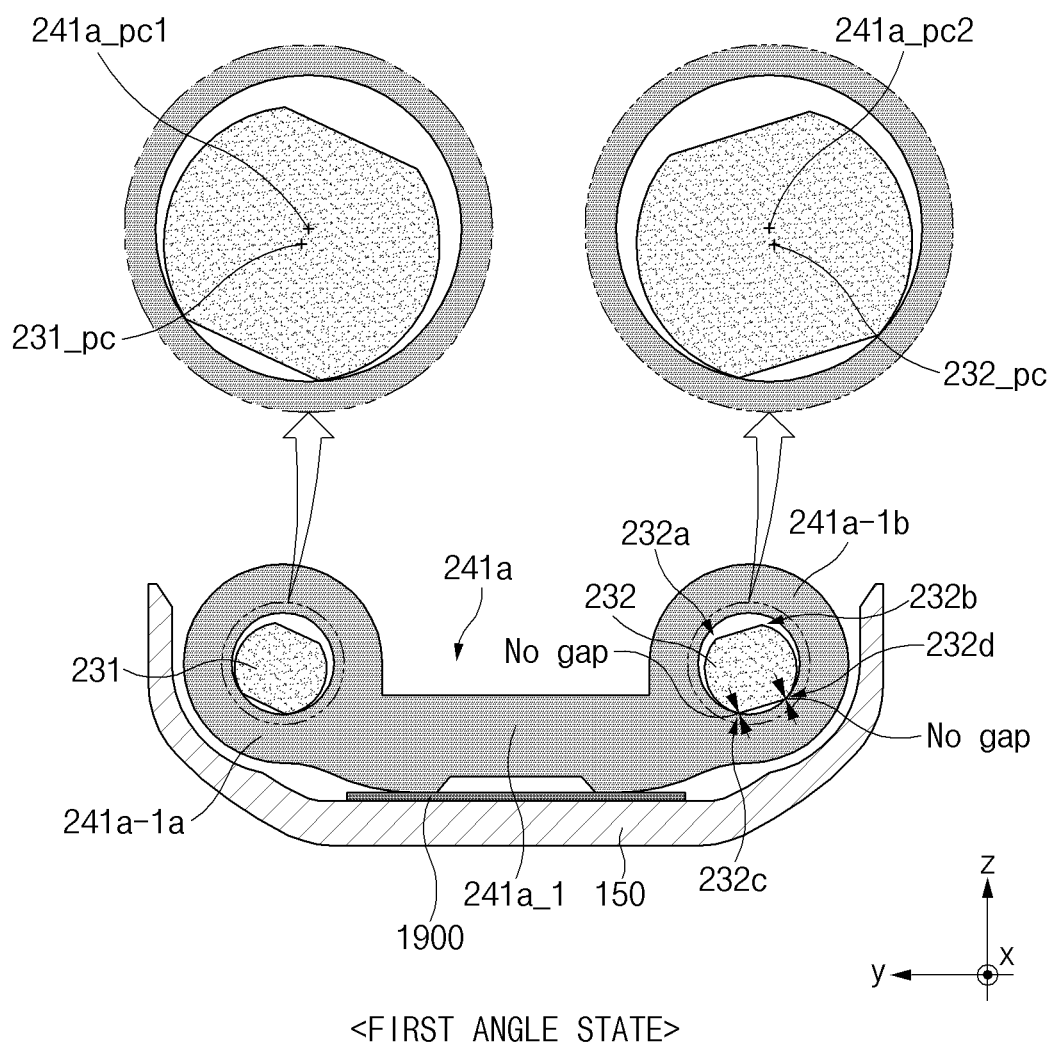
FIG. 19A is a view illustrating an example of a cross-section of a portion of a foldable electronic device related to an example of improvement of a cam operation environment according to certain embodiments.
Figure 19B:
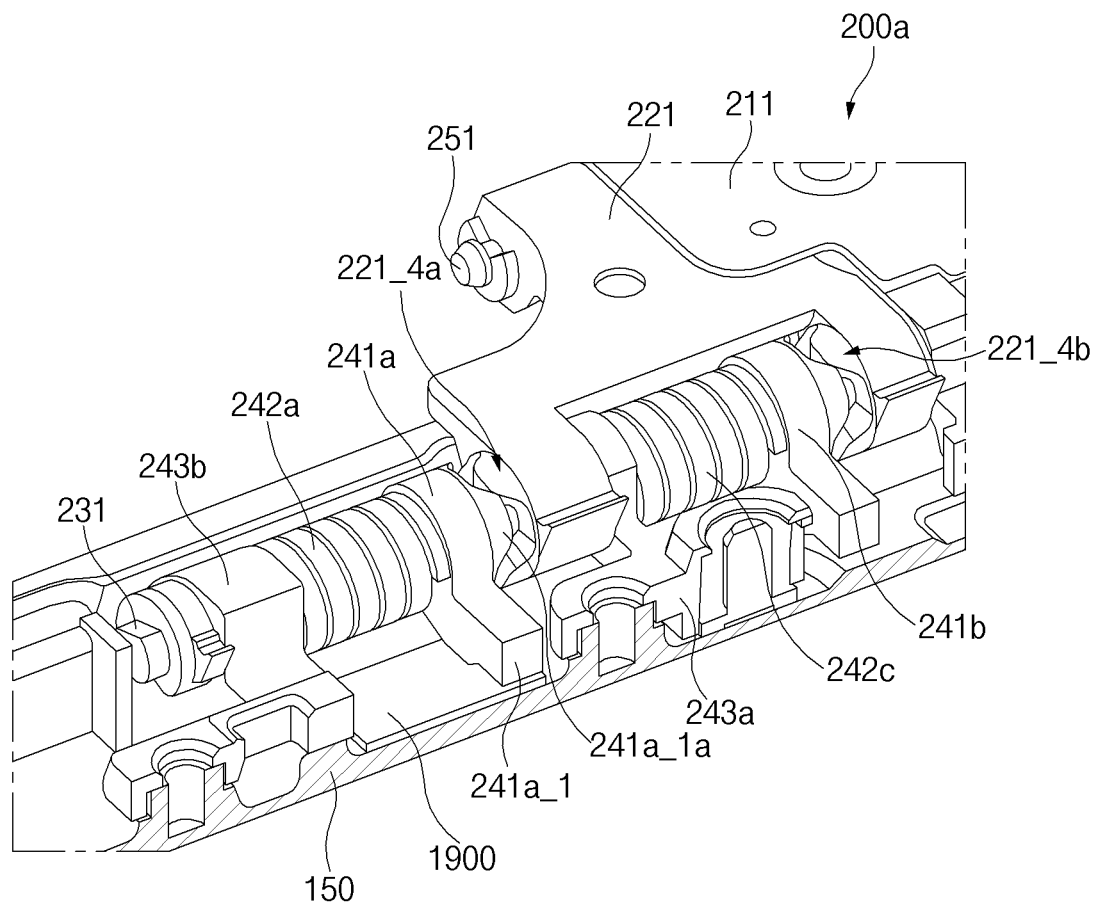
FIG. 19B is a perspective view illustrating some configurations of a foldable electronic device related to an example of improvement of a cam operation environment according to certain embodiments.

FIG. 19A is a view illustrating an example of a cross-section of a portion of the foldable electronic device related to an example of improvement of a cam operation environment according to certain embodiments. FIG. 19B is a perspective view illustrating some configurations of the foldable electronic device related to an example of improvement of a cam operation environment according to certain embodiments.

Referring to FIGS. 3, 19A, and 19B, at least a portion of the hinge structure 200*a* of the foldable electronic device 100 having an improved cam operation environment may include the first cam member 241*a* that is received in the hinge housing 150, and a support member 1900 disposed between the first cam member 241*a* and the hinge housing 150. In addition, the hinge structure 200*a* may include the first rotation part 211, the second rotation part 212, the first arm part 221 coupled to the first rotation part 211 through the first coupling part 251, the second arm part 222 coupled to the second rotation part 212 through the second coupling part 252, the first rotary shaft 231, the second rotary shaft 232, the first spring 242*a*, the second spring 242*b*, the third spring 242*c*, the fourth spring 242*d*, the shaft bracket 243*b*, the center bracket 243*a*, and the second cam member 241*b*.

The first cam member 241*a* may include the first cam 241*a*_1*a*, into which at least a portion of the first rotary shaft 231 is inserted, the second cam 241*a*_1*b*, into which at least a portion of the second rotary shaft 232 is inserted, and the cam body 241*a*1 that connects the first cam 241*al* a and the second cam 241*al* b. The cam body 241*a*_1 may be formed of the same material as that of the first cam 241*a*_1*a* or the second cam 241*a*_1*b*, and may extend from one side of the first cam 241*a*_1*a* to be integrally formed with one side of the second cam 241*a*_1*b*. At least a portion of a surface of the cam body 241*a*_1 in the z axis direction may be formed to be flat, and at least a portion thereof in the −z axis direction may have a protruding shape.

The support member 1900 may have a specific thickness and a specific area, and may be disposed in at least a partial area between the first cam member 241*a* and the hinge housing 150 to fix the first cam member 241*a* at a height that is spaced apart from a bottom surface of the hinge housing 150 by a specific height in the z axis direction. In consideration of the shape of the first cam member 241*a*, the support member 1900 may be disposed between a portion (at least a portion of a surface that faces the −z axis direction) of the cam body 241*a*_1 and at least a portion of a bottom surface (or the first cam member 241*a*) of an inside of the hinge housing. According to certain embodiments, the support member 1900 may be disposed between at least one of the first cam 241*al* a and the second cam 241*a*_1*b* and the bottom surface of the hinge housing 150. The support member 1900 may be disposed to push up the first cam member 241*a* in the z axis direction such that at least a portion of the second rotary shaft 232 (or the first rotary shaft 231) and at least a portion of an inner surface of the second cam 241*a*_1*b* (or the first cam 241*a*_1*a*) contact each other. For example, when the second rotary shaft 232 includes a first corner 232*a*, a second corner 232*b*, a third corner 232*c*, and a fourth corner 232*d* corresponding to borders of the flat area and the curved area as the second rotary shaft 232 includes the flat area, the third corner 232*c* and the fourth corner 232*d* disposed to be close to the bottom surface of the hinge housing 150 may contact an inner surface of the hole of the second cam 241*a*_1*b* even in the first angle state (e.g., a state, in which the first spring 242*a* and the second spring 242*b* are compressed, or a state, in which the mountain of the second cam structure 221_4*b* and the mountain of the second cam 241*a*_1*b* contact each other) as the support member 1900 pushes up the second cam 241*a*_1*b* in the z axis. Correspondingly, the first corner 232*a* and the second corner 232*b* may be spaced apart from an inside of the second cam 241*a*_1*b*. The above disposition state may be applied between the first cam 241*a*_1*a* and the first rotary shaft 231 in the same way.

Through the above-described structure, because the second rotary shaft 232 contacts the inner surface of the second cam 241*a*_1*b*, the foldable electronic device 100 may restrain collision of an outer surface of the second rotary shaft 232 and an inner surface of the hole of the second cam 241*a*_1*b* as the second rotary shaft 232 and the inner surface of the hole of the second cam 241*a*_1*b* contact each other even though the inflection points of the forces occur as displacements of the springs 242*a* and 242*b* are changed.

As the support member 1900 is applied, a first center 241*a*_*p*c1 of the first cam 241*a*_1*a* and a second center 231_*p*c of the first rotary shaft 231 may be in a deviating state (e.g., an eccentric state). Similarly, as the support member 1900 is applied, a third center 241*a*_*p*c2 of the second cam 241*a*_1*b* and a fourth center 232_*p*c of the second rotary shaft 232 may be in a deviating state (e.g., an eccentric state). Accordingly, the cam operation environment according to an embodiment may be understood that noise is restrained by removing the gaps at parts, in which the rotary shafts and the cams collide with each other while the eccentric states of the rotary shafts and the cams are maintained. The above-described eccentric state or the state, in which the third corner 232*c* and the fourth corner 232*d* contact the inner surface of the hole of the second cam 241a_1b may be maintained even in the second angle state described above in FIG. 18C and other various angle states.

Meanwhile, when the above-described foldable electronic device 100 includes a plurality of cam members (e.g., the first cam member 241a and the second cam member 241b), the support member 1900 may be disposed, respectively, to support the cam members 241a and 241b. Accordingly, a plurality of support members 1900 may be disposed on a bottom surface of an inside of the hinge housing 150.

Figure 19C:
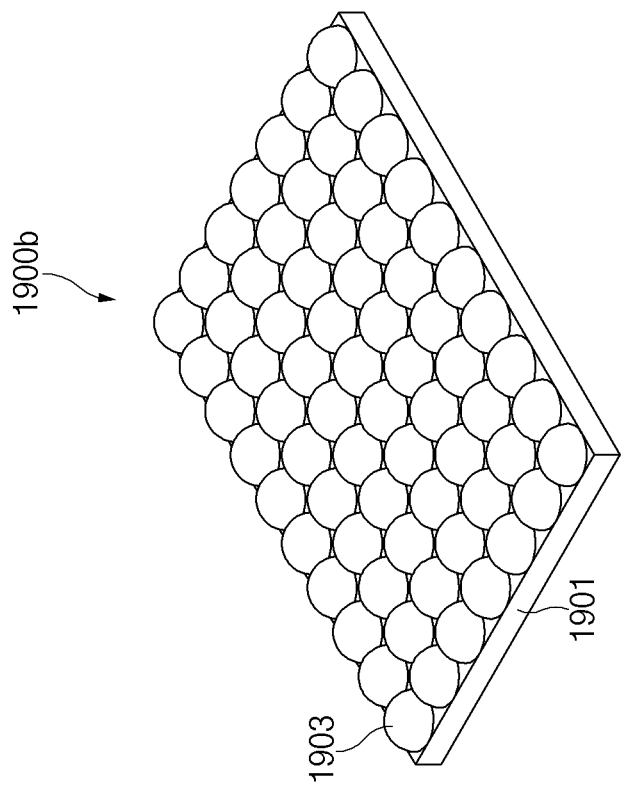
FIG. 19C is a view illustrating an example of various forms of a support member according to certain embodiments.
Figure 19C:
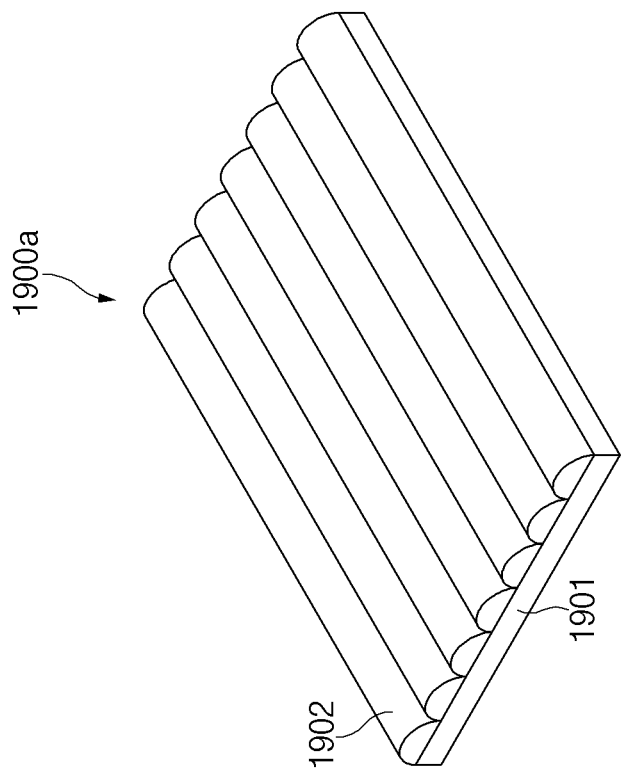

FIG. 19C is a view illustrating an example of various forms of the support member according to certain embodiments.

Referring to FIG. 19C, a first support member 1900a according to an embodiment may include a support board 1901, and a first pattern layer 1902 formed on the support board 1901. The support board 1901 and the first pattern layer 1902 may be formed of the same material, for example, plastic or a plastic compound. Alternatively, the support board 1901 and the first pattern layer 1902 may be formed of different materials. At least a portion of the first pattern layer 1902 may be formed of a specific material, for example, rigid engineering plastic (e.g., polyethylene terephthalate (PET) or polycarbonate (PC) such that dust is prevented from being generated by contacts or frictions with the first cam member 241a. At least a portion of the first pattern layer 1902, for example, may include a plurality of convex rail type (e.g., a prism type or lenticular type) area that are formed long in a direction, in which the first cam member 241a is linearly moved.

A second support member 1900b according to certain embodiments may include the support board 1901, and a second pattern layer 1903 formed on the support board 1901. The support board 1901 and the second pattern layer 1903 may be formed of the same material, for example, plastic or a plastic compound. Alternatively, the support board 1901 and the second pattern layer 1903 may be formed of different materials. Similarly to the first pattern layer 1902, at least a portion of the second pattern layer 1903 may be formed of a specific material, for example, rigid engineering plastic (e.g., polyethylene terephthalate (PET) or polycarbonate (PC) such that dust is prevented from being generated by contacts or frictions with the first cam member 241a. At least a portion of the second pattern layer 1903, for example, may include a dome lattice form area, in which a plurality of protrusions are disposed in a matrix form.

Figure 20:
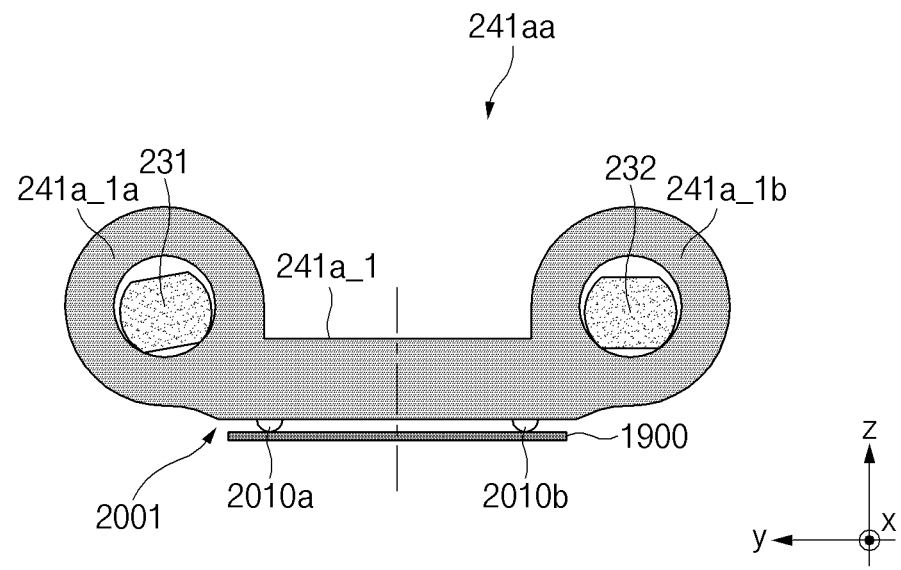
FIG. 20 is a view illustrating one form of a cam member according to certain embodiments.
Figure 20:
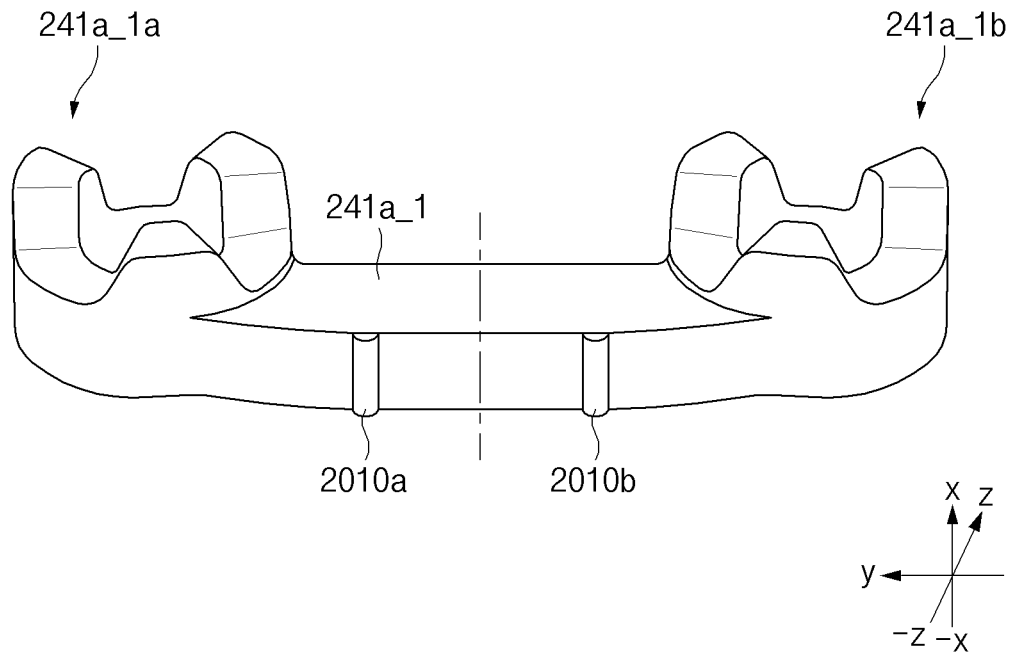

FIG. 20 is a view illustrating one form of the cam member according to certain embodiments.

Referring to FIG. 20, a first type cam member 241aa according to an embodiment may include the first cam 241a1a, the second cam 241a1b, and the cam body 241a_1. At least a portion of the first rotary shaft 231 may be inserted into the hole of the first cam 241a_1a, and at least a portion of the second rotary shaft 232 may be inserted into the hole of the second cam 241a_1b. The support member 1900 may be disposed below (e.g., a lower side in the –z axis) the first type cam member 241aa and between the first cam member 241a and the hinge housing 150. At least a portion of the first type cam member 241aa, which faces the z axis direction, may include a flat area, and at least a portion 2001 thereof, which faces the –z axis direction, may include a flat area, and a first rail protrusion 2010a and a second rail protrusion 2010b. The first rail protrusion 2010a and the second rail protrusion 2010b may be disposed to be symmetrical to each other on the left and right sides of the center line. Alternatively, a distance of the center line to the first rail protrusion 2010a and a distance of the center line to the second rail protrusion 2010b may be the same. The first rail protrusion 2010a and the second rail protrusion 2010b may have a length in the x axis direction that is larger than a length in the y axis direction, and may have a semi-cylindrical shape, an interior of which is filled. Because the first rail protrusion 2010a and the second rail protrusion 2010b contact (e.g., line-contact) the support member 1900, a contact form between the support member 1900 and the first type cam member 241aa may become a line-contact to restrict the contact size to a specific size or less whereby a frictional force of the first type cam member 241aa by the support member 1900 may be restricted to a specific size or less. Based on this, the foldable electronic device 100 may secure a linear movement of the first type cam member 241aa.

Figure 21:
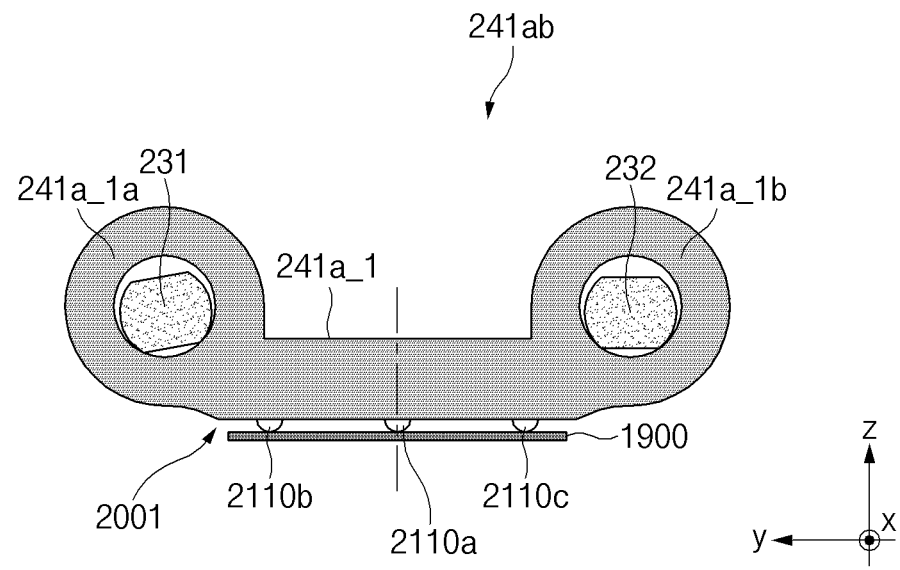
FIG. 21 is a view illustrating another form of a cam member according to certain embodiments.
Figure 21:
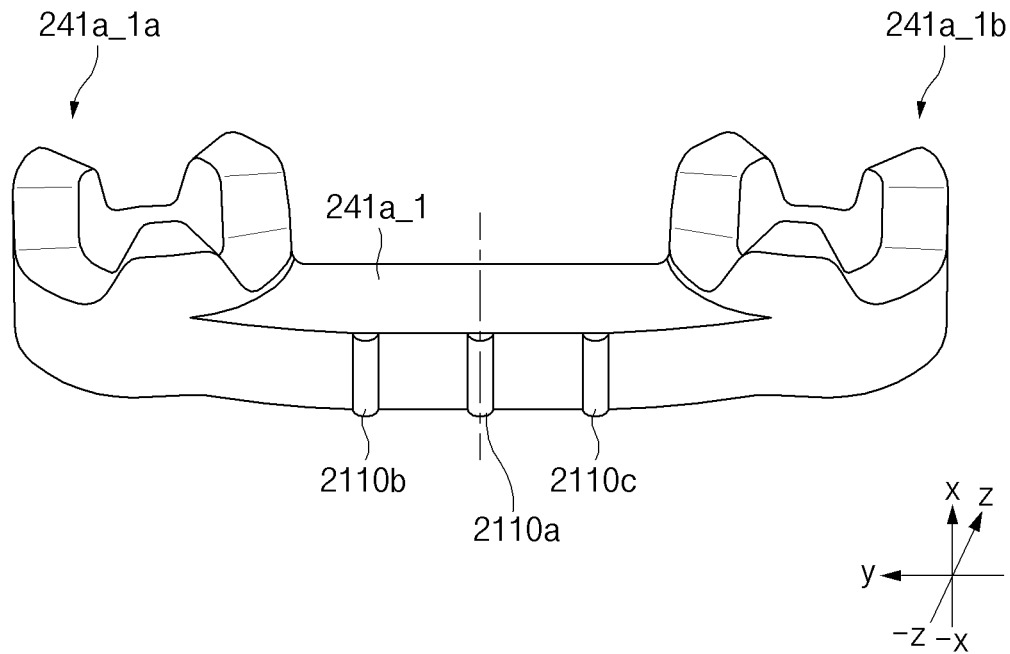

FIG. 21 is a view illustrating another form of a cam member according to certain embodiments.

Referring to FIG. 21, a second type cam member 241ab according to an embodiment may include the first cam 241a_1a, the second cam 241a_1b, and the cam body 241a_1. At least a portion of the first rotary shaft 231 may be inserted into the hole of the first cam 241a_1a, and at least a portion of the second rotary shaft 232 may be inserted into the hole of the second cam 241a_1b. The support member 1900 may be disposed below (e.g., a lower side in the –z axis) the second type cam member 241ab and between the first cam member 241a and the hinge housing 150. At least a portion of the second type cam member 241ab, which faces the z axis direction, may include a flat area, and at least a portion 2110 thereof, which faces the –z axis direction, may include a flat area, and a third rail protrusion 2110a, a fourth rail protrusion 2110b, and a fifth rail protrusion 2110c. The third rail protrusion 2110a may be disposed on the center line. The fourth rail protrusion 2110b and the fifth rail protrusion 2110c may be disposed to be symmetrical to each other on the left and right sides of the center line. The third rail protrusion 2110a, the fourth rail protrusion 2110b, and the fifth rail protrusion 2110c may have the same shape. For example, the third rail protrusion 2110a, the fourth rail protrusion 2110b, and the fifth rail protrusion 2110c may have a length in the x axis direction that is larger than a length in the y axis direction, and may have a semi-cylindrical shape, an interior of which is filled. The second type cam member 241ab of the structure may restrict the contact size to a specific size or less (or a line contact form) while contacting the support member 1900 to restrict generated frictional forces to a size magnitude or less whereby linear movement of the second type cam member 241ab that is necessary for a cam operation of the foldable electronic device 100 may be secured. Because the fourth rail protrusion 2110b is disposed at a center line of the above-described second type cam member 241ab and the third rail protrusion 2110a and the fifth rail protrusion 2110c are disposed on opposite sides thereof, the second type cam member 241ab may support the cam body 241a_1 more stably while the second type cam member 241ab is moved linearly.

Figure 22:
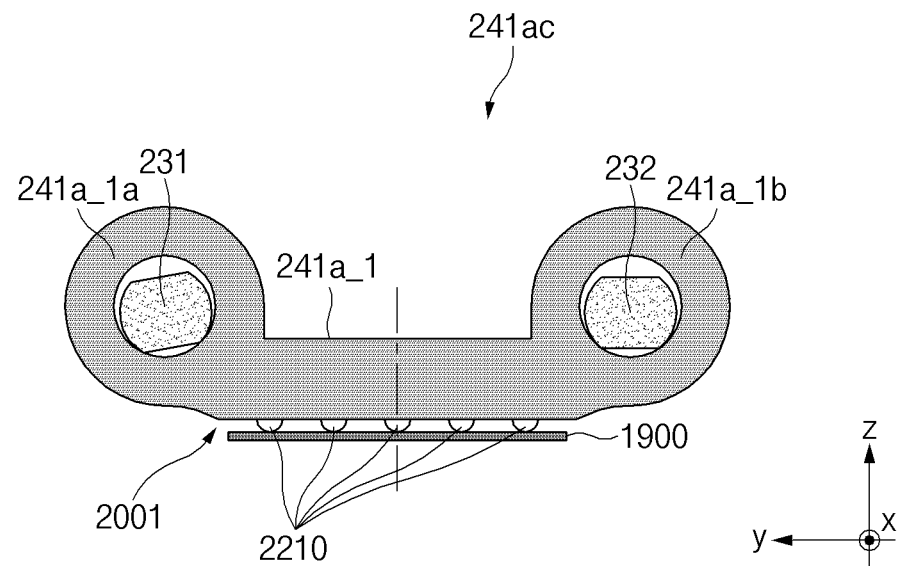
FIG. 22 is a view illustrating another form of a cam member according to certain embodiments.
Figure 22:
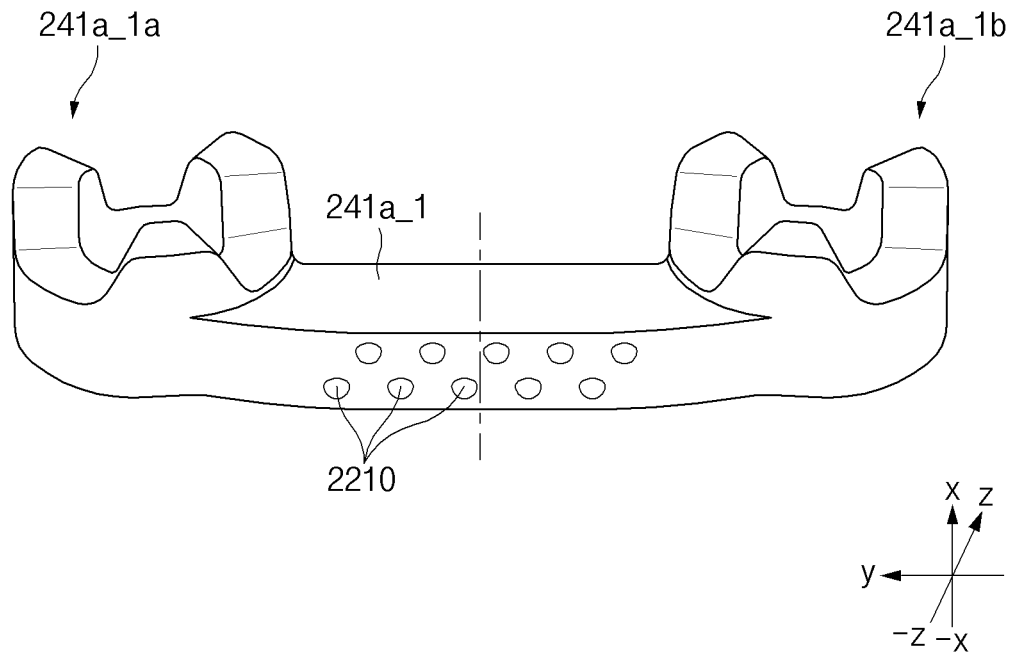

FIG. 22 is a view illustrating another form of the cam member according to certain embodiments.

Referring to FIG. 22, a third type cam member 241ac according to an embodiment may include the first cam 241a1a, the second cam 241a_1b, and the cam body 241a_1. At least a portion of the first rotary shaft 231 may be inserted into the hole of the first cam 241a_1a, and at least a portion of the second rotary shaft 232 may be inserted into the hole of the second cam 241a_1b. The support member 1900 may be disposed below (e.g., a lower side in the –z axis) the third type cam member 241ac and between the first cam member 241a and the hinge housing 150. At least a portion of the third type cam member 241ac, which faces the z axis direction, may include a flat area, and at least the portion 2001 thereof, which faces the −z axis direction, may include a flat area and a plurality of protrusions 2210. The plurality of protrusions 2210 may have the same height and may have a semispherical shape. The contact state of the plurality of protrusions 2210 may be maintained in a point contact state while they uniformly contact an upper surface (e.g., a surface in the z axis direction) of the support member 1900 whereby frictional forces by the contact with the support member 1900 may be restricted to a specific magnitude or less.

Figure 23A:
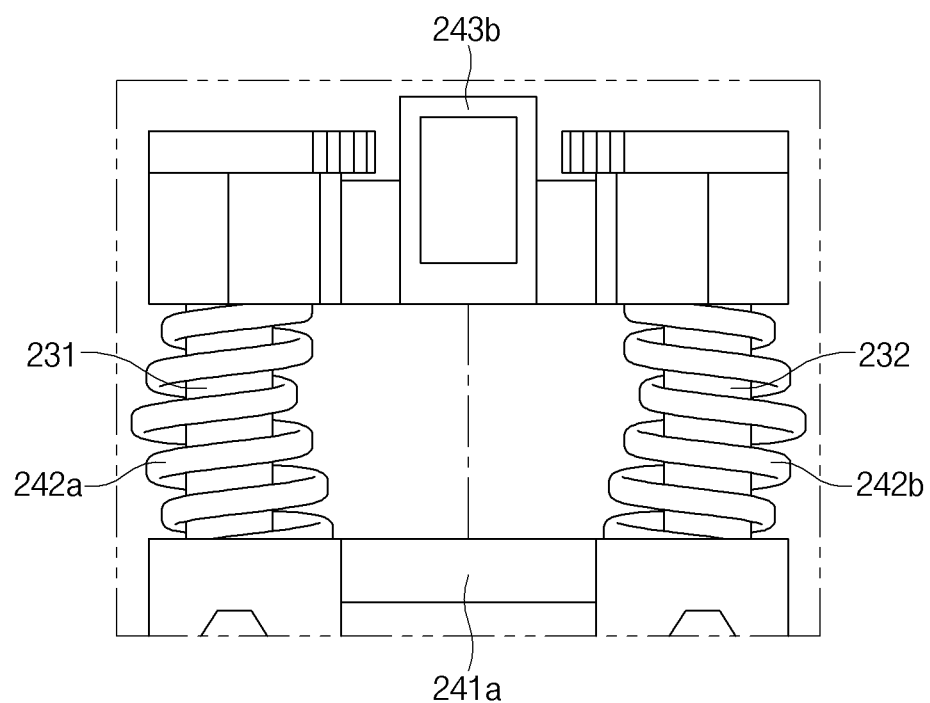
FIG. 23A is a view illustrating an example of arrangement of a spring related to improvement of a cam operation environment according to certain embodiments.
Figure 23A:
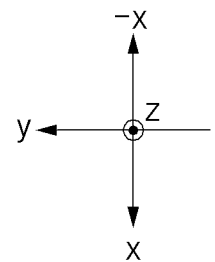
Figure 23B:
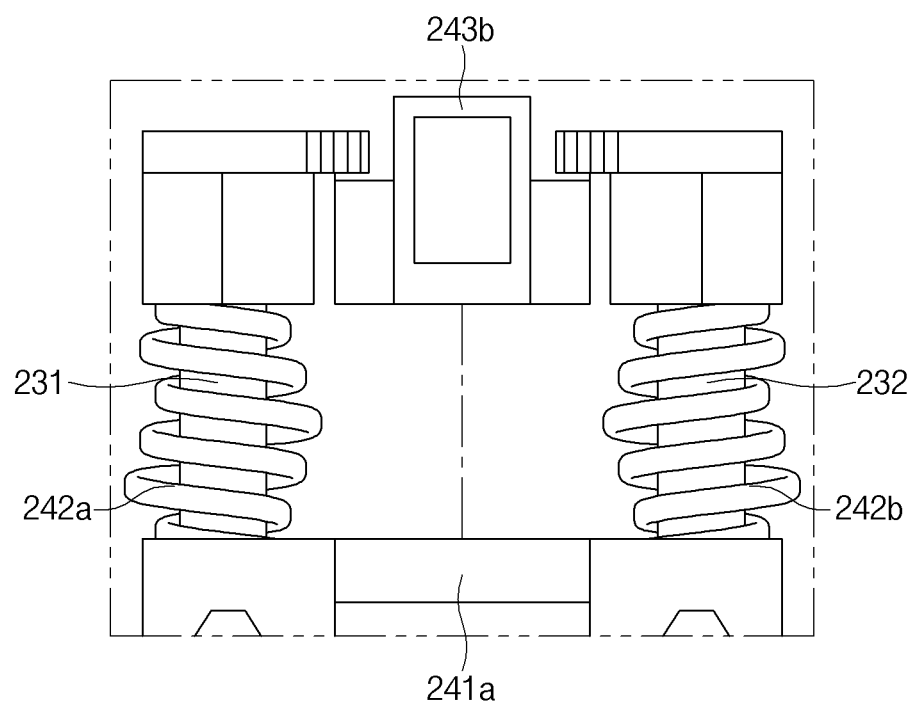
FIG. 23B is a view illustrating another example of arrangement of a spring related to improvement of a cam operation environment according to certain embodiments.

FIG. 23A is a view illustrating an example of arrangement of the spring related to improvement of a cam operation environment according to certain embodiments. FIG. 23B is a view illustrating another example of arrangement of the spring related to improvement of a cam operation environment according to certain embodiments.

Referring to FIGS. 1A, 3, and 23A, at least a portion of the hinge structure 200a applied to the foldable electronic device 100 may include the first cam member 241a, the first rotary shaft 231, the first spring 242a, the second rotary shaft 232, the second spring 242b, and the shaft bracket 243b. The shaft bracket 243b may fix the hinge structure 200a to the hinge housing 150. The first spring 242a is a spring type, and the first rotary shaft 231 may be inserted thereinto. The second spring 242b is a spring type, and the second rotary shaft 232 may be inserted thereinto. As the first spring 242a and the second spring 242b are compressed in the assembling process, they may buckle in a specific direction. Because the first cam member 241a may be biased in one direction by the forces applied by the springs 242a and 242b according to the buckling directions of the springs 242a and 242b, as illustrated, the buckling direction of the first spring 242a and the buckling direction of the second spring 242b may be disposed to be symmetrical to each other with respect to the center point 2301 of the first spring 242a and the second spring 242b. For example, as illustrated in FIG. 23A, the buckling direction of the first spring 242a may be the y axis direction, and the buckling direction of the second spring 242b may be the −y axis direction. Alternatively, the buckling direction of the first spring 242a and the buckling direction of the second spring 242b may be directions that become farther away from the center line 2301. According to certain embodiments, as illustrated in FIG. 23B, the buckling direction of the first spring 242a may be the −y axis direction, and the buckling direction of the second spring 242b may be the y axis direction. Alternatively, the buckling direction of the first spring 242a and the buckling direction of the second spring 242b may be the direction of the center line 2301. As illustrated in FIGS. 23A and 23B described above, because the buckling direction of the first spring 242a and the buckling direction of the second spring 242b are disposed to be symmetrical to each other with respect to the center line 2301, the influences due to the buckling of the first spring 242a and the second spring 242b may be offset by each other.

Figure 23C:
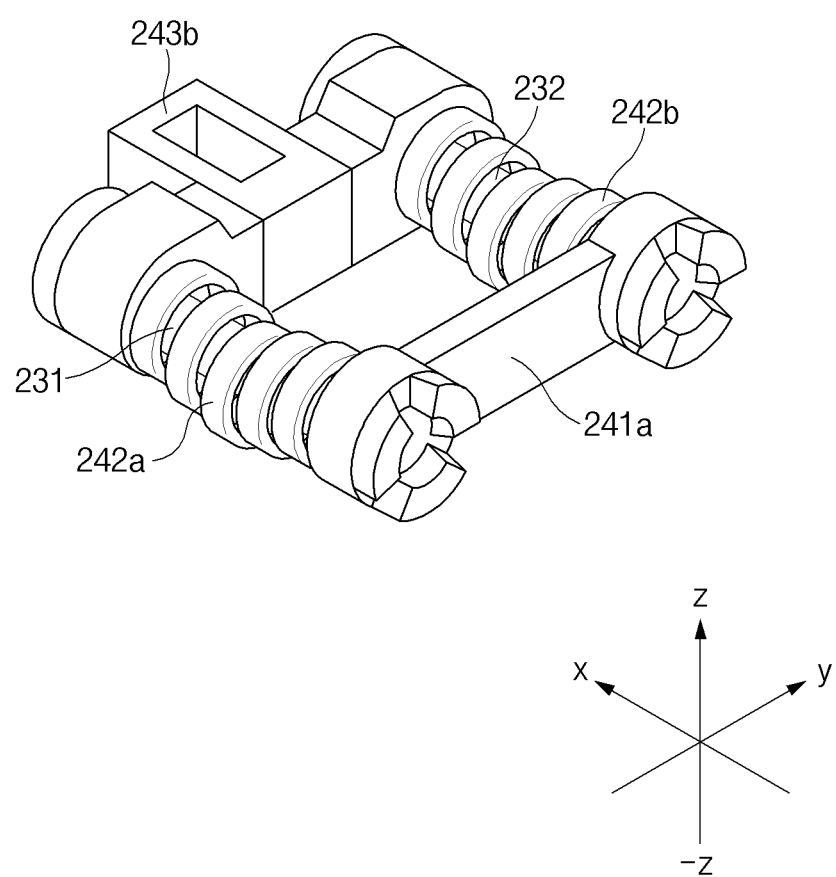
FIG. 23C is a view illustrating another example of arrangement of a spring related to improvement of a cam operation environment according to certain embodiments.

FIG. 23C is a view illustrating another example of arrangement of the spring related to improvement of a cam operation environment according to certain embodiments.

Referring to FIG. 23C, the buckling direction of the first spring 242a and the buckling direction of the second spring 242b may be the −z axis direction (e.g., a direction of the bottom surface of the hinge housing 150). Accordingly, because the buckling directions of the first spring 242a and the second spring 242b are the −x axis direction, the forces of the first spring 242a and the second spring 242b in the compressed state may act to push up the first cam member 241a in the z axis direction. Elastic operations due to the buckling of the first spring 242a and the second spring 242b may support the function of the support member 1900, which has been described above in FIG. 19A and the like, for example, a function of maintaining a state, in which the inner surface of the hole of the second cam 241a_1b and the corner of the second rotary shaft 232 contact each other. The buckling directions of the first spring 242a and the second spring 242b may be changed by adjusting locations, at which ends of the first spring 242a and the second spring 242b contact the first cam member 241a (e.g., rotating the first spring 242a and the second spring 242b) in a process of inserting the first spring 242a and the second spring 242b into the first rotary shaft 231 and the second rotary shaft 232.

Figure 24A:
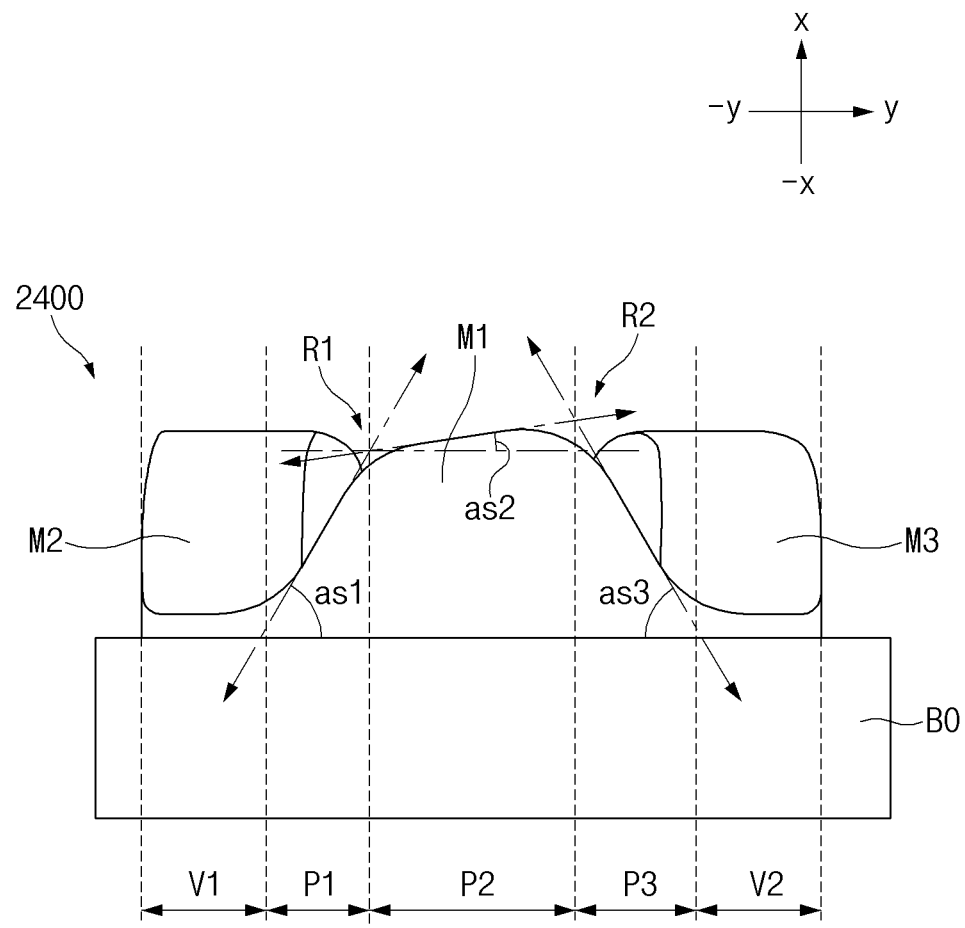
FIG. 24A is a view illustrating another example of a shape of a cam according to certain embodiments.
Figure 24B:
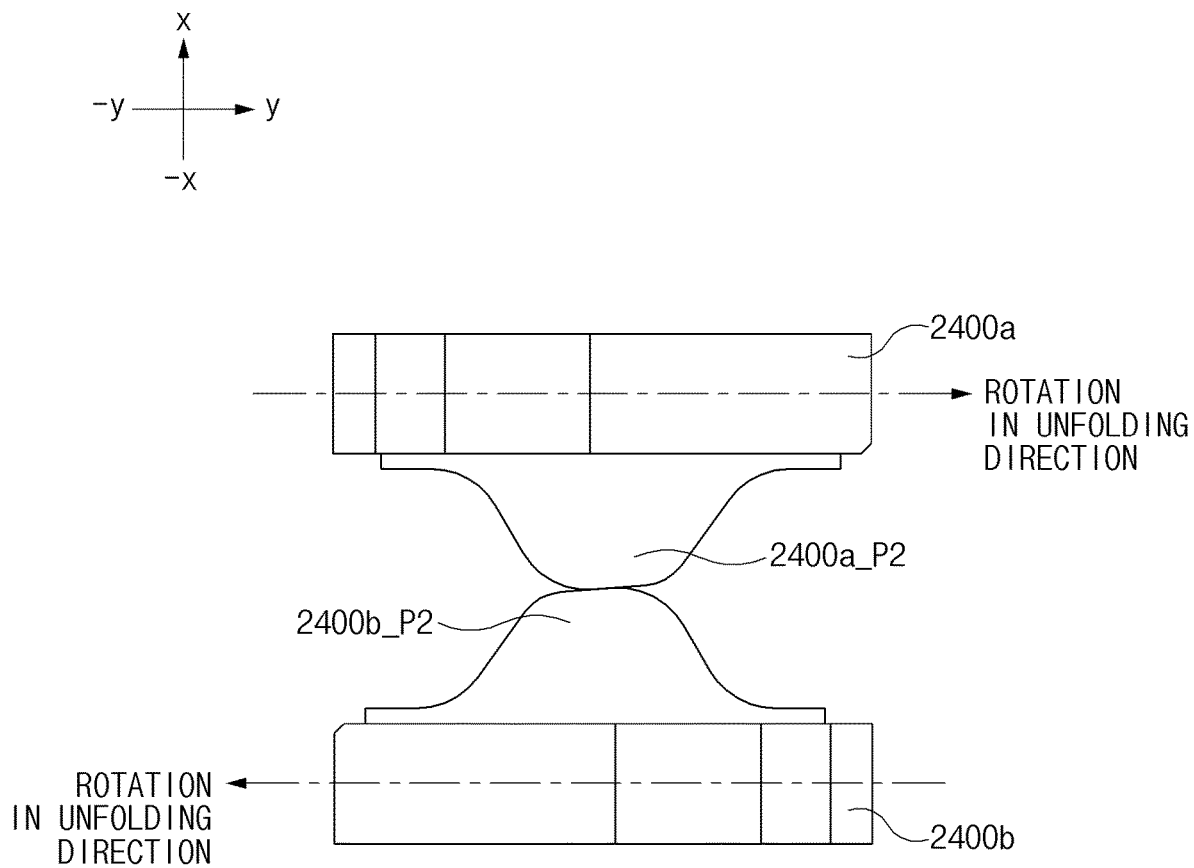
FIG. 24B is a view illustrating an example of a contact state of a cam and some mountains of a cam structure according to certain embodiments.

FIG. 24A is a view illustrating another example of a shape of the cam according to certain embodiments. FIG. 24B is a view illustrating an example of a contact state of the cam and some mountains of the cam structure according to certain embodiments. Prior to a description, a cam 2400a according to an embodiment may be applied to at least one of the cam or the cam structure described above in FIGS. 2 to 23A.

Referring to FIG. 24A, the cam 2400a (or the cam structure) according to the embodiment may include a cam support portion B0, a plurality of peaks M1, M2, and M3, and a plurality of valleys V1 and V2. Although the illustrated drawings suggest the cam 2400a including three peaks M1, M2, and M3 and three valleys V1 and V2 (a valley covered by the first peak M1 is not illustrated), the disclosure is not limited thereto. For example, the cam 2400a may have a structure including two or more cams and valleys. All of the plurality of peaks M1, M2, and M3 may have the same structure. Furthermore, a peak of at least one of the plurality of peaks M1, M2, and M3 may have formed that are different from those of the other peaks. For example, as illustrated, at least one peak may have a structure, in which a second part P2 corresponding to the center of the peak has a specific inclination angle (an inclination angle that is larger than 0, for example, around about 5 degrees), and at least one of the remaining mountains may have a structure, in which a central portion of the mountain is flat.

According to an embodiment, at least one peak of the plurality of peaks M1, M2, and M3, for example, the first peak M1, as illustrated, may include a first part P1 having a first inclination angle as1, the second part P2 having a second inclination angle as2, and a third part P3 having a third inclination angle as3. One side (e.g., a −y axis end) of the first part P1 is connected to one side (e.g., a y axis end) of the first valley V1, and an opposite side (e.g., ay axis end) of the first part P1 may be connected to one side (e.g., a −y axis end) of the second part P2. The first part P1, for example, may have a mountain line having the first inclination angle as1 with respect to the y axis. The first inclination angle as' may include an acute angle that is smaller than 90 degrees from the −y axis to the y axis direction with respect to the x axis.

One side (e.g., a −y axis end) of the second part P2 is connected to an opposite side (e.g., a y axis end) of the first part P1, and an opposite side (e.g., a y axis end) of the second part P2 may be connected to one side (e.g., a −y axis end) of the third part P3. The second part P2 may be disposed to protrude further than the first part P1 and the third part P3 in the x axis direction. A border area of the first part P1 and the second part P2 may be rounded at a specific curvature R1. The second part P2 may have the second inclination angle as2 with respect to the y axis. The second inclination angle as2 may include an acute angle that is smaller than 90 degrees from the −y axis in the y axis direction with respect to the x axis, and an absolute angle of the second inclination angle as2 may be smaller than an absolute value of the first inclination angle as1.

One side (e.g., a −y axis end) of the third part P3 may be connected to an opposite side (e.g., a y axis end) of the second part P2, and an opposite side (e.g., a y axis end) of the third part P3 may be connected to one side (e.g., a −y axis end) of the second valley V2. The third part P3 may be formed to have a specific inclination that is inclined from the second part P2 in they axis direction. A border area of the second part P2 and the third part P3 may be rounded at a specific curvature R2. The second curvature R2 may have a value (e.g., the first curvature R1 is smoother than the second curvature R2) that is smaller than the first curvature R1. The third part P3 may have the third inclination angle as3 with respect to the −y axis. The third inclination angle as3 may include an acute angle that is smaller than 90 degrees from the −y axis in the y axis direction with respect to the x axis, and an absolute angle of the third inclination angle as3 may be larger than an absolute value of the second inclination angle as2. According to certain embodiments, an absolute value of the third inclination angle as3 may be the same as or larger than the absolute value of the first inclination angle as1.

Referring to FIG. 24B, the cam shape described in FIG. 24A may be applied to the at least one cam or the at least one cam structure described above in FIGS. 2 to 23. For example, in the illustrated drawings, a protrusion of the cam 2400a may be disposed to protrude from the x axis in the −x axis direction, and a protrusion of a cam structure 2400b may be disposed to protrude from the −x axis in the x axis direction. Furthermore, a convexo-concave part of the cam 2400a and a convexo-concave part of the cam structure 2400b may be disposed to face each other. At least a portion of the second part 2400a_P2 of the cam 2400a and at least a portion of the second part 2400b_P2 of the cam structure 2400b, as illustrated, may contact each other in a free-stop section (a section, in which the electronic device is held at a specific angle range due to the friction of the cam 2400a and the cam structure 2400b) of the electronic device (e.g., the electronic device 100 of FIG. 2). According to an embodiment, when the electronic device is in the free-stop state described in FIG. 15 or 16, a repulsive force for restoring the display (the display 160 of FIG. 1 or 2) to the unfolding state (the state of FIG. 14) may be shown.

According to an embodiment, the cam 2400a may be pushed in the y axis direction by a restoring force of the display (e.g., a repulsive force of the display is applied in the counter clockwise direction), and the cam structure 2400b may be pushed in the −y axis direction by a restoring force of the display (e.g., a repulsive force of the display is applied in the clockwise direction). In this process, because the second part 2400a_P2 of the cam 2400a and the second part 2400b_P2 of the cam structure 2400b contact each other while having the above-described second inclination angle as2, the cam 2400a and the cam structure 2400b of the disclosure may restrain pushing (e.g., an angle between the first housing (e.g., the first housing 110 of FIG. 2) and the second housing (e.g., the second housing 120 of FIG. 1 or 2) in the free-stop state, which may occur regardless of an intention of the user by offsetting at least a portion of the repulsive force (or the restoring force) generated in the unfolding direction of the display. According to certain embodiments, as described above in FIG. 15 or 16, the electronic device may be in a holding state (or a free-stop state) of a specific angle. In this case, the electronic device, as illustrated, may be disposed such that the cam 2400a and the cam structure 2400b are engaged with each other, and may offset a force, by which the repulsive force or the restoring force is applied in the unfolded state as in FIG. 14. Although FIG. 24B exemplifies a structure, in which apex portions of the mountains of both of the cam 2400a and the cam structure 2400b have the second inclination angle as2, the disclosure is not limited thereto. For example, the second part P2 having the second inclination angle as2 may be formed in any one of the cam 2400a or the cam structure 2400b.

Meanwhile, although FIG. 24B is illustrated with respect to a direction, in which the cam 2400a is rotated from the −y axis (or the left side) in the y axis (or rightward) direction, the disclosure is not limited thereto. For example, according to a design layout of the electronic device, a direction, in which the cam 2400a is rotated from the y axis in the −y axis direction, may be a direction, in which the display is operated in the unfolded state, from the folded state. Furthermore, in the illustrated description, the structure, in which the cam 2400a is rotated in the y axis direction and the cam 2400b is rotated in the −y axis direction, has been described, but as described above, the cam disposed in the cam member may not be rotated but may be linearly moved. Accordingly, any one of the cam 2400a or the cam 2400b may be fixed, and the other may be rotated in the clockwise direction or the counterclockwise direction. In this case, an inclined surface, in which an inclination increases in a rotational direction that is opposite to a direction, in which the flexible display is to be unfolded, may be formed in the corresponding cams 2400a and 2400b.

According to certain embodiments, a foldable electronic device may include a first housing 110, a second housing 120, a hinge structure 200 coupling the first housing and the second housing, and a flexible display 160, at least a first portion 161 of which is positioned on the first housing 110 and a second portion 162 is positioned on the second housing 120, and the hinge structure may include a fixing member 213, a first rotary member 211 coupled to the fixing member 213 and a second rotary member 212 coupled to the fixing member 213, a first rotary shaft 231, wherein one end of the rotary shaft is held on one side of the fixing member, a second rotary shaft 232, wherein one end of the second rotary shaft is held on an opposite side of the fixing member, a first arm part 221 coupled to the first rotary member, into which the first rotary shaft is inserted, a first cam structure 221_4a disposed in the first arm part, a second arm part 222 coupled to the second rotary member, into which the second rotary shaft is inserted, a second cam structure 222_4a disposed in the second arm part, a first cam member 241a including a first cam, into which the first rotary shaft is inserted, and engaged with the first cam structure, a second cam, into which the second rotary shaft is inserted, and engaged with the second cam structure, and a cam body connecting the first cam and the second cam, and a support member 1900 disposed between the first cam member and the hinge housing.

According to certain embodiments, the first cam member may include metal, and the support member includes plastic.

According to certain embodiments, a plurality of protrusions may be disposed in the cam body that faces the support member.

According to certain embodiments, rail protrusions having a length in a reciprocation direction of the first cam member may be disposed in the cam body.

According to certain embodiments, the rail protrusions may include a first rail protrusion and a second rail protrusion, disposed symmetrically to each other with respect to a center line of the cam body.

According to certain embodiments, the rail protrusions may include a third rail protrusion disposed on a center line of the cam body, and a fourth rail protrusion and a fifth rail protrusion, disposed symmetrically to each other with respect to the third rail protrusion.

According to certain embodiments, the support member may include a support board, and a first pattern layer of a lenticular type formed on the support board.

According to certain embodiments, at least a portion of the first pattern layer may be formed long in a linear movement direction of the first cam member.

According to certain embodiments, the first pattern layer may be formed to line-contact the first cam member.

According to certain embodiments, the support board and the first pattern layer may be formed of the same material.

According to certain embodiments, the first pattern layer may be formed of a plastic structure, and the support board may be formed of a material that is different from that of the first pattern layer.

According to certain embodiments, the support member may include a support board, and a second pattern layer in a lattice form formed on the support board, and According to certain embodiments, the second pattern layer may be formed to point-contact the first cam member.

According to certain embodiments, the foldable electronic device may further include a first spring that applies force to one side of the first cam, and a second spring that applies force to one side of the second cam, and the first spring and the second spring may be disposed to buckle symmetrically to each other with respect to a center line between the first rotary shaft and the second rotary shaft.

According to certain embodiments, a buckling direction of the first spring and a buckling direction of the second spring may be disposed to face the center line, and the buckling direction of the first spring and the buckling direction of the second spring may be disposed to face a direction that becomes farther from the center line.

According to certain embodiments, the foldable electronic device may further include a first spring that applies force to one side of the first cam, and a second spring that applies force to one side of the second cam, and the first spring and the second spring may be disposed to buckle in a direction that faces a bottom surface of the hinge housing.

According to certain embodiments, the foldable electronic device may further include a hinge housing 150, wherein at least a portion of the hinge structure 200 is disposed in the hinge housing 150, a third cam structure formed in the first arm, into which the first rotary shaft 231 is inserted, and disposed to be spaced apart from the first cam structure by a specific interval, a fourth cam structure formed in the second arm, into which the second rotary shaft is inserted, and disposed to be spaced apart from the second cam structure by a specific interval, and a second cam member including a third cam, into which the first rotary shaft is inserted, and engaged with the third cam structure, a fourth cam, into which the second rotary shaft is inserted, and engaged with the fourth cam structure, and a cam body connecting the third cam and the fourth cam, and the foldable electronic device may further include a second support member disposed between the second cam member and the hinge housing.

According to certain embodiments, a hinge structure may include a fixing member 213, a first rotary member 211 coupled to the fixing member 213, a second rotary member 212 coupled to the fixing member 213, a first rotary shaft 231 having one end held on one side of the fixing member, a second rotary shaft 232 having one end held on an opposite side of the fixing member, a first arm part 221 having the first rotary shaft is inserted therein and coupled to the first rotary member, a first cam structure 221_4a disposed in the first arm part, a second arm part 222 having the second rotary shaft inserted therein and coupled to the second rotary member, a second cam structure 222_4a disposed in the second arm part a first cam member including a first cam, into which the first rotary shaft is inserted, and engaged with the first cam structure, a second cam, into which the second rotary shaft is inserted, and engaged with the second cam structure, and a cam body connecting the first cam and the second cam, a first spring 242a that applies force to one side of the first cam, and a second spring 242b that applies force to one side of the second cam, and the first spring and the second spring may be disposed to buckle symmetrically to each other with respect to a center line between the first rotary shaft and the second rotary shaft.

According to certain embodiments, a hinge structure may include a fixing member 213, a first rotary member 211 and a second rotary member 212 coupled from an upper side of the fixing member in a downward direction, a first rotary shaft 231, one end of which is held on one side of the fixing member, a second rotary shaft 232, one end of which is held on an opposite side of the fixing member, a first arm part 221, into which the first rotary shaft is inserted and coupled to the first rotary member, a first cam structure 221_4a disposed in the first arm part, a second arm part 222, into which the second rotary shaft is inserted, and coupled to the second rotary member, a second cam structure 222_4a disposed in the second arm part, a first cam member including a first cam, into which the first rotary shaft is inserted, and engaged with the first cam structure, a second cam, into which the second rotary shaft is inserted, and engaged with the second cam structure, and a cam body connecting the first cam and the second cam, a first spring 242a that applies force to one side of the first cam, and a second spring 242b that applies force to one side of the second cam, and the first spring and the second spring may buckle in a same direction in an opposite direction to an upper side of the fixing member such that at least a partial corner of the first rotary shaft contacts an inner side of a first cam hole and at least a partial corner of the second rotary shaft contacts an inner side of a second cam hole.

According to certain embodiments, at least a portion of the first cam member includes metal, and wherein at least a portion of the support member includes plastic.

According to certain embodiments, a plurality of protrusions is disposed in the cam body.

According to certain embodiments, the first rotary member comprises a rail and the fixing member comprises a groove, and wherein the rail is disposed inside the groove.

Each of the components (e.g., a module or a program) according to certain embodiments may include a single or a plurality of entities, and some of the corresponding sub-components may be omitted or another sub-component may be further included in certain embodiments. Alternatively or additionally, some components (e.g., a module or a program) may be integrated into one entity to perform functions performed by the corresponding components before the integration in the same way or similarly. The operations performed by a module, a program module, or another component according to certain embodiments may be executed sequentially, in parallel, repeatedly, or heuristically, or at least some operations may be executed in another sequence or may be omitted, or another operation may be added.

What is claimed is:

1. A foldable electronic device comprising:
   a first housing;
   a second housing;
   a hinge structure coupling the first housing and the second housing; and
   a flexible display, wherein at least a first portion of the flexible display is disposed on the first housing and a second portion of the flexible display is disposed on the second housing,
   wherein the hinge structure includes:
   a fixing member,
   a first rotary member coupled to the fixing member;
   a second rotary member coupled to the fixing member;
   a first rotary shaft, wherein one end of the first rotary shaft is held on one side of the fixing member;
   a second rotary shaft, wherein one end of the second rotary shaft is held on an opposite side of the fixing member;
   a first arm part coupled to the first rotary member, with the first rotary shaft is inserted therein;
   a first cam structure disposed is in the first arm part;
   a second arm part coupled to the second rotary member with the second rotary shaft inserted therein,
   a second cam structure disposed in the second arm part; and
   a first cam member including a first cam, with the first rotary shaft inserted in the first cam, and engaged with the first cam structure, a second cam, with the second rotary shaft inserted in the second cam, and engaged with the second cam structure, and a cam body connecting the first cam and the second cam,
   a first spring configured to apply force to one side of the first cam; and
   a second spring configured to apply force to one side of the second cam,
   wherein the first spring and the second spring are disposed to buckle symmetrically to each other with respect to a center line between the first rotary shaft and the second rotary shaft.

2. The foldable electronic device of claim 1, further comprising a support member, and wherein at least a portion of the first cam member includes metal, and
   wherein at least a portion of the support member includes plastic.

3. The foldable electronic device of claim 1, wherein a plurality of protrusions is disposed in the cam body.

4. The foldable electronic device of claim 1, wherein rail protrusions having a length in a reciprocation direction of the first cam member are disposed in the cam body.

5. The foldable electronic device of claim 4, wherein the rail protrusions include:
   a first rail protrusion and a second rail protrusion disposed symmetrically to each other with respect to a center line of the cam body.

6. The foldable electronic device of claim 4, wherein the rail protrusions include:
   a third rail protrusion disposed on a center line of the cam body, and a fourth rail protrusion and a fifth rail protrusion, disposed symmetrically to each other with respect to the third rail protrusion.

7. The foldable electronic device of claim 1, further comprising a support member, wherein the support member includes:
   a support board; and
   a first pattern layer of a lenticular type formed on the support board.

8. The foldable electronic device of claim 7, wherein at least a portion of the first pattern layer is formed long in a linear movement direction of the first cam member.

9. The foldable electronic device of claim 7, wherein the first pattern layer is formed to line-contact the first cam member.

10. The foldable electronic device of claim 7, wherein the support board and the first pattern layer are formed of the same material, or wherein the first pattern layer is formed of a plastic structure, and the support board is formed of a material that is different from that of the first pattern layer.

11. The foldable electronic device of claim 1, further comprising a support member, wherein the support member includes:
    a support board; and
    a first pattern layer in a lattice form formed on the support board, and
    wherein the first pattern layer is formed to point-contact the first cam member.

12. The foldable electronic device of claim 1, wherein a buckling direction of the first spring and a buckling direction of the second spring face the center line, and
    wherein the buckling direction of the first spring and the buckling direction of the second spring are disposed to face a direction that becomes farther from the center line.

13. The foldable electronic device of claim 1, further comprising:
    a hinge housing, wherein at least a portion of the hinge structure is disposed in the hinge housing;
    a first spring configured to apply force to one side of the first cam; and
    a second spring configured to apply force to one side of the second cam,
    wherein the first spring and the second spring are disposed to buckle in a direction that faces a bottom surface of the hinge housing.

14. A foldable electronic device comprising:
    a first housing;
    a second housing;
    a hinge structure coupling the first housing and the second housing; and
    a flexible display, wherein at least a first portion of the flexible display is disposed on the first housing and a second portion of the flexible display is disposed on the second housing;
    wherein the hinge structure includes:
    a fixing member,
    a first rotary member coupled to the fixing member;
    a second rotary member coupled to the fixing member:
    a first rotary shaft, wherein one end of the first rotary shaft is held on one side of the fixing member;
    a second rotary shaft, wherein one end of the second rotary shaft is held on an opposite side of the fixing member;
    a first arm part coupled to the first rotary member, with the first rotary shaft is inserted therein;
    a first cam structure disposed is in the first arm part;
    a second arm part coupled to the second rotary member with the second rotary shaft inserted therein,
    a second cam structure disposed in the second arm part;
    a first cam member including a first cam, with the first rotary shaft inserted in the first cam, and engaged with the first cam structure, a second cam, with the second rotary shaft inserted in the second cam, and engaged with the second cam structure, and a cam body connecting the first cam and the second cam;

a third cam structure formed in the first arm part with the first rotary shaft inserted therein, and spaced apart from the first cam structure;

a fourth cam structure formed in the second arm part with the second rotary shaft inserted therein, and spaced apart from the second cam structure; and a second cam member including a third cam, with the first rotary shaft inserted therein, and engaged with the third cam structure, a fourth cam with the second rotary shaft inserted therein, and engaged with the fourth cam structure, and a cam body connecting the third cam and the fourth cam.

15. The foldable electronic device of claim 14, further comprising:

a hinge housing, wherein at least a portion of the hinge structure is disposed in the hinge housing;

wherein the foldable electronic device further comprises a second support member disposed between the second cam member and the hinge housing.

16. A hinge structure comprising:

a fixing member;

a first rotary member coupled to the fixing member;

a second rotary member coupled to the fixing member;

a first rotary shaft having one end held on one side of the fixing member;

a second rotary shaft having one end held on an opposite side of the fixing member;

a first arm part, having the first rotary shaft inserted therein, and coupled to the first rotary member;

a first cam structure disposed in the first arm part;

a second arm part having the second rotary shaft inserted therein, and coupled to the second rotary member;

a second cam structure disposed in the second arm part;

a first cam member including a first cam, with the first rotary shaft inserted therein, and engaged with the first cam structure, a second cam, with the second rotary shaft inserted therein, and engaged with the second cam structure, and a cam body connecting the first cam and the second cam;

a first spring configured to apply force to one side of the first cam; and a second spring configured to apply force to one side of the second cam, wherein the first spring and the second spring are disposed to buckle symmetrically to each other with respect to a center line between the first rotary shaft and the second rotary shaft.

17. A hinge structure comprising:

a fixing member;

a first rotary member and a second rotary member coupled from an upper side of the fixing member in a downward direction;

a first rotary shaft having one end held on one side of the fixing member;

a second rotary shaft having one end held on an opposite side of the fixing member;

a first arm part, having the first rotary shaft inserted therein, and coupled to the first rotary member;

a first cam structure disposed in the first arm part;

a second arm part, having the second rotary shaft inserted therein, and coupled to the second rotary member;

a second cam structure disposed in the second arm part;

a first cam member including a first cam having the first rotary shaft is inserted therein, and engaged with the first cam structure, a second cam having the second rotary shaft inserted therein, and engaged with the second cam structure, and a cam body connecting the first cam and the second cam;

a first spring configured to apply force to one side of the first cam; and a second spring configured to apply force to one side of the second cam, wherein the first spring and the second spring buckle in a same direction in an opposite direction to an upper side of the fixing member such that at least a partial corner of the first rotary shaft contacts an inner side of a first cam hole and at least a partial corner of the second rotary shaft contacts an inner side of a second cam hole.

18. The hinge structure of claim 17, further comprising a support member, and wherein at least a portion of the first cam member includes metal, and wherein at least a portion of the support member includes plastic.

19. The hinge structure of claim 17, wherein a plurality of protrusions is disposed in the cam body.

20. The hinge structure of claim 17, wherein the first rotary member comprises a rail and the fixing member comprises a groove, and wherein the rail is disposed inside the groove.

* * * * *